US011042948B1

(12) United States Patent
McNamara et al.

(10) Patent No.: US 11,042,948 B1
(45) Date of Patent: Jun. 22, 2021

(54) COMPUTING COMPONENT ARRANGEMENT BASED ON RAMPING CAPABILITIES

(71) Applicant: Lancium LLC, Houston, TX (US)

(72) Inventors: Michael T. McNamara, Newport Beach, CA (US); Raymond E. Cline, Jr., Houston, TX (US)

(73) Assignee: LANCIUM LLC, Houston, TX (US)

( * ) Notice: Subject to any disclaimer, the term of this patent is extended or adjusted under 35 U.S.C. 154(b) by 0 days.

(21) Appl. No.: 16/803,109

(22) Filed: Feb. 27, 2020

(51) Int. Cl.
G05D 3/12 (2006.01)
G05D 5/00 (2006.01)
(Continued)

(52) U.S. Cl.
CPC ........... *G06Q 50/06* (2013.01); *G05B 13/042* (2013.01); *G05B 23/0294* (2013.01);
(Continued)

(58) Field of Classification Search
CPC ........ H02J 3/383; H02J 3/386; H02J 13/0017; H02J 7/35; H02J 9/06; H02J 13/0013; H02J 3/32; H02J 13/00006; H02J 13/00002; G06F 1/20; G06F 1/26; G06F 1/3203; G06F 1/3234; G06F 1/324; G06F 1/3287; G06F 1/329; G06F 1/3296; A01G 31/06;
(Continued)

(56) References Cited

U.S. PATENT DOCUMENTS 6,288,456 B1 * 9/2001 Cratty .................. H02J 9/08
307/64
6,633,823 B2 10/2003 Bartone et al.
(Continued)

FOREIGN PATENT DOCUMENTS

CN 103163904 A 6/2013
KR 20090012523 A 2/2009
(Continued)

OTHER PUBLICATIONS

Bird et al., "Wind and Solar Energy Curtailment: Experience and Practices in the United States," National Renewable Energy Lab (NREL), Technical Report NREL/TP-6A20-60983, Mar. 2014, 58 pages.

(Continued)

*Primary Examiner* — Zhipeng Wang
(74) *Attorney, Agent, or Firm* — Barnes & Thornburg LLP

(57) ABSTRACT

Examples relate to a method includes monitoring a set of parameters. The set of parameters are associated with a first set of computing components and a second set of computing components. The first set of computing components is located in a first region and the second set of computing components is located in a second region. The first region is positioned proximate a generation station control system associated with a generation station and the second region is positioned remotely from the generation station control system. Each computing system of the second set of computing components is configured to adjust power consumption during operation. The method also include adjusting power consumption at one or more computing components of the second set of computing components based on the set of parameters.

30 Claims, 15 Drawing Sheets

(51) Int. Cl.

| | | |
|---|---|---|
| G05D 9/00 | (2006.01) | |
| G05D 11/00 | (2006.01) | |
| G05D 17/00 | (2006.01) | |
| G06Q 50/06 | (2012.01) | |
| G06F 1/3287 | (2019.01) | |
| G05B 23/02 | (2006.01) | |
| H02J 13/00 | (2006.01) | |
| G06Q 10/06 | (2012.01) | |
| G05B 13/04 | (2006.01) | |

(52) U.S. Cl.
CPC ..... *G06F 1/3287* (2013.01); *G06Q 10/06315* (2013.01); *H02J 13/00002* (2020.01); *H02J 13/00006* (2020.01)

(58) Field of Classification Search
CPC ........ A01G 9/24; A01G 9/243; G05B 13/041; G05B 15/02; G05B 19/042; G05B 2219/2639; G05B 13/042; G05B 23/0294; H02S 10/00; G06Q 50/06; G06Q 10/06315
See application file for complete search history.

(56) References Cited

U.S. PATENT DOCUMENTS

| | | | |
|---|---|---|---|
| 7,143,300 B2 | 11/2006 | Potter et al. | |
| 7,647,516 B2 | 1/2010 | Ranganathan | |
| 7,702,931 B2 | 4/2010 | Goodrum et al. | |
| 7,779,276 B2 | 8/2010 | Bolan et al. | |
| 7,861,102 B1 | 12/2010 | Ranganathan et al. | |
| 7,921,315 B2 | 4/2011 | Langgood et al. | |
| 7,970,561 B2 | 6/2011 | Pfeiffer | |
| 8,001,403 B2* | 8/2011 | Hamilton | G06F 1/3203 713/300 |
| 8,006,108 B2 | 8/2011 | Brey et al. | |
| 8,214,843 B2 | 7/2012 | Boss et al. | |
| 8,374,928 B2 | 2/2013 | Gopisetty et al. | |
| 8,447,993 B2 | 5/2013 | Greene et al. | |
| 8,571,820 B2 | 10/2013 | Pfeiffer | |
| 8,627,123 B2 | 1/2014 | Jain et al. | |
| 8,639,392 B2 | 1/2014 | Chassin | |
| 8,700,929 B1 | 4/2014 | Weber et al. | |
| 8,789,061 B2 | 7/2014 | Pavel et al. | |
| 8,799,690 B2 | 8/2014 | Dawson et al. | |
| 9,003,211 B2 | 4/2015 | Pfeiffer | |
| 9,003,216 B2 | 4/2015 | Sankar et al. | |
| 9,026,814 B2 | 5/2015 | Aasheim et al. | |
| 9,027,024 B2 | 5/2015 | Mick et al. | |
| 9,143,392 B2 | 9/2015 | Duchesneau | |
| 9,207,993 B2 | 12/2015 | Jain | |
| 9,218,035 B2 | 12/2015 | Li et al. | |
| 9,552,234 B2 | 1/2017 | Boldyrev et al. | |
| 9,645,596 B1 | 5/2017 | Lee et al. | |
| 9,994,118 B2 | 6/2018 | Williams et al. | |
| 10,367,353 B1 | 7/2019 | McNamara et al. | |
| 10,367,535 B2 | 7/2019 | Corse et al. | |
| 10,444,818 B1 | 10/2019 | McNamara et al. | |
| 10,452,127 B1 | 10/2019 | McNamara et al. | |
| 10,452,532 B2 | 10/2019 | McVay et al. | |
| 10,497,072 B2 | 12/2019 | Hooshmand et al. | |
| 10,608,433 B1 | 3/2020 | Mcnamara et al. | |
| 10,618,427 B1 | 4/2020 | Mcnamara et al. | |
| 10,637,353 B2 | 4/2020 | Ohyama et al. | |
| 2002/0158749 A1 | 10/2002 | Ikeda et al. | |
| 2003/0023885 A1 | 1/2003 | Potter et al. | |
| 2003/0074464 A1 | 4/2003 | Bohrer et al. | |
| 2004/0117330 A1 | 6/2004 | Ehlers et al. | |
| 2005/0203761 A1 | 9/2005 | Barr et al. | |
| 2006/0161765 A1 | 7/2006 | Cromer et al. | |
| 2008/0030078 A1 | 2/2008 | Whitted et al. | |
| 2008/0094797 A1 | 4/2008 | Coglitore et al. | |
| 2009/0055665 A1 | 2/2009 | Maglione et al. | |
| 2009/0070611 A1 | 3/2009 | Bower, III et al. | |
| 2009/0078401 A1* | 3/2009 | Cichanowicz | F22D 1/003 165/299 |
| 2009/0089595 A1 | 4/2009 | Brey et al. | |
| 2010/0211810 A1* | 8/2010 | Zacho | G06F 9/5088 713/324 |
| 2010/0235004 A1* | 9/2010 | Thind | G05B 15/02 700/277 |
| 2010/0280675 A1 | 11/2010 | Tate, Jr. et al. | |
| 2010/0328849 A1 | 12/2010 | Ewing et al. | |
| 2011/0072289 A1 | 3/2011 | Kato | |
| 2012/0000121 A1 | 1/2012 | Swann | |
| 2012/0072745 A1 | 3/2012 | Ahluwalia et al. | |
| 2012/0300524 A1 | 11/2012 | Fornage et al. | |
| 2012/0306271 A1* | 12/2012 | Kuriyama | H02J 9/00 307/23 |
| 2013/0006401 A1 | 1/2013 | Shan | |
| 2013/0063991 A1 | 3/2013 | Xiao et al. | |
| 2013/0086404 A1* | 4/2013 | Sankar | G06Q 10/06315 713/324 |
| 2013/0117621 A1 | 5/2013 | Saraiya et al. | |
| 2013/0187464 A1 | 7/2013 | Smith et al. | |
| 2013/0227139 A1 | 8/2013 | Suffling | |
| 2013/0304903 A1 | 11/2013 | Mick et al. | |
| 2013/0306276 A1 | 11/2013 | Duchesneau | |
| 2014/0070756 A1 | 3/2014 | Kearns et al. | |
| 2014/0137468 A1 | 5/2014 | Ching | |
| 2014/0180886 A1 | 6/2014 | Forbes, Jr. | |
| 2014/0379156 A1 | 12/2014 | Kamel et al. | |
| 2015/0012113 A1 | 1/2015 | Celebi | |
| 2015/0121113 A1 | 4/2015 | Ramamurthy et al. | |
| 2015/0155712 A1 | 6/2015 | Mondal | |
| 2015/0212122 A1 | 7/2015 | Sobotka et al. | |
| 2015/0229227 A1 | 8/2015 | Aeloiza et al. | |
| 2015/0277410 A1* | 10/2015 | Gupta | H02J 3/32 700/295 |
| 2015/0278968 A1 | 10/2015 | Steven et al. | |
| 2015/0288183 A1 | 10/2015 | Villanueva, Jr. et al. | |
| 2015/0372538 A1 | 12/2015 | Siegler et al. | |
| 2016/0006066 A1* | 1/2016 | Robertson | C25B 15/08 429/418 |
| 2016/0011617 A1 | 1/2016 | Liu et al. | |
| 2016/0043552 A1 | 2/2016 | Villanueva, Jr. et al. | |
| 2016/0126783 A1* | 5/2016 | Cheng | H02J 9/061 307/66 |
| 2016/0170469 A1 | 6/2016 | Sehgal et al. | |
| 2016/0172900 A1 | 6/2016 | Welch, Jr. | |
| 2016/0187906 A1 | 6/2016 | Bodas et al. | |
| 2016/0198656 A1 | 7/2016 | McNamara et al. | |
| 2016/0212954 A1 | 7/2016 | Argento | |
| 2016/0324077 A1 | 11/2016 | Frantzen et al. | |
| 2017/0023969 A1 | 1/2017 | Shows et al. | |
| 2017/0104336 A1 | 4/2017 | Elbsat et al. | |
| 2017/0261949 A1 | 9/2017 | Hoffmann et al. | |
| 2017/0373500 A1 | 12/2017 | Shafi et al. | |
| 2018/0026478 A1 | 1/2018 | Peloso | |
| 2018/0144414 A1 | 5/2018 | Lee et al. | |
| 2018/0202825 A1 | 7/2018 | You et al. | |
| 2018/0240112 A1 | 8/2018 | Castinado et al. | |
| 2018/0366978 A1 | 12/2018 | Matan et al. | |
| 2018/0367320 A1 | 12/2018 | Montalvo | |
| 2019/0052094 A1 | 2/2019 | Pmsvvsv et al. | |
| 2019/0168630 A1 | 6/2019 | Mrlik et al. | |
| 2019/0258307 A1 | 8/2019 | Shaikh et al. | |
| 2019/0280521 A1 | 9/2019 | Lundstrom et al. | |
| 2019/0318327 A1 | 10/2019 | Sowell et al. | |
| 2019/0324820 A1 | 10/2019 | Krishnan et al. | |
| 2020/0073466 A1* | 3/2020 | Walsh | H02J 7/00 |
| 2020/0136387 A1 | 4/2020 | Mcnamara et al. | |
| 2020/0136388 A1 | 4/2020 | Mcnamara et al. | |

FOREIGN PATENT DOCUMENTS

| | | |
|---|---|---|
| WO | 2015199629 A1 | 12/2015 |
| WO | WO-2019139633 A1 | 7/2019 |

(56) References Cited

OTHER PUBLICATIONS

Co-pending U.S. Appl. No. 16/132,092, filed Sep. 14, 2018.
Co-pending U.S. Appl. No. 16/175,246, filed Oct. 30, 2018.
Co-pending U.S. Appl. No. 16/482,495, filed Jul. 31, 2019.
EPEX Spot, "How They Occur, What They Mean," https://www.epexspot.com/en/company-info/basics_of_the_power_market/negative_prices, 2018, 2 pages.
Final Office Action dated Oct. 1, 2019 for U.S. Appl. No. 16/175,246, filed Oct. 30, 2018, 18 pages.
Ghamkhari et al., "Optimal Integration of Renewable Energy Resources in Data Centers with Behind-the-Meter Renewable Generator," Department of Electrical and Computer Engineering Texas Tech University, 2012, pp. 3340-3444.
Hayes, Adam, "A Cost of Production Model for Bitcoin," Department of Economics, The New School for Social Research, Mar. 2015. (Year: 2015).
International Search Report and Written Opinion of PCT Application No. PCT/US2018/017955, dated Apr. 30, 2018, 22 pages.
International Search Report and Written Opinion of PCT Application No. PCT/US2018/017950, dated May 31, 2018, 15 pages.
Non-Final Office Action dated Dec. 5, 2019 for U.S. Appl. No. 16/529,360, filed Aug. 1, 2019, 72 pages.
Non-Final Office Action dated Dec. 10, 2019 for U.S. Appl. No. 16/596,190, filed Oct. 8, 2019, 72 pages.
Non-Final Office Action dated Nov. 14, 2019 for U.S. Appl. No. 16/132,098, filed Sep. 14, 2018, 25 pages.
Non-Final Office Action dated Feb. 20, 2020 for U.S. Appl. No. 16/702,894, filed Dec. 4, 2019, 30 pages.
Non-Final Office Action dated Nov. 21, 2019 for U.S. Appl. No. 16/529,402, filed Aug. 1, 2019, 57 pages.
Non-Final Office Action dated Dec. 11, 2019 on for U.S. Appl. No. 16/132,062, filed Sep. 14, 2018, 17 pages.
Non-Final Office Action dated Dec. 10, 2019 for U.S. Appl. No. 16/528,348, filed Oct. 8, 2019, 33 pages.
Notice of Allowance dated Apr. 2, 2019, for U.S. Appl. No. 16/175,335, filed Oct. 30, 2018, 12 pages.
Notice of Allowance dated Aug. 15, 2019, for U.S. Appl. No. 16/175,146, filed Oct. 30, 2018, 17 pages.
Notice of Allowance dated Jan. 27, 2020, for U.S. Appl. No. 16/702,931, filed Dec. 4, 2019, 23 pages.
Notice of Allowance dated Jul. 29, 2019, for U.S. Appl. No. 16/245,532, filed Jan. 11, 2019, 13 pages.
Rahimi, Farrokh, "Using a Transactive Energy Framework," IEEE Electrification Magazine, Dec. 2016, pp. 23-29.
Soluna., "Powering the Block Chain," Aug. 2018, version 1.1, 29 pages.
Final Office Action dated Apr. 17, 2020 for U.S. Appl. No. 16/529,402, filed Aug. 1, 2019, 59 pages.
Non-Final Office Action dated Apr. 2, 2020 on for U.S. Appl. No. 16/132,011, filed Sep. 14, 2018, 5 pages.
Non-Final Office Action dated Mar. 30, 2020 for U.S. Appl. No. 16/132,092, filed Sep. 14, 2018, 46 pages.
Notice of Allowance dated Mar. 2, 2020, for U.S. Appl. No. 16/596,190, filed Oct. 8, 2019, 15 pages.
Notice of Allowance dated Apr. 6, 2020, for U.S. Appl. No. 16/175,246, filed Oct. 30, 2018, 12 pages.
Advisory Action dated Nov. 13, 2020 for U.S. Appl. No. 16/529,360, filed Aug. 1, 2019, 182 pages.
Advisory Action dated Oct. 22, 2020 for U.S. Appl. No. 16/528,348, filed Jul. 31, 2019, 3 pages.
Bakar.N et al., "Microgrid and Load Shedding Scheme During Islanded Mode: a Review," Elsevier, May 26, 2020, vol. 71, pp. 161-169. https://www.sciencedirect.com/science/article/pii/S1364032116311030. 0.
Choi.Y et al., "Optimal Load Shedding for Maximizing Satisfaction in an Islanded Microgrid," Energies, 2017, vol. 10, pp. 45. doi: 10.3390/en10010045.
Final Office Action dated Jul. 23, 2020 on for U.S. Appl. No. 16/132,062, filed Sep. 14, 2018, 26 pages.
Final Office Action dated Jun. 3, 2020 for U.S. Appl. No. 16/528,348, filed Jul. 31, 2019, 33 pages.
Final Office Action dated May 19, 2020 for U.S. Appl. No. 16/809,111, filed Mar. 4, 2020, 36 pages.
Final Office Action dated May 28, 2020 for U.S. Appl. No. 16/132,098, filed Sep. 14, 2018, 24 pages.
Final Office Action dated Jul. 29, 2020 for U.S. Appl. No. 16/132,092, filed Sep. 14, 2018, 5 pages.
Gao.H et al., "Dynamic Load Shedding for an Islanded Microgrid With Limited Generation Resources," IET Generation, Transmission & Distribution, Sep. 2016, vol. 10(12), pp. 2953-2961. doi: 10.1049/iet-gtd.2015.1452.
International Search Report and Written Opinion of PCT Application No. PCT/US2020/044536, dated Aug. 26, 2020, 24 pages.
International Search Report and Written Opinion of PCT Application No. PCT/US2020/044539, dated Aug. 26, 2020, 7 pages.
John, "Stem and CPower to Combine Behind-the-Meter Batteries and Demand Response," Energy Storage, Aug. 8, 2017, 5 pages.
Lim.Y et al., "Distributed Load-shedding System for Agent-based Autonomous Microgrid Operations," Energies, 2014, vol. 7(1), pp. 385-401. doi: 10.3390/en7010385.
Liu.W et al., "Improved Average Consensus Algorithm Based Distributed Cost Optimization for Loading Shedding of Autonomous Microgrids,"International Journal of Electrical Power & Energy Systems, Dec. 2015, vol. 73, pp. 89-96. doi: 10.1016/j.ijepes.2015.04.006.
Mousavizadeh.S et al., "A Linear Two-stage Method for Resiliency Analysis in Distribution Systems Considering Renewable Energy and Demand Response Resources," Elsevier, 2017, pp. 443-460. doi: 10.1016/j.apenergy.2017.11.067.
Non-Final Office Action dated May 14, 2020 on for U.S. Appl. No. 16/834,987, filed Mar. 30, 2020, 30 pages.
Notice of Allowance dated Jun. 12, 2020 on for U.S. Appl. No. 16/834,987, filed Mar. 30, 2020, 9 pages.
Notice of Allowance dated Oct. 13, 2020 on for U.S. Appl. No. 16/132,098, filed Sep. 14, 2018, 5 pages.
Notice of Allowance dated Sep. 17, 2020 on for U.S. Appl. No. 16/175,246, filed Oct. 30, 2018, 5 pages.
Notice of Allowance dated Nov. 19, 2020 on for U.S. Appl. No. 16/132,062, filed Sep. 14, 2018, 7 pages.
Notice of Allowance dated Jul. 29, 2020 on for U.S. Appl. No. 16/132,011, filed Sep. 14, 2018, 5 pages.
Notice of Allowance dated Oct. 29, 2020 on for U.S. Appl. No. 16/132,092, filed Sep. 14, 2018, 8 pages.
Pashajavid.E et al., "A Multimode Supervisory Control Scheme for Coupling Remote Droop-Regulated Microgrids," IEEE Transactions on Smart Grid, May 26, 2020, vol. 9(5), pp. 5381- 5392. https://ieeexplore.ieee.org/abstract/document/7888570/.
Pashajavid.E et al., "Frequency Support for Remote Microgrid Systems With Intermittent Distributed Energy Resources-A Two-level Hierarchical Strategy," IEEE Systems Journal, May 26, 2020, vol. 12(3), pp. 2760-2771. https://ieeexplore.ieee.org/abstract/document/7862156/.
Rudez.0 and Mihalic.R, "Predictive Underfrequency Load Shedding Scheme for Islanded Power Systems With Renewable Generation," Electric Power Systems Research, May 2015, vol. 126, pp. 21-28. doi: 10.1016/j.epsr.2015.04.017.
Wilson, Joseph Nathanael, "A Utility-Scale Deployment Project of Behind-the-Meter Energy Storage for Use in Ancillary Services, Energy Resiliency, Grid Infrastructure Investment Deferment, and Demand-Response Integration," Portland State University, 2016, 154 pages.
Xu.Q et al., "Distributed Load Shedding for Microgrid With Compensation Support via Wireless Network," IET Generation, Transmission & Distribution, May 2018, vol. 12(9), pp. 2006-2018. doi: 10.1049/iet-gtd.2017.1029.
Zhou.Q et al., "Two-Stage Load Shedding for Secondary Control in Hierarchical Operation of Islanded Microgrids," IEEE Transactions on Smart Grid, May 2019, vol. 10(3), pp. 3103-3111. doi: 10.1109/TSG.2018.2817738.
International Search Report and Written Opinion of PCT Application No. PCT/US20/57686, dated Feb. 22, 2021, 67 pages.

(56) References Cited

OTHER PUBLICATIONS

ISO, "Distributed Energy Resources Roadmap for New York's Wholesale Electricity Markets," Distributed Energy Resource Roadmap, Jan. 2017, pp. 1-39. [retrieved on Dec. 15, 2020], Retrieved from the Internet< url:< a=href="https://www.nyiso.com/documents/20142/1391862/Distributed_Energy_Resources_Roadmap.pdf/ec0b3b64-4de2-73e0-ffef-49a4b8b1">https://www.nyiso.com/documents/20142/1391862/Distributed_Energy_Resources_Roadmap.pdf/ec0b3b64-4de2-73e0-ffef-49a4b8b1 b3ca.</url>.

Non-Final Office Action dated Feb. 4, 2021 on for U.S. Appl. No. 16/284,610, filed Feb. 25, 2019, 9 pages.

Non-Final Office Action dated Mar. 8, 2021 on for U.S. Appl. No. 16/525,142, filed Jul. 29, 2019, 71 pages.

Non-Final Office Action dated Feb. 12, 2021 on for U.S. Appl. No. 16/528,348, filed Jul. 31, 2019, 54 pages.

Non-Final Office Action dated Mar. 25, 2021 on for U.S. Appl. No. 16/573,577, filed Sep. 17, 2019, 65 pages.

Notice of Allowance dated Feb. 8, 2021 on for U.S. Appl. No. 16/132,062, filed Sep. 14, 2018, 21 pages.

Notice of Allowance dated Feb. 8, 2021 on for U.S. Appl. No. 16/834,987, filed Mar. 30, 2020, 180 pages.

Notice of Allowance dated Jan. 13, 2021 on for U.S. Appl. No. 16/175246, filed Oct. 30, 2018, 5 pages.

Notice of Allowance dated Jan. 25, 2021 on for U.S. Appl. No. 16/132,098, filed Sep. 14, 2018, 5 pages.

Notice of Allowance dated Jan. 25, 2021 on for U.S. Appl. No. 16/702,894, filed Dec. 4, 2019, 24 pages.

Notice of Allowance mailed Jan. 27, 2021 on for U.S. Appl. No. 16/132,092, filed Sep. 14, 2018, 8 pages.

Non-Final Office Action dated Apr. 1, 2021 on for U.S. Appl. No. 16/482,495, filed Jul. 31, 2019, 59 pages.

International Search Report and Written Opinion of PCT Application No. PCT/US2021/019875, dated Apr. 29, 2021, 12 pages.

\* cited by examiner

COMPUTING COMPONENT ARRANGEMENT BASED ON RAMPING CAPABILITIES

FIELD

This specification relates to a system using intermittent behind-the-meter power.

BACKGROUND

"Electrical grid" or "grid," as used herein, refers to a Wide Area Synchronous Grid (also known as an Interconnection), and is a regional scale or greater electric power grid that operates at a synchronized frequency and is electrically tied together during normal system conditions. An electrical grid delivers electricity from generation stations to consumers. An electrical grid includes: (i) generation stations that produce electrical power at large scales for delivery through the grid, (ii) high voltage transmission lines that carry that power from the generation stations to demand centers, and (iii) distribution networks carry that power to individual customers.

FIG. 1 illustrates a typical electrical grid, such as a North American Interconnection or the synchronous grid of Continental Europe (formerly known as the UCTE grid). The electrical grid of FIG. 1 can be described with respect to the various segments that make up the grid.

A generation segment 102 includes one or more generation stations that produce utility-scale electricity (typically >50 MW), such as a nuclear plant 102a, a coal plant 102b, a wind power station (i.e., wind farm) 102c, and/or a photovoltaic power station (i.e., a solar farm) 102d. Generation stations are differentiated from building-mounted and other decentralized or local wind or solar power applications because they supply power at the utility level and scale (>50 MW), rather than to a local user or users. The primary purpose of generation stations is to produce power for distribution through the grid, and in exchange for payment for the supplied electricity. Each of the generation stations 102a-d includes power generation equipment 102e-h, respectively, typically capable of supply utility-scale power (>50 MW). For example, the power generation equipment 102g at wind power station 102c includes wind turbines, and the power generation equipment 102h at photovoltaic power station 102d includes photovoltaic panels.

Each of the generation stations 102a-d may further include station electrical equipment 102i-l, respectively. Station electrical equipment 102i-l are each illustrated in FIG. 1 as distinct elements for simplified illustrative purposes only and may, alternatively or additionally, be distributed throughout the power generation equipment, 102e-h, respectively. For example, at wind power station 102c, each wind turbine may include transformers, frequency converters, power converters, and/or electrical filters. Energy generated at each wind turbine may be collected by distribution lines along strings of wind turbines and move through collectors, switches, transformers, frequency converters, power converters, electrical filters, and/or other station electrical equipment before leaving the wind power station 102c. Similarly, at photovoltaic power station 102d, individual photovoltaic panels and/or arrays of photovoltaic panels may include inverters, transformers, frequency converters, power converters, and/or electrical filters. Energy generated at each photovoltaic panel and/or array may be collected by distribution lines along the photovoltaic panels and move through collectors, switches, transformers, frequency converters, power converters, electrical filters, and/or other station electrical equipment before leaving the photovoltaic power station 102d.

Each generation station 102a-d may produce AC or DC electrical current which is then typically stepped up to a higher AC voltage before leaving the respective generation station. For example, wind turbines may typically produce AC electrical energy at 600V to 700V, which may then be stepped up to 34.5 kV before leaving the generation station 102d. In some cases, the voltage may be stepped up multiple times and to a different voltage before exiting the generation station 102c. As another example, photovoltaic arrays may produce DC voltage at 600V to 900V, which is then inverted to AC voltage and may be stepped up to 34.5 kV before leaving the generation station 102d. In some cases, the voltage may be stepped up multiple times and to a different voltage before exiting the generation station 102d.

Upon exiting the generation segment 102, electrical power generated at generation stations 102a-d passes through a respective Point of Interconnection ("POI") 103 between a generation station (e.g., 102a-d) and the rest of the grid. A respective POI 103 represents the point of connection between a generation station's (e.g. 102a-d) equipment and a transmission system (e.g., transmission segment 104) associated with the electrical grid. In some cases, at the POI 103, generated power from generation stations 102a-d may be stepped up at transformer systems 103e-h to high voltage scales suitable for long-distance transmission along transmission lines 104a. Typically, the generated electrical energy leaving the POI 103 will be at 115 kV AC or above, but in some cases it may be as low as, for example, 69 kV for shorter distance transmissions along transmission lines 104a. Each of transformer systems 103e-h may be a single transformer or may be multiple transformers operating in parallel or series and may be co-located or located in geographically distinct locations. Each of the transformer systems 103e-h may include substations and other links between the generation stations 102a-d and the transmission lines 104a.

A key aspect of the POI 103 is that this is where generation-side metering occurs. One or more utility-scale generation-side meters 103a-d (e.g., settlement meters) are located at settlement metering points at the respective POI 103 for each generation station 102a-d. The utility-scale generation-side meters 103a-d measure power supplied from generation stations 102a-d into the transmission segment 104 for eventual distribution throughout the grid.

For electricity consumption, the price consumers pay for power distributed through electric power grids is typically composed of, among other costs, Generation, Administration, and Transmission & Distribution ("T&D") costs. T&D costs represent a significant portion of the overall price paid by consumers for electricity. These costs include capital costs (land, equipment, substations, wire, etc.), costs associated with electrical transmission losses, and operation and maintenance costs.

For utility-scale electricity supply, operators of generation stations (e.g., 102a-d) are paid a variable market price for the amount of power the operator generates and provides to the grid. At times, integrated utilities may own these facilities. Other times, Independent Power Producers may build and own these facilities. Some projects may have long term Power Purchase Agreements with Corporate or Utility buyers. Other projects are "Merchant" projects, meaning they will produce the power and sell into the grid at the prevailing LMP price. The amount of power the generation station operator generates and provides to the grid is measured by utility-scale generation-side meters (e.g., 103a-d) at settlement metering points. As illustrated in FIG. 1, the utility-scale generation-side meters 103a-d are shown on a low side of the transformer systems 103e-h), but they may alternatively be located within the transformer systems 103e-h or on the high side of the transformer systems 103e-h. A key aspect of a utility-scale generation-side meter is that it is able to meter the power supplied from a specific generation station into the grid. As a result, this information can be used to calculate and process payments for power supplied from the generation station to the grid or to PPA counterparties.

After passing through the utility-scale generation-side meters in the POI 103, the power originally generated at the generation stations 102a-d is transmitted onto and along the transmission lines 104a in the transmission segment 104. Typically, the electrical energy is transmitted as AC at 115 kV+ or above, though it may be as low as 69 kV for short transmission distances. In some cases, the transmission segment 104 may include further power conversions to aid in efficiency or stability. For example, transmission segment 104 may include high-voltage DC ("HVDC") portions (along with conversion equipment) to aid in frequency synchronization across portions of the transmission segment 104. As another example, transmission segment 104 may include transformers to step AC voltage up and then back down to aid in long distance transmission (e.g., 230 kV, 500 kV, 765 kV, etc.).

Power generated at the generation stations 104a-d is ultimately destined for use by consumers connected to the grid. Once the energy has been transmitted along the transmission segment 104, the voltage will be stepped down by transformer systems 105a-c in the step down segment 105 so that it can move into the distribution segment 106.

In the distribution segment 106, distribution networks 106a-c take power that has been stepped down from the transmission lines 104a and distribute it to local customers, such as local sub-grids (illustrated at 106a), industrial customers, including large EV charging networks (illustrated at 106b), and/or residential and retail customers, including individual EV charging stations (illustrated at 106c). Customer meters 106d, 106f measure the power used by each of the grid-connected customers in distribution networks 106a-c. Customer meters 106d are typically load meters that are unidirectional and measure power use. Some of the local customers in the distribution networks 106a-d may have local wind or solar power systems 106e owned by the customer. As discussed above, these local customer power systems 106e are decentralized and supply power directly to the customer(s). Customers with decentralized wind or solar power systems 106e may have customer meters 106f that are bidirectional or net-metering meters that can track when the local customer power systems 106e produce power in excess of the customer's use, thereby allowing the utility to provide a credit to the customer's monthly electricity bill. Customer meters 106d, 106f differ from utility-scale generation-side meters (e.g., settlement meters) in at least the following characteristics: design (electro-mechanical or electronic vs current transformer), scale (typically less than 1600 amps vs. typically greater than 50 MW; typically less than 600V vs. typically greater than 14 kV), primary function (use vs. supply metering), economic purpose (credit against use vs payment for power), and location (in a distribution network at point of use vs. at a settlement metering point at a Point of Interconnection between a generation station and a transmission line).

To maintain stability of the grid, the grid operator strives to maintain a balance between the amount of power entering the grid from generation stations (e.g., 102a-d) and the amount of grid power used by loads (e.g., customers in the distribution segment 106). In order to maintain grid stability and manage congestion, grid operators may take steps to reduce the supply of power arriving from generation stations (e.g., 102a-d) when necessary (e.g., curtailment). Particularly, in some markets, grid operators may decrease the market price paid for generated power to dis-incentivize generation stations (e.g., 102a-d) from generating and supplying power to the grid. In some cases, the market price may even go negative such that generation station operators must pay for power they allow into the grid. In addition, some situations may arise where grid operators explicitly direct a generation station (e.g., 102a-d) to reduce or stop the amount of power the station is supplying to the grid.

Power market fluctuations, power system conditions (e.g., power factor fluctuation or generation station startup and testing), and operational directives resulting in reduced or discontinued generation all can have disparate effects on renewal energy generators and can occur multiple times in a day and last for indeterminate periods of time. Curtailment, in particular, is particularly problematic.

According to the National Renewable Energy Laboratory's Technical Report TP-6A20-60983 (March 2014):

> [C]urtailment [is] a reduction in the output of a generator from what it could otherwise produce given available resources (e.g., wind or sunlight), typically on an involuntary basis. Curtailments can result when operators or utilities command wind and solar generators to reduce output to minimize transmission congestion or otherwise manage the system or achieve the optimal mix of resources. Curtailment of wind and solar resources typically occurs because of transmission congestion or lack of transmission access, but it can also occur for reasons such as excess generation during low load periods that could cause baseload generators to reach minimum generation thresholds, because of voltage or interconnection issues, or to maintain frequency requirements, particularly for small, isolated grids. Curtailment is one among many tools to maintain system energy balance, which can also include grid capacity, hydropower and thermal generation, demand response, storage, and institutional changes. Deciding which method to use is primarily a matter of economics and operational practice.
>
> "Curtailment" today does not necessarily mean what it did in the early 2000s. Two separate changes in the electric sector have shaped curtailment practices since that time: the utility-scale deployment of wind power, which has no fuel cost, and the evolution of wholesale power markets. These simultaneous changes have led to new operational challenges but have also expanded the array of market-based tools for addressing them.
>
> Practices vary significantly by region and market design. In places with centrally-organized wholesale power markets and experience with wind power, manual wind energy curtailment processes are increasingly being replaced by transparent offer-based market mechanisms that base dispatch on economics. Market protocols that dispatch generation based on economics can also result in renewable energy plants generating less than what they could potentially produce with available wind or sunlight. This is often referred to by grid operators by other terms, such as "downward dispatch." In places served primarily by vertically integrated utilities, power purchase agreements (PPAs) between the utility and the wind developer increasingly contain financial provisions for curtailment contingencies.

Some reductions in output are determined by how a wind operator values dispatch versus non-dispatch. Other curtailments of wind are determined by the grid operator in response to potential reliability events. Still other curtailments result from overdevelopment of wind power in transmission-constrained areas.

Dispatch below maximum output (curtailment) can be more of an issue for wind and solar generators than it is for fossil generation units because of differences in their cost structures. The economics of wind and solar generation depend on the ability to generate electricity whenever there is sufficient sunlight or wind to power their facilities.

Because wind and solar generators have substantial capital costs but no fuel costs (i.e., minimal variable costs), maximizing output improves their ability to recover capital costs. In contrast, fossil generators have higher variable costs, such as fuel costs. Avoiding these costs can, depending on the economics of a specific generator, to some degree reduce the financial impact of curtailment, especially if the generator's capital costs are included in a utility's rate base.

Curtailment may result in available energy being wasted because solar and wind operators have zero variable cost (which may not be true to the same extent for fossil generation units which can simply reduce the amount of fuel that is being used). With wind generation, in particular, it may also take some time for a wind farm to become fully operational following curtailment. As such, until the time that the wind farm is fully operational, the wind farm may not be operating with optimum efficiency and/or may not be able to provide power to the grid.

SUMMARY

In an example, a system includes a first set of computing components located in a first region and a second set of computing components located in a second region. The first region is positioned proximate a generation station control system associated with a generation station. The second region is positioned remotely from the generation station control system. The second set of computing components is configured to receive behind-the-meter (BTM) power, and each computing component of the second set of computing components is configured to adjust power consumption during operation. The system also includes a control system configured to monitor a set of parameters. The set of parameters include BTM power availability at the second set of computing components. The control system is also configured to adjust power consumption at one or more computing components of the second set of computing components based on the set of parameters.

In another example, a method includes monitoring, by a control system, a set of parameters. The set of parameters are associated with a first set of computing components and a second set of computing components. The first set of computing components is located in a first region and the second set of computing components is located in a second region. The first region is positioned proximate a generation station control system associated with a generation station and the second region is positioned remotely from the generation station control system. Each computing component of the second set of computing components is configured to adjust power consumption during operation. The method also includes adjusting, by the control system, power consumption at one or more computing components of the second set of computing components based on the set of parameters.

In yet another example, a non-transitory computer-readable medium is configured to store instructions that, when executed by a computing system, cause the computing system to perform operations. The operations include monitoring a set of parameters. The set of parameters are associated with a first set of computing components and a second set of computing components. The first set of computing components is located in a first region and the second set of computing components is located in a second region. The first region is positioned proximate a generation station control system associated with a generation station and the second region is positioned remotely from the generation station control system. Each computing component of the second set of computing components is configured to adjust power consumption during operation. The operations also include adjusting power consumption at one or more computing components of the second set of computing components based on the set of parameters.

Other aspects of the present invention will be apparent from the following description and claims.

DETAILED DESCRIPTION

Figure 1:
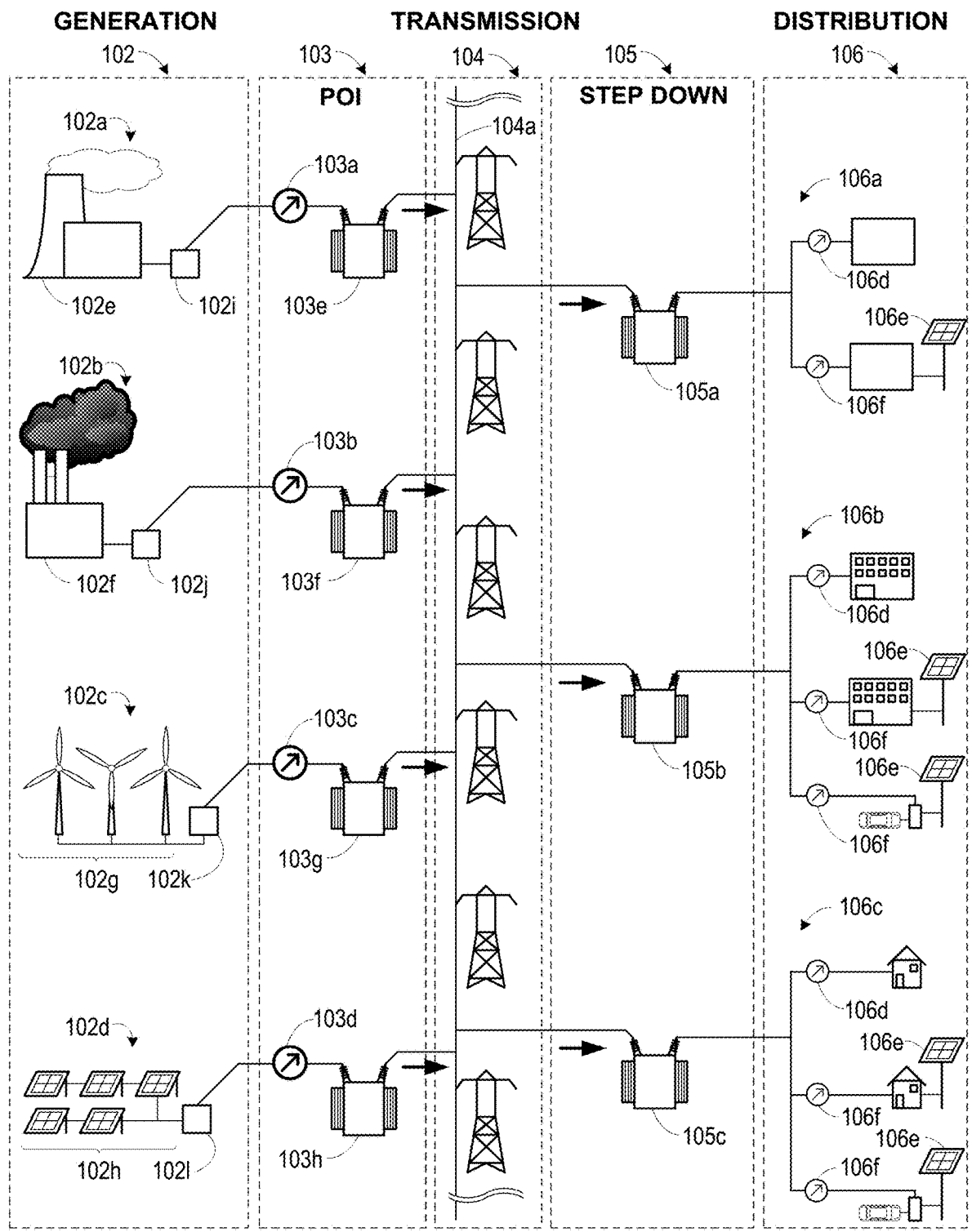
FIG. 1 shows a typical electrical grid.

Disclosed examples will now be described more fully hereinafter with reference to the accompanying drawings, in which some, but not all of the disclosed examples are shown.

Different examples may be described and should not be construed as limited to the examples set forth herein.

As discussed above, the market price paid to generation stations for supplying power to the grid often fluctuates due to various factors, including the need to maintain grid stability and based on current demand and usage by connected loads in distribution networks. Due to these factors, situations can arise where generation stations are offered substantially lower prices to deter an over-supply of power to the grid. Although these situations typically exist temporarily, generation stations are sometimes forced to either sell power to the grid at the much lower prices or adjust operations to decrease the amount of power generated. Furthermore, some situations may even require generation stations to incur costs in order to offload power to the grid or to shut down generation temporarily.

The volatility in the market price offered for power supplied to the grid can be especially problematic for some types of generation stations. In particular, wind farms and some other types of renewable resource power producers may lack the ability to quickly adjust operations in response to changes in the market price offered for supplying power to the grid. As a result, power generation and management at some generation stations can be inefficient, which can frequently result in power being sold to the grid at low or negative prices. In some situations, a generation station may even opt to halt power generation temporarily to avoid such unfavorable pricing. As such, the time required to halt and to restart the power generation at a generation station can reduce the generation station's ability to take advantage of rising market prices for power supplied to the grid.

Example embodiments provided herein aim to assist generation stations in managing power generation operations and avoid unfavorable power pricing situations like those described above. In particular, example embodiments may involve providing a load that is positioned behind-the-meter ("BTM") and enabling the load to utilize power received behind-the-meter at a generation station in a timely manner.

For purposes herein, a generation station is considered to be configured for the primary purpose of generating utility-scale power for supply to the electrical grid (e.g., a Wide Area Synchronous Grid or a North American Interconnect).

In one embodiment, equipment located behind-the-meter ("BTM equipment") is equipment that is electrically connected to a generation station's power generation equipment behind (i.e., prior to) the generation station's POI with an electrical grid.

In one embodiment, behind-the-meter power ("BTM power") is electrical power produced by a generation station's power generation equipment and utilized behind (i.e., prior to) the generation station's POI with an electrical grid.

In another embodiment, equipment may be considered behind-the-meter if it is electrically connected to a generation station that is subject to metering by a utility-scale generation-side meter (e.g., settlement meter), and the BTM equipment receives power from the generation station, but the power received by the BTM equipment from the generation station has not passed through the utility-scale generation-side meter. In one embodiment, the utility-scale generation-side meter for the generation station is located at the generation station's POI. In another embodiment, the utility-scale generation-side meter for the generation station is at a location other than the POI for the generation station—for example, a substation between the generation station and the generation station's POI.

In another embodiment, power may be considered behind-the-meter if it is electrical power produced at a generation station that is subject to metering by a utility-scale generation-side meter (e.g., settlement meter), and the BTM power is utilized before being metered at the utility-scale generation-side meter. In one embodiment, the utility-scale generation-side meter for the generation station is located at the generation station's POI. In another embodiment, the utility-scale generation-side meter for the generation station is at a location other than the POI for the generation station—for example, a substation between the generation station and the generation station's POI.

In another embodiment, equipment may be considered behind-the-meter if it is electrically connected to a generation station that supplies power to a grid, and the BTM equipment receives power from the generation station that is not subject to T&D charges, but power received from the grid that is supplied by the generation station is subject to T&D charges.

In another embodiment, power may be considered behind-the-meter if it is electrical power produced at a generation station that supplies power to a grid, and the BTM power is not subject to T&D charges before being used by electrical equipment, but power received from the grid that is supplied by the generation station is subject to T&D charges.

In another embodiment, equipment may be considered behind-the-meter if the BTM equipment receives power generated from the generation station and that received power is not routed through the electrical grid before being delivered to the BTM equipment.

In another embodiment, power may be considered behind-the-meter if it is electrical power produced at a generation station, and BTM equipment receives that generated power, and that generated power received by the BTM equipment is not routed through the electrical grid before being delivered to the BTM equipment.

For purposes herein, BTM equipment may also be referred to as a behind-the-meter load ("BTM load") when the BTM equipment is actively consuming BTM power.

Beneficially, where BTM power is not subject to traditional T&D costs, a wind farm or other type of generation station can be connected to BTM loads which can allow the generation station to selectively avoid the adverse or less-than optimal cost structure occasionally associated with supplying power to the grid by shunting generated power to the BTM load.

An arrangement that positions and connects a BTM load to a generation station can offer several advantages. In such arrangements, the generation station may selectively choose whether to supply power to the grid or to the BTM load, or both. The operator of a BTM load may pay to utilize BTM power at a cost less than that charged through a consumer meter (e.g., 106d, 106f) located at a distribution network (e.g., 106a-c) receiving power from the grid. The operator of a BTM load may additionally or alternatively charge less than the market rate to consume excess power generated at the generation station during curtailment. As a result, the generation station may direct generated power based on the "best" price that the generation station can receive during a given time frame, and/or the lowest cost the generation station may incur from negative market pricing during curtailment. The "best" price may be the highest price that the generation station may receive for its generated power during a given duration, but can also differ within embodiments and may depend on various factors, such as a prior PPA. In one example, by having a behind-the-meter option available, a generation station may transition from supplying all generated power to the grid to supplying some or all generated power to one or more BTM loads when the market price paid for power by grid operators drops below a predefined threshold (e.g., the price that the operator of the BTM load is willing to pay the generation station for power). Thus, by having an alternative option for power consumption (i.e., one or more BTM loads), the generation station can selectively utilize the different options to maximize the price received for generated power. In addition, the generation station may also utilize a BTM load to avoid or reduce the economic impact in situations when supplying power to the grid would result in the generation station incurring a net cost.

Providing BTM power to a load can also benefit the BTM load operator. A BTM load may be able to receive and utilize BTM power received from the generation station at a cost that is lower than the cost for power from the grid (e.g., at a customer meter 106d, 106f). This is primarily due to avoidance in T&D costs and the market effects of curtailment. As indicated above, the generation station may be willing to divert generated power to the BTM load rather than supplying the grid due to changing market conditions, or during maintenance periods, or for other non-market conditions. Furthermore, in some situations, the BTM load may even be able to obtain and utilize BTM power from a generation station at no cost or even at negative pricing since the generation station may be receiving tax credits (e.g., Production Tax Credits) for produced wind or is slow to self-curtail.

Another example of cost-effective use of BTM power is when the generation station 202 is selling power to the grid at a negative price that is offset by a production tax credit. In certain circumstances, the value of the production tax credit may exceed the price the generation station 202 would have to pay to the grid power to offload generation's station 202 generated power. Advantageously, one or more flexible datacenters 220 may take the generated power behind-the-meter, thereby allowing the generation station 202 to produce and obtain the production tax credit, while selling less power to the grid at the negative price.

Another example of cost-effective behind-the-meter power is when the generation station 202 is selling power to the grid at a negative price because the grid is oversupplied and/or the generation station 202 is instructed to stand down and stop producing altogether. A grid operator may select and direct certain generation stations to go offline and stop supplying power to the grid. Advantageously, one or more flexible datacenters may be used to take power behind-the-meter, thereby allowing the generation station 202 to stop supplying power to the grid, but still stay online and make productive use of the power generated.

Another example of beneficial behind-the-meter power use is when the generation station 202 is producing power that is, with reference to the grid, unstable, out of phase, or at the wrong frequency, or the grid is already unstable, out of phase, or at the wrong frequency. A grid operator may select certain generation stations to go either offline and stop producing power, or to take corrective action with respect to the grid power stability, phase, or frequency. Advantageously, one or more flexible datacenters 220 may be used to selectively consume power behind-the-meter, thereby allowing the generation station 202 to stop providing power to the grid and/or provide corrective feedback to the grid.

Another example of beneficial behind-the-meter power use is that cost-effective behind-the-meter power availability may occur when the generation station 202 is starting up or testing. Individual equipment in the power generation equipment 210 may be routinely offline for installation, maintenance, and/or service and the individual units must be tested prior to coming online as part of overall power generation equipment 210. During such testing or maintenance time, one or more flexible datacenters may be intermittently powered by the one or more units of the power generation equipment 210 that are offline from the overall power generation equipment 210.

Another example of beneficial behind-the-meter power use is that datacenter control systems at the flexible datacenters 220 may quickly ramp up and ramp down power consumption by computing systems in the flexible datacenters 220 based on power availability from the generation station 202. For instance, if the grid requires additional power and signals the demand via a higher local price for power, the generation station 202 can supply the grid with power nearly instantly by having active flexible datacenters 220 quickly ramp down and turn off computing systems (or switch to a stored energy source), thereby reducing an active BTM load.

Another example of beneficial behind-the-meter power use is in new photovoltaic generation stations 202. For example, it is common to design and build new photovoltaic generation stations with a surplus of power capacity to account for degradation in efficiency of the photovoltaic panels over the life of the generation stations. Excess power availability at the generation station can occur when there is excess local power generation and/or low grid demand. In high incident sunlight situations, a photovoltaic generation station 202 may generate more power than the intended capacity of generation station 202. In such situations, a photovoltaic generation station 202 may have to take steps to protect its equipment from damage, which may include taking one or more photovoltaic panels offline or shunting their voltage to dummy loads or the ground. Advantageously, one or more flexible datacenters (e.g., the flexible datacenters 220) may take power behind-the-meter at the Generations Station 202, thereby allowing the generation station 202 to operate the power generation equipment 210 within operating ranges while the flexible datacenters 220 receive BTM power without transmission or distribution costs.

Thus, for at least the reasons described herein, arrangements that involves providing a BTM load as an alternative option for a generation station to direct its generated power to can serve as a mutually beneficial relationship in which both the generation station and the BTM load can economically benefit. The above-noted examples of beneficial use of BTM power are merely exemplary and are not intended to limit the scope of what one of ordinary skill in the art would recognize as benefits to unutilized BTM power capacity, BTM power pricing, or BTM power consumption.

Within example embodiments described herein, various types of utility-scale power producers may operate as generation stations 202 that are capable of supplying power to one or more loads behind-the-meter. For instance, renewable energy sources (e.g., wind, solar, hydroelectric, wave, water current, tidal), fossil fuel power generation sources (coal, natural gas), and other types of power producers (e.g., nuclear power) may be positioned in an arrangement that enables the intermittent supply of generated power behind-the-meter to one or more BTM loads. One of ordinary skill in the art will recognize that the generation station 202 may vary based on an application or design in accordance with one or more example embodiments.

In addition, the particular arrangement (e.g., connections) between the generation station and one or more BTM loads can vary within examples. In one embodiment, a generation station may be positioned in an arrangement wherein the generation station selectively supplies power to the grid and/or to one or more BTM loads. As such, power cost-analysis and other factors (e.g., predicted weather conditions, contractual obligations, etc.) may be used by the generation station, a BTM load control system, a remote master control system, or some other system or enterprise, to selectively output power to either the grid or to one or more BTM loads in a manner that maximizes revenue to the generation station. In such an arrangement, the generation station may also be able to supply both the grid and one or more BTM loads simultaneously. In some instances, the arrangement may be configured to allow dynamic manipulation of the percentage of the overall generated power that is supplied to each option at a given time. For example, in some time periods, the generation station may supply no power to the BTM load.

In addition, the type of loads that are positioned behind-the-meter can vary within example embodiments. In general, a load that is behind-the-meter may correspond to any type of load capable of receiving and utilizing power behind-the-meter from a generation station. Some examples of loads include, but are not limited to, datacenters and electric vehicle (EV) charging stations.

Preferred BTM loads are loads that can be subject to intermittent power supply because BTM power may be available intermittently. In some instances, the generation station may generate power intermittently. For example, wind power station 102c and/or photovoltaic power station 102d may only generate power when resource are available or favorable. Additionally or alternatively, BTM power availability at a generation station may only be available intermittently due to power market fluctuations, power system conditions (e.g., power factor fluctuation or generation station startup and testing), and/or operational directives from grid operators or generation station operators.

Some example embodiments of BTM loads described herein involve using one or more computing systems to serve as a BTM load at a generation station. In particular, the computing system or computing systems may receive power behind-the-meter from the generation station to perform various computational operations, such as processing or storing information, performing calculations, mining for cryptocurrencies, supporting blockchain ledgers, and/or executing applications, etc. Multiple computing systems positioned behind-the-meter may operate as part of a "flexible" datacenter that is configured to operate only intermittently and to receive and utilize BTM power to carry out various computational operations similar to a traditional datacenter. In particular, the flexible datacenter may include computing systems and other components (e.g., support infrastructure, a control system) configured to utilize BTM power from one or more generation stations. The flexible datacenter may be configured to use particular load ramping abilities (e.g., quickly increase or decrease power usage) to effectively operate during intermittent periods of time when power is available from a generation station and supplied to the flexible datacenter behind-the-meter, such as during situations when supplying generated power to the grid is not favorable for the generation station. In some instances, the amount of power consumed by the computing systems at a flexible datacenter can be ramped up and down quickly, and potentially with high granularity (i.e., the load can be changed in small increments if desired). This may be done based on monitored power system conditions or other information analyses as discussed herein. As recited above, this can enable a generation station to avoid negative power market pricing and to respond quickly to grid directives. And by extension, the flexible datacenter may obtain BTM power at a price lower than the cost for power from the grid.

Various types of computing systems can provide granular behind-the-meter ramping. Preferably, the computing systems utilizing BTM power is utilized to perform computational tasks that are immune to, or not substantially hindered by, frequent interruptions or slow-downs in processing as the computing systems ramp down or up. In some embodiments, a control system may be used to activate or de-activate one or more computing systems in an array of computing systems sited behind the meter. For example, the control system may provide control instructions to one or more blockchain miners (e.g., a group of blockchain miners), including instructions for powering on or off, adjusting frequency of computing systems performing operations (e.g., adjusting the processing frequency), adjusting the quantity of operations being performed, and when to operate within a low power mode (if available).

Within examples, a control system may correspond to a specialized computing system or may be a computing system within a flexible datacenter serving in the role of the control system. The location of the control system can vary within examples as well. For instance, the control system may be located at a flexible datacenter or physically separate from the flexible datacenter. In some examples, the control system may be part of a network of control systems that manage computational operations, power consumption, and other aspects of a fleet of flexible datacenters.

Some embodiments may involve using one or more control systems to direct time-insensitive (e.g., interruptible) computational tasks to computational hardware, such as central processing units (CPUs) and graphics processing units (GPUs), sited behind the meter, while other hardware is sited in front of the meter (i.e., consuming metered grid power via a customer meter (e.g., 106d, 106f) and possibly remote from the behind-the-meter hardware. As such, parallel computing processes, such as Monte Carlo simulations, batch processing of financial transactions, graphics rendering, machine learning, neural network processing, queued operations, and oil and gas field simulation models, are good candidates for such interruptible computational operations.

Figure 2:
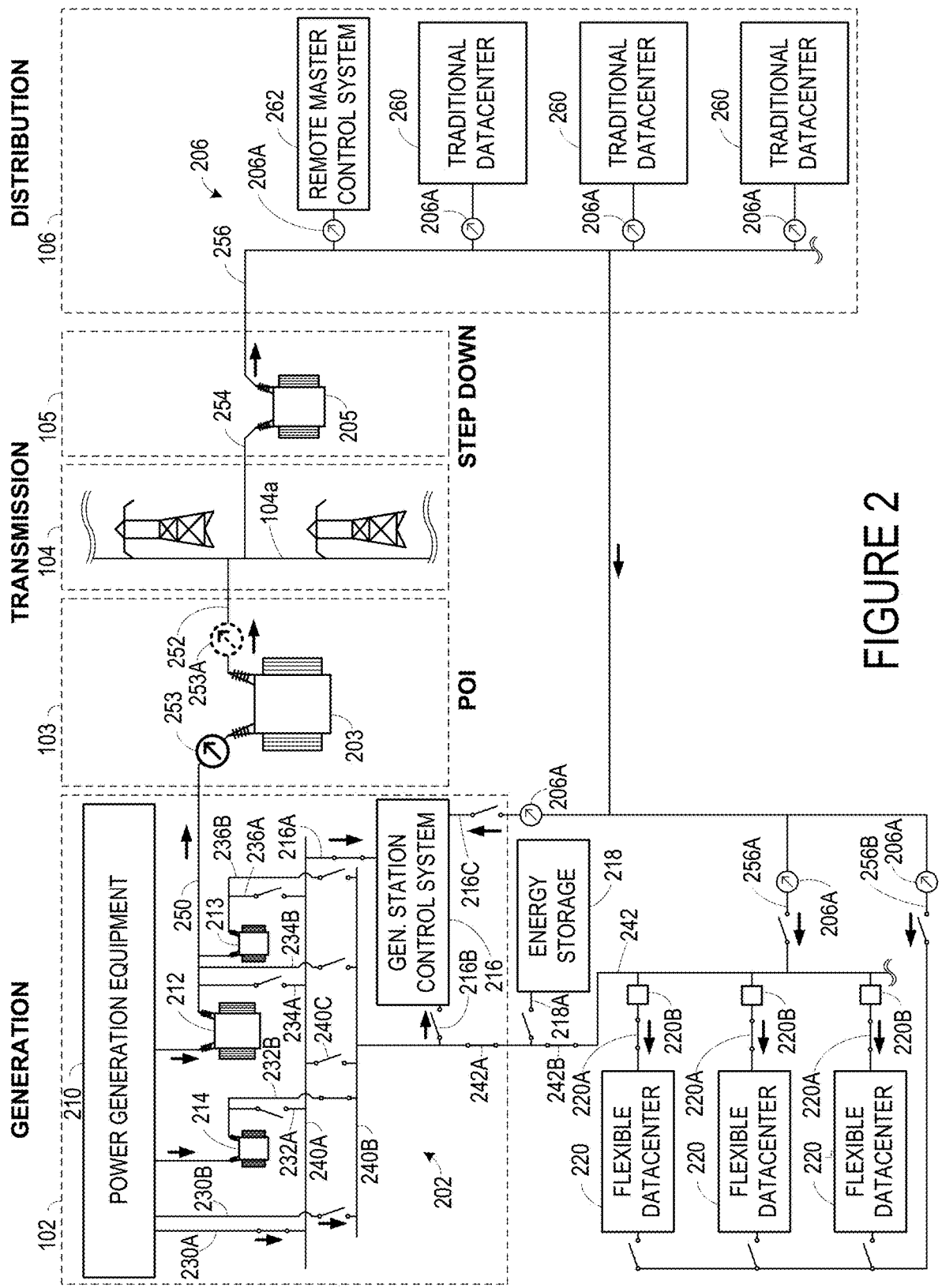
FIG. 2 shows a behind-the-meter arrangement, including one or more flexible datacenters, according to one or more example embodiments.

FIG. 2 shows a behind-the-meter arrangement, including one or more flexible datacenters, according to one or more example embodiments. Dark arrows illustrate a typical power delivery direction. Consistent with FIG. 1, the arrangement illustrates a generation station 202 in the generation segment 102 of a Wide-Area Synchronous Grid. The generation station 202 supplies utility-scale power (typically >50 MW) via a generation power connection 250 to the Point of Interconnection 103 between the generation station 202 and the rest of the grid. Typically, the power supplied on connection 250 may be at 34.5 kV AC, but it may be higher or lower. Depending on the voltage at connection 250 and the voltage at transmission lines 104a, a transformer system 203 may step up the power supplied from the generation station 202 to high voltage (e.g., 115 kV+AC) for transmission over connection 252 and onto transmission lines 104a of transmission segment 104. Grid power carried on the transmission segment 104 may be from generation station 202 as well as other generation stations (not shown). Also consistent with FIG. 1, grid power is consumed at one or more distribution networks, including example distribution network 206. Grid power may be taken from the transmission lines 104a via connector 254 and stepped down (using a step-down transformer 205) to distribution network voltages (e.g., typically 4 kV to 26 kV AC) and sent into the distribution networks, such as distribution network 206 via distribution line 256. The power on distribution line 256 may be further stepped down (not shown) before entering individual consumer facilities such as a remote master control system 262 and/or traditional datacenters 260 via customer meters 206A, which may correspond to customer meters 106d in FIG. 1, or customer meters 106f in FIG. 1 if the respective consumer facility includes a local customer power system, such as 106e (not shown in FIG. 2).

Consistent with FIG. 1, power entering the grid from generation station 202 is metered by a utility-scale generation-side meter. A utility-scale generation-side meter 253 is shown on the low side of transformer system 203 and an alternative location is shown as 253A on the high side of transformer system 203. Both locations may be considered settlement metering points for the generation station 202 at the POI 103. Alternatively, a utility-scale generation-side meter for the generation station 202 may be located at another location consistent with the descriptions of such meters provided herein.

Generation station 202 includes power generation equipment 210, which may include, as examples, wind turbines and/or photovoltaic panels. Power generation equipment 210 may further include other electrical equipment, including but not limited to switches, busses, collectors, inverters, and power unit transformers (e.g., transformers in wind turbines).

As illustrated in FIG. 2, generation station 202 is configured to connect with BTM equipment which may function as BTM loads. In the illustrated embodiment of FIG. 2, the BTM equipment includes flexible datacenters 220. Various configurations to supply BTM power to flexible datacenters 220 within the arrangement of FIG. 2 are described herein.

In one configuration, generated power may travel from the power generation equipment 210 over one or more connectors 230A, 230B to one or more electrical busses 240A, 240B, respectively. Each of the connectors 230A, 230B may be a switched connector such that power may be routed independently to 240A and/or 240B. For illustrative purposes only, connector 230B is shown with an open switch, and connector 230A is shown with a closed switch, but either or both may be reversed in some embodiments. Aspects of this configuration can be used in various embodiments when BTM power is supplied without significant power conversion to BTM loads.

In various configurations, the busses 240A and 240B may be separated by an open switch 240C or combined into a common bus by a closed switch 240C.

In another configuration, generated power may travel from the power generation equipment 210 to the high side of a local step-down transformer 214. The generated power may then travel from the low side of the local step-down transformer 214 over one or more connectors 232A, 232B to the one or more electrical busses 240A, 240B, respectively. Each of the connectors 232A, 232B may be a switched connector such that power may be routed independently to 240A and/or 240B. For illustrative purposes only, connector 232A is shown with an open switch, and connector 232B is shown with a closed switch, but either or both may be reversed in some embodiments. Aspects of this configuration can be used when it is preferable to connect BTM power to the power generation equipment 210, but the generated power must be stepped down prior to use at the BTM loads.

In another configuration, generated power may travel from the power generation equipment 210 to the low side of a local step-up transformer 212. The generated power may then travel from the high side of the local step-up transformer 212 over one or more connectors 234A, 234B to the one or more electrical busses 240A, 240B, respectively. Each of the connectors 234A, 234B may be a switched connector such that power may be routed independently to 240A and/or 240B. For illustrative purposes only, both connectors 234A, 234B are shown with open switches, but either or both may be closed in some embodiments. Aspects of this configuration can be used when it is preferable to connect BTM power to the outbound connector 250 or the high side of the local step-up transformer 212.

In another configuration, generated power may travel from the power generation equipment 210 to the low side of the local step-up transformer 212. The generated power may then travel from the high side of the local step-up transformer 212 to the high side of local step-down transformer 213. The generated power may then travel from the low side of the local step-down transformer 213 over one or more connectors 236A, 236B to the one or more electrical busses 240A, 240B, respectively. Each of the connectors 236A, 2346 may be a switched connector such that power may be routed independently to 240A and/or 240B. For illustrative purposes only, both connectors 236A, 236B are shown with open switches, but either or both may be closed in some embodiments. Aspects of this configuration can be used when it is preferable to connect BTM power to the outbound connector 250 or the high side of the local step-up transformer 212, but the power must be stepped down prior to use at the BTM loads.

In one embodiment, power generated at the generation station 202 may be used to power a generation station control system 216 located at the generation station 202, when power is available. The generation station control system 216 may typically control the operation of the generation station 202. Generated power used at the generation station control system 216 may be supplied from bus 240A via connector 216A and/or from bus 240B via connector 216B. Each of the connectors 216A, 216B may be a switched connector such that power may be routed independently to 240A and/or 240B. While the generation station control system 216 can consume BTM power when powered via bus 240A or bus 240B, the BTM power taken by generation station control system 216 is insignificant in terms of rendering an economic benefit. Further, the generation station control system 216 is not configured to operate intermittently, as it generally must remain always on. Further still, the generation station control system 216 does not have the ability to quickly ramp a BTM load up or down.

In another embodiment, grid power may alternatively or additionally be used to power the generation station control system 216. As illustrated here, metered grid power from a distribution network, such as distribution network 206 for simplicity of illustration purposes only, may be used to power generation station control system 216 over connector 216C. Connector 216C may be a switched connector so that metered grid power to the generation station control system 216 can be switched on or off as needed. More commonly, metered grid power would be delivered to the generation station control system 216 via a separate distribution network (not shown), and also over a switched connector. Any such grid power delivered to the generation station control system 216 is metered by a customer meter 206A and subject to T&D costs.

In another embodiment, when power generation equipment 210 is in an idle or off state and not generating power, grid power may backfeed into generation station 202 through POI 103 and such grid power may power the generation station control system 216.

In some configurations, an energy storage system 218 may be connected to the generation station 202 via connector 218A, which may be a switched connector. For illustrative purposes only, connector 218A is shown with an open switch but in some embodiments it may be closed. The energy storage system 218 may be connected to bus 240A and/or bus 240B and store energy produced by the power generation equipment 210. The energy storage system may also be isolated from generation station 202 by switch 242A. In times of need, such as when the power generation equipment in an idle or off state and not generating power, the energy storage system may feed power to, for example, the flexible datacenters 220. The energy storage system may also be isolated from the flexible datacenters 220 by switch 242B.

In a preferred embodiment, as illustrated, power generation equipment 210 supplies BTM power via connector 242 to flexible datacenters 220. The BTM power used by the flexible datacenters 220 was generated by the generation station 202 and did not pass through the POI 103 or utility-scale generation-side meter 253, and is not subject to T&D charges. Power received at the flexible datacenters 220 may be received through respective power input connectors 220A. Each of the respective connectors 220A may be switched connector that can electrically isolate the respective flexible datacenter 220 from the connector 242. Power equipment 220B may be arranged between the flexible datacenters 220 and the connector 242. The power equipment 220B may include, but is not limited to, power conditioners, unit transformers, inverters, and isolation equipment. As illustrated, each flexible datacenter 220 may be served by a respective power equipment 220B. However, in another embodiment, one power equipment 220B may serve multiple flexible datacenter 220.

In one embodiment, flexible datacenters 220 may be considered BTM equipment located behind-the-meter and electrically connected to the power generation equipment 210 behind (i.e., prior to) the generation station's POI 103 with the rest of the electrical grid.

In one embodiment, BTM power produced by the power generation equipment 210 is utilized by the flexible datacenters 220 behind (i.e., prior to) the generation station's POI with an electrical grid.

In another embodiment, flexible datacenters 220 may be considered BTM equipment located behind-the-meter as the flexible datacenters 220 are electrically connected to the generation station 202, and generation station 202 is subject to metering by utility-scale generation-side meter 253 (or 253A, or another utility-scale generation-side meter), and the flexible datacenters 220 receive power from the generation station 202, but the power received by the flexible datacenters 220 from the generation station 202 has not passed through a utility-scale generation-side meter. In this embodiment, the utility-scale generation-side meter 253 (or 253A) for the generation station 202 is located at the generation station's 202 POI 103. In another embodiment, the utility-scale generation-side meter for the generation station 202 is at a location other than the POI for the generation station 202—for example, a substation (not shown) between the generation station 202 and the generation station's POI 103.

In another embodiment, power from the generation station 202 is supplied to the flexible datacenters 220 as BTM power, where power produced at the generation station 202 is subject to metering by utility-scale generation-side meter 253 (or 253A, or another utility-scale generation-side meter), but the BTM power supplied to the flexible datacenters 220 is utilized before being metered at the utility-scale generation-side meter 253 (or 253A, or another utility-scale generation-side meter). In this embodiment, the utility-scale generation-side meter 253 (or 253A) for the generation station 202 is located at the generation station's 202 POI 103. In another embodiment, the utility-scale generation-side meter for the generation station 202 is at a location other than the POI for the generation station 202—for example, a substation (not shown) between the generation station 202 and the generation station's POI 103.

In another embodiment, flexible datacenters 220 may be considered BTM equipment located behind-the-meter as they are electrically connected to the generation station 202 that supplies power to the grid, and the flexible datacenters 220 receive power from the generation station 202 that is not subject to T&D charges, but power otherwise received from the grid that is supplied by the generation station 202 is subject to T&D charges.

In another embodiment, power from the generation station 202 is supplied to the flexible datacenters 220 as BTM power, where electrical power is generated at the generation station 202 that supplies power to a grid, and the generated power is not subject to T&D charges before being used by flexible datacenters 220, but power otherwise received from the connected grid is subject to T&D charges.

In another embodiment, flexible datacenters 220 may be considered BTM equipment located behind-the-meter because they receive power generated from the generation station 202 intended for the grid, and that received power is not routed through the electrical grid before being delivered to the flexible datacenters 220.

In another embodiment, power from the generation station 202 is supplied to the flexible datacenters 220 as BTM power, where electrical power is generated at the generation station 202 for distribution to the grid, and the flexible datacenters 220 receive that power, and that received power is not routed through the electrical grid before being delivered to the flexible datacenters 220.

In another embodiment, metered grid power may alternatively or additionally be used to power one or more of the flexible datacenters 220, or a portion within one or more of the flexible datacenters 220. As illustrated here for simplicity, metered grid power from a distribution network, such as distribution network 206, may be used to power one or more flexible datacenters 220 over connector 256A and/or 256B. Each of connector 256A and/or 256B may be a switched connector so that metered grid power to the flexible datacenters 220 can be switched on or off as needed. More commonly, metered grid power would be delivered to the flexible datacenters 220 via a separate distribution network (not shown), and also over switched connectors. Any such grid power delivered to the flexible datacenters 220 is metered by customer meters 206A and subject to T&D costs. In one embodiment, connector 256B may supply metered grid power to a portion of one or more flexible datacenters 220. For example, connector 256B may supply metered grid power to control and/or communication systems for the flexible datacenters 220 that need constant power and cannot be subject to intermittent BTM power. Connector 242 may supply solely BTM power from the generation station 202 to high power demand computing systems within the flexible datacenters 220, in which case at least a portion of each flexible datacenters 220 so connected is operating as a BTM load. In another embodiment, connector 256A and/or 256B may supply all power used at one or more of the flexible datacenters 220, in which case each of the flexible datacenters 220 so connected would not be operating as a BTM load.

In another embodiment, when power generation equipment 210 is in an idle or off state and not generating power, grid power may backfeed into generation station 202 through POI 103 and such grid power may power the flexible datacenters 220.

The flexible datacenters 220 are shown in an example arrangement relative to the generation station 202. Particularly, generated power from the generation station 202 may be supplied to the flexible datacenters 220 through a series of connectors and/or busses (e.g., 232B, 240B, 242, 220A). As illustrated, in other embodiments, connectors between the power generation equipment 210 and other components may be switched open or closed, allowing other pathways for power transfer between the power generation equipment 210 and components, including the flexible datacenters 220. Additionally, the connector arrangement shown is illustrative only and other circuit arrangements are contemplated within the scope of supplying BTM power to a BTM load at generation station 202. For example, there may be more or fewer transformers, or one or more of transformers 212, 213, 214 may be transformer systems with multiple steppings and/or may include additional power equipment including but not limited to power conditioners, filters, switches, inverters, and/or AC/DC-DC/AC isolators. As another example, metered grid power connections to flexible datacenters 220 are shown via both 256A and 256B; however, a single connection may connect one or more flexible datacenters 220 (or power equipment 220B) to metered grid power and the one or more flexible datacenters 220 (or power equipment 220B) may include switching apparatus to direct BTM power and/or metered grid power to control systems, communication systems, and/or computing systems as desired.

In some examples, BTM power may arrive at the flexible datacenters 220 in a three-phase AC format. As such, power equipment (e.g., power equipment 220B) at one or more of the flexible datacenters 220 may enable each flexible datacenter 220 to use one or more phases of the power. For instance, the flexible datacenters 220 may utilize power equipment (e.g., power equipment 220B, or alternatively or additionally power equipment that is part of the flexible datacenter 220) to convert BTM power received from the generation station 202 for use at computing systems at each flexible datacenter 220. In other examples, the BTM power may arrive at one or more of the flexible datacenters 220 as DC power. As such, the flexible datacenters 220 may use the DC power to power computing systems. In some such examples, the DC power may be routed through a DC-to-DC converter that is part of power equipment 220B and/or flexibles datacenter 220.

In some configurations, a flexible datacenter 220 may be arranged to only have access to power received behind-the-meter from a generation station 202. In the arrangement of FIG. 2, the flexible datacenters 220 may be arranged only with a connection to the generation station 202 and depend solely on power received behind-the-meter from the generation station 202. Alternatively or additionally, the flexible datacenters 220 may receive power from energy storage system 218.

In some configurations, one or more of the flexible datacenters 220 can be arranged to have connections to multiple sources that are capable of supplying power to a flexible datacenter 220. To illustrate a first example, the flexible datacenters 220 are shown connected to connector 242, which can be connected or disconnected via switches to the energy storage system 218 via connector 218A, the generation station 202 via bus 240B, and grid power via metered connector 256A. In one embodiment, the flexible datacenters 220 may selectively use power received behind-the-meter from the generation station 202, stored power supplied by the energy storage system 218, and/or grid power. For instance, flexible datacenters 220 may use power stored in the energy storage system 218 when costs for using power supplied behind-the-meter from the generation station 202 are disadvantageous. By having access to the energy storage system 218 available, the flexible datacenters 220 may use the stored power and allow the generation station 202 to subsequently refill the energy storage system 218 when cost for power behind-the-meter is low. Alternatively, the flexible datacenters 220 may use power from multiple sources simultaneously to power different components (e.g., a first set and a second set of computing systems). Thus, the flexible datacenters 220 may leverage the multiple connections in a manner that can reduce the cost for power used by the computing systems at the flexible datacenters 220. The flexible datacenters 220 control system or the remote master control system 262 may monitor power conditions and other factors to determine whether the flexible datacenters 220 should use power from either the generation station 202, grid power, the energy storage system 218, none of the sources, or a subset of sources during a given time range. Other arrangements are possible as well. For example, the arrangement of FIG. 2 illustrates each flexible datacenter 220 as connected via a single connector 242 to energy storage system 218, generation station 202, and metered grid power via 256A. However, one or more flexible datacenters 220 may have independent switched connections to each energy source, allowing the one or more flexible datacenters 220 to operate from different energy sources than other flexible datacenters 220 at the same time.

The selection of which power source to use at a flexible datacenter (e.g., the flexible datacenters 220) or another type of BTM load can change based on various factors, such as the cost and availability of power from both sources, the type of computing systems using the power at the flexible datacenters 220 (e.g., some systems may require a reliable source of power for a long period), the nature of the computational operations being performed at the flexible datacenters 220 (e.g., a high priority task may require immediate completion regardless of cost), and temperature and weather conditions, among other possible factors. As such, a datacenter control system at the flexible datacenters 220, the remote master control system 262, or another entity (e.g., an operator at the generation station 202) may also influence and/or determine the source of power that the flexible datacenters 220 use at a given time to complete computational operations.

In some example embodiments, the flexible datacenters 220 may use power from the different sources to serve different purposes. For example, the flexible datacenters 220 may use metered power from grid power to power one or more systems at the flexible datacenters 220 that are configured to be always-on (or almost always on), such as a control and/or communication system and/or one or more computing systems (e.g., a set of computing systems performing highly important computational operations). The flexible datacenters 220 may use BTM power to power other components within the flexible datacenters 220, such as one or more computing systems that perform less critical computational operations.

In some examples, one or more flexible datacenters 220 may be deployed at the generation station 202. In other examples, flexible datacenters 220 may be deployed at a location geographically remote from the generation station 202, while still maintaining a BTM power connection to the generation station 202.

In another example arrangement, the generation station 202 may be connected to a first BTM load (e.g., a flexible datacenter 220) and may supply power to additional BTM loads via connections between the first BTM load and the additional BTM loads (e.g., a connection between a flexible datacenter 220 and another flexible datacenter 220).

The arrangement in FIG. 2, and components included therein, are for non-limiting illustration purposes and other arrangements are contemplated in examples. For instance, in another example embodiment, the arrangement of FIG. 2 may include more or fewer components, such as more BTM loads, different connections between power sources and loads, and/or a different number of datacenters. In addition, some examples may involve one or more components within the arrangement of FIG. 2 being combined or further divided.

Within the arrangement of FIG. 2, a control system, such as the remote master control system 262 or another component (e.g., a control system associated with the grid operator, the generation station control system 216, or a datacenter control system associated with a traditional datacenter or one or more flexible datacenters) may use information to efficiently manage various operations of some of the components within the arrangement of FIG. 2. For example, the remote master control system 262 or another component may manage distribution and execution of computational operations at one or more traditional datacenters 260 and/or flexible datacenters 220 via one or more information-processing algorithms. These algorithms may utilize past and current information in real-time to manage operations of the different components. These algorithms may also make some predictions based on past trends and information analysis. In some examples, multiple computing systems may operate as a network to process information.

Information used to make decisions may include economic and/or power-related information, such as monitored power system conditions. Monitored power system conditions may include one or more of excess power generation at a generation station 202, excess power at a generation station 202 that a connected grid cannot receive, power generation at a generation station 202 subject to economic curtailment, power generation at a generation station 202 subject to reliability curtailment, power generation at a generation station 202 subject to power factor correction, low power generation at a generation station 202, startup conditions at a generation station 202, transient power generation conditions at a generation station 202, or testing conditions where there is an economic advantage to using behind-the-meter power generation at a generation station 202. These different monitored power system conditions can be weighted differently during processing and analysis.

In some examples, the information can include the cost for power from available sources (e.g., BTM power at the generation station 202 versus metered grid power) to enable comparisons to be made which power source costs less. In some instances, the information may include historic prices for power to enable the remote master control system 262 or another system to predict potential future prices in similar situations (e.g., the cost of power tends to trend upwards for grid power during warmer weather and peak-use hours). The information may also indicate the availability of power from the various sources (e.g., BTM power at the generation station 262, the energy storage system 218 at the generation station 262, and/or metered grid power).

In addition, the information may also include other data, including information associated with operations at components within the arrangement. For instance, the information may include data associated with performance of operations at the flexible datacenters 220 and the traditional datacenters 260, such as the number of computational tasks currently being performed, the types of tasks being performed (e.g., type of computational operation, time-sensitivity, etc.), the number, types, and capabilities of available computing systems, the amount of computational tasks awaiting performance, and the types of computing systems at one or more datacenters, among others. The information may also include data specifying the conditions at one or more datacenters (e.g., whether or not the temperatures are in a desired range, the amount of power available within an energy storage system such as 218), the amount of computational tasks awaiting performance in the queue of one or more of the datacenters, and the identities of the entities associated with the computational operations at one or more of the datacenters. Entities associated with computational operations may be, for example, owners of the datacenters, customers who purchase computational time at the datacenters, or other entities.

The information used by the remote master control system 262 or another component may include data associated with the computational operations to be performed, such as deadlines, priorities (e.g., high vs. low priority tasks), cost to perform based on required computing systems, the optimal computing systems (e.g., CPU vs GPU vs ASIC; processing unit capabilities, speeds, or frequencies, or instructional sets executable by the processing units) for performing each requested computational task, and prices each entity (e.g., company) is willing to pay for computational operations to be performed or otherwise supported via computing systems at a traditional datacenter 260 or a flexible datacenter 220, among others. In addition, the information may also include other data (e.g., weather conditions at locations of datacenters or power sources, any emergencies associated with a datacenter or power source, or the current value of bids associated with an auction for computational tasks).

The information may be updated in-real time and used to make the different operational decisions within the arrangement of FIG. 2. For instance, the information may help a component (e.g., the remote master control system 262 or a control system at a flexible datacenter 220) determine when to ramp up or ramp down power use at a flexible datacenter 220 or when to switch one or more computing systems at a flexible datacenter 220 into a low power mode or to operate at a different frequency, among other operational adjustments. The information can additionally or alternatively help a component within the arrangement of FIG. 2 to determine when to transfer computational operations between computing systems or between datacenters based on various factors. In some instances, the information may also be used to determine when to temporarily stop performing a computational operation or when to perform a computational operation at multiple sites for redundancy or other reasons. The information may further be used to determine when to accept new computational operations from entities or when to temporarily suspend accepting new tasks to be performed due to lack of computing system availability.

The remote master control system 262 represents a computing system that is capable of obtaining, managing, and using the information described above to manage and oversee one or more operations within the arrangement of FIG. 2. As such, the remote master control system 262 may be one or more computing systems configured to process all, or a subset of, the information described above, such as power, environment, computational characterization, and economic factors to assist with the distribution and execution of computing operations among one or more datacenters. For instance, the remote master control system 262 may be configured to obtain and delegate computational operations among one or more datacenters based on a weighted analysis of a variety of factors, including one or more of the cost and availability of power, the types and availability of the computing systems at each datacenter, current and predicted weather conditions at the different locations of flexible datacenters (e.g., flexible datacenters 220) and generation stations (e.g., generation stations 202), levels of power storage available at one or more energy storage systems (e.g., energy storage system 218), and deadlines and other attributes associated with particular computational operations, among other possible factors. As such, the analysis of information performed by the remote master control system 262 may vary within examples. For instance, the remote master control system 262 may use real-time information to determine whether or not to route a computational operation to a particular flexible datacenter (e.g., a flexible datacenter 220) or to transition a computational operation between datacenters (e.g., from traditional datacenter 260 to a flexible datacenter 220).

As shown in FIG. 2, the generation station 202 may be able to supply power to the grid and/or BTM loads such as flexible datacenters 220. With such a configuration, the generation station 202 may selectively provide power to the BTM loads and/or the grid based on economic and power availability considerations. For example, the generation station 202 may supply power to the grid when the price paid for the power exceeds a particular threshold (e.g., the power price offered by operators of the flexible datacenters 220). In some instances, the operator of a flexible datacenter and the operator of a generation station capable of supplying BTM power to the flexible datacenter may utilize a predefined arrangement (e.g., a contract) that specifies a duration and/or price range when the generation station may supply power to the flexible datacenter.

The remote master control system 262 may be capable of directing one or more flexible datacenters 220 to ramp-up or ramp-down to target power consumption levels, and/or to control cooperative action of multiple flexible datacenters by determining how to power each individual flexible datacenter 220 in accordance with operational directives.

The configuration of the remote master control system 262 can vary within examples as further discussed with respect to FIGS. 2, 3, and 7-9. The remote master control system 262 may operate as a single computing system or may involve a network of computing systems. Preferably, the remote master control system 262 is implemented across one or more servers in a fault-tolerant operating environment that ensures continuous uptime and connectivity by virtue of its distributed nature. Alternatively, although the remote master control system 262 is shown as a physically separate component arrangement for FIG. 2, the remote master control system 262 may be combined with another component in other embodiments. To illustrate an example, the remote master control system 262 may operate as part of a flexible datacenter (e.g., a computing system or a datacenter control system of the flexible datacenter 220), including sharing components with a flexible datacenter, sharing power with a flexible datacenter, and/or being co-located with a flexible datacenter.

In addition, the remote master control system 262 may communicate with components within the arrangement of FIG. 2 using various communication technologies, including wired and wireless communication technologies. For instance, the remote master control system 262 may use wired (not illustrated) or wireless communication to communicate with datacenter control systems or other computing systems at the flexible datacenters 220 and the traditional datacenters 260. The remote master control system 262 may also communicate with entities inside or outside the arrangement of FIG. 2 and other components within the arrangement of FIG. 2 via wired or wireless communication. For instance, the remote master control system 262 may use wireless communication to obtain computational operations from entities seeking support for the computational operations at one or more datacenters in exchange for payment. The remote master control system 262 may communicate directly with the entities or may obtain the computational operations from the traditional datacenters 260. For instance, an entity may submit jobs (e.g., computational operations) to one or more traditional datacenters 260. The remote master control system 262 may determine that transferring one or more of the computational operations to a flexible datacenter 220 may better support the transferred computational operations. For example, the remote master control system 262 may determine that the transfer may enable the computational operations to be completed quicker and/or at a lower cost. In some examples, the remote master control system 262 may communicate with the entity to obtain approval prior to transferring the one or more computational operations.

The remote master control system 262 may also communicate with grid operators and/or an operator of generation station 202 to help determine power management strategies when distributing computational operations across the various datacenters. In addition, the remote master control system 262 may communicate with other sources, such as weather prediction systems, historical and current power price databases, and auction systems, etc.

In further examples, the remote master control system 262 or another computing system within the arrangement of FIG. 2 may use wired or wireless communication to submit bids within an auction that involves a bidder (e.g., the highest bid) obtaining computational operations or other tasks to be performed. Particularly, the remote master control system 262 may use the information discussed above to develop bids to obtain computing operations for performance at available computing systems at flexible datacenters (e.g., flexible datacenters 220).

In the example arrangement shown in FIG. 2, the flexible datacenters 220 represent example loads that can receive power behind-the-meter from the generation station 202. In such a configuration, the flexible datacenters 220 may obtain and utilize power behind-the-meter from the generation station 202 to perform various computational operations. Performance of a computational operation may involve one or more computing systems providing resources useful in the computational operation. For instance, the flexible datacenters 220 may include one or more computing systems configured to store information, perform calculations and/or parallel processes, perform simulations, mine cryptocurrencies, and execute applications, among other potential tasks. The computing systems can be specialized or generic and can be arranged at each flexible datacenter 220 in a variety of ways (e.g., straight configuration, zig-zag configuration) as further discussed with respect to FIGS. 6A, 6B. Furthermore, although the example arrangement illustrated in FIG. 2 shows configurations where flexible datacenters 220 serve as BTM loads, other types of loads can be used as BTM loads within examples.

The arrangement of FIG. 2 includes the traditional datacenters 260 coupled to metered grid power. The traditional datacenters 260 using metered grid power to provide computational resources to support computational operations. One or more enterprises may assign computational operations to the traditional datacenters 260 with expectations that the datacenters reliably provide resources without interruption (i.e., non-intermittently) to support the computational operations, such as processing abilities, networking, and/or volatile storage. Similarly, one or more enterprises may also request computational operations to be performed by the flexible datacenters 220. The flexible datacenters 220 differ from the traditional datacenters 260 in that the flexible datacenters 220 are arranged and/or configured to be connected to BTM power, are expected to operate intermittently, and are expected to ramp load (and thus computational capability) up or down regularly in response to control directives. In some examples, the flexible datacenters 220 and the traditional datacenters 260 may have similar configurations and may only differ based on the source(s) of power relied upon to power internal computing systems. Preferably, however, the flexible datacenters 220 include particular fast load ramping abilities (e.g., quickly increase or decrease power usage) and are intended and designed to effectively operate during intermittent periods of time.

Figure 3:
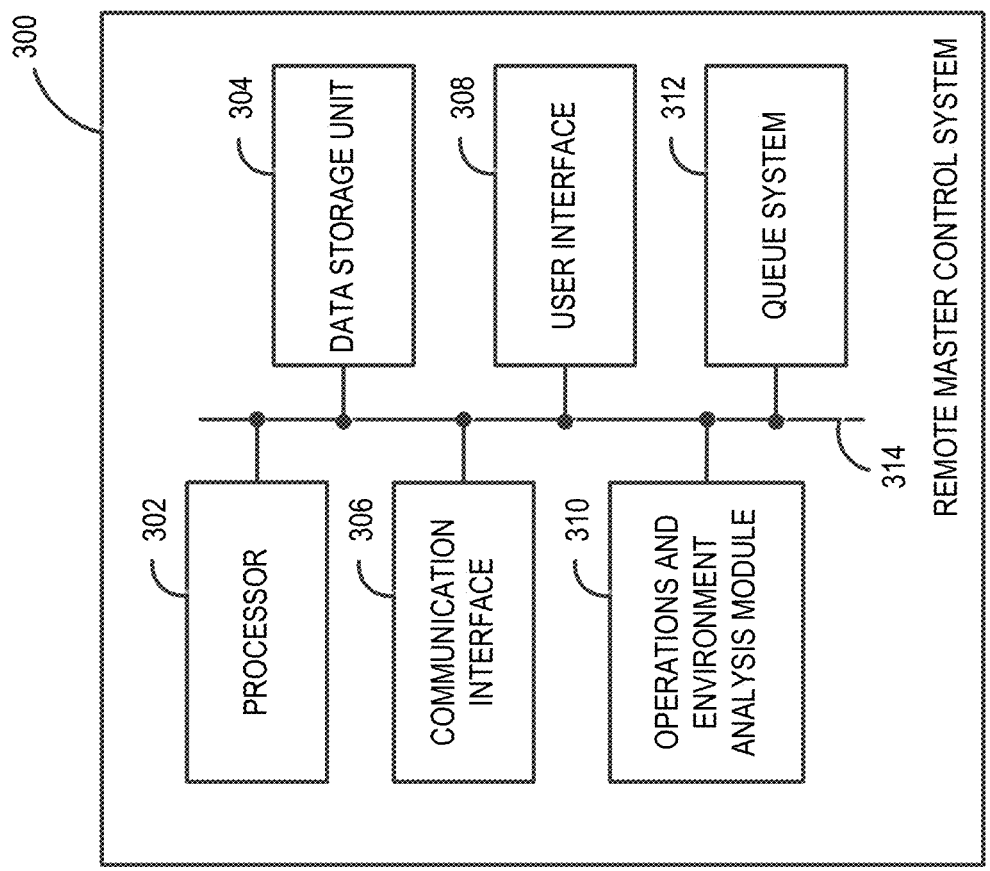
FIG. 3 shows a block diagram of a remote master control system, according to one or more example embodiments.

FIG. 3 shows a block diagram of the remote master control system 300 according to one or more example embodiments. Remote master control system 262 may take the form of remote master control system 300, or may include less than all components in remote master control system 300, different components than in remote master control system 300, and/or more components than in remote master control system 300.

The remote master control system 300 may perform one or more operations described herein and may include a processor 302, a data storage unit 304, a communication interface 306, a user interface 308, an operations and environment analysis module 310, and a queue system 312. In other examples, the remote master control system 300 may include more or fewer components in other possible arrangements.

As shown in FIG. 3, the various components of the remote master control system 300 can be connected via one or more connection mechanisms (e.g., a connection mechanism 314). In this disclosure, the term "connection mechanism" means a mechanism that facilitates communication between two or more devices, systems, components, or other entities. For instance, a connection mechanism can be a simple mechanism, such as a cable, PCB trace, or system bus, or a relatively complex mechanism, such as a packet-based communication network (e.g., LAN, WAN, and/or the Internet). In some instances, a connection mechanism can include a non-tangible medium (e.g., where the connection is wireless).

As part of the arrangement of FIG. 2, the remote master control system 300 (corresponding to remote master control system 262) may perform a variety of operations, such as management and distribution of computational operations among datacenters, monitoring operational, economic, and environment conditions, and power management. For instance, the remote master control system 300 may obtain computational operations from one or more enterprises for performance at one or more datacenters. The remote master control system 300 may subsequently use information to distribute and assign the computational operations to one or more datacenters (e.g., the flexible datacenters 220) that have the resources (e.g., particular types of computing systems and available power) available to complete the computational operations. In some examples, the remote master control system 300 may assign all incoming computational operation requests to the queue system 312 and subsequently assign the queued requests to computing systems based on an analysis of current market and power conditions.

Although the remote master control system 300 is shown as a single entity, a network of computing systems may perform the operations of the remote master control system 300 in some examples. For example, the remote master control system 300 may exist in the form of computing systems (e.g., datacenter control systems) distributed across multiple datacenters.

The remote master control system 300 may include one or more processors 302. As such, the processor 302 may represent one or more general-purpose processors (e.g., a microprocessor) and/or one or more special-purpose processors (e.g., a digital signal processor (DSP)). In some examples, the processor 302 may include a combination of processors within examples. The processor 302 may perform operations, including processing data received from the other components within the arrangement of FIG. 2 and data obtained from external sources, including information such as weather forecasting systems, power market price systems, and other types of sources or databases.

The data storage unit 304 may include one or more volatile, non-volatile, removable, and/or non-removable storage components, such as magnetic, optical, or flash storage, and/or can be integrated in whole or in part with the processor 302. As such, the data storage unit 304 may take the form of a non-transitory computer-readable storage medium, having stored thereon program instructions (e.g., compiled or non-compiled program logic and/or machine code) that, when executed by the processor 302, cause the remote master control system 300 to perform one or more acts and/or functions, such as those described in this disclosure. Such program instructions can define and/or be part of a discrete software application. In some instances, the remote master control system 300 can execute program instructions in response to receiving an input, such as from the communication interface 306, the user interface 308, or the operations and environment analysis module 310. The data storage unit 304 may also store other information, such as those types described in this disclosure.

In some examples, the data storage unit 304 may serve as storage for information obtained from one or more external sources. For example, data storage unit 304 may store information obtained from one or more of the traditional datacenters 260, a generation station 202, a system associated with the grid, and flexible datacenters 220. As examples only, data storage 304 may include, in whole or in part, local storage, dedicated server-managed storage, network attached storage, and/or cloud-based storage, and/or combinations thereof.

The communication interface 306 can allow the remote master control system 300 to connect to and/or communicate with another component according to one or more protocols.

For instance, the communication interface 306 may be used to obtain information related to current, future, and past prices for power, power availability, current and predicted weather conditions, and information regarding the different datacenters (e.g., current workloads at datacenters, types of computing systems available within datacenters, price to obtain power at each datacenter, levels of power storage available and accessible at each datacenter, etc.). In an example, the communication interface 306 can include a wired interface, such as an Ethernet interface or a high-definition serial-digital-interface (HD-SDI). In another example, the communication interface 406 can include a wireless interface, such as a cellular, satellite, WiMAX, or WI-FI interface. A connection can be a direct connection or an indirect connection, the latter being a connection that passes through and/or traverses one or more components, such as such as a router, switcher, or other network device. Likewise, a wireless transmission can be a direct transmission or an indirect transmission. The communication interface 306 may also utilize other types of wireless communication to enable communication with datacenters positioned at various locations.

The communication interface 306 may enable the remote master control system 300 to communicate with the components of the arrangement of FIG. 2. In addition, the communication interface 306 may also be used to communicate with the various datacenters, power sources, and different enterprises submitting computational operations for the datacenters to support.

The user interface 308 can facilitate interaction between the remote master control system 300 and an administrator or user, if applicable. As such, the user interface 308 can include input components such as a keyboard, a keypad, a mouse, a touch-sensitive panel, a microphone, and/or a camera, and/or output components such as a display device (which, for example, can be combined with a touch-sensitive panel), a sound speaker, and/or a haptic feedback system. More generally, the user interface 308 can include hardware and/or software components that facilitate interaction between remote master control system 300 and the user of the system.

In some examples, the user interface 308 may enable the manual examination and/or manipulation of components within the arrangement of FIG. 2. For instance, an administrator or user may use the user interface 308 to check the status of, or change, one or more computational operations, the performance or power consumption at one or more datacenters, the number of tasks remaining within the queue system 312, and other operations. As such, the user interface 308 may provide remote connectivity to one or more systems within the arrangement of FIG. 2.

The operations and environment analysis module 310 represents a component of the remote master control system 300 associated with obtaining and analyzing information to develop instructions/directives for components within the arrangement of FIG. 2. The information analyzed by the operations and environment analysis module 310 can vary within examples and may include the information described above with respect predicting and/or directing the use of BTM power. For instance, the operations and environment analysis module 310 may obtain and access information related to the current power state of computing systems operating as part of the flexible datacenters 220 and other datacenters that the remote master control system 300 has access to. This information may be used to determine when to adjust power usage or mode of one or more computing systems. In addition, the remote master control system 300 may provide instructions a flexible datacenter 220 to cause a subset of the computing systems to transition into a low power mode to consume less power while still performing operations at a slower rate. The remote master control system 300 may also use power state information to cause a set of computing systems at a flexible datacenter 220 to operate at a higher power consumption mode. In addition, the remote master control system 300 may transition computing systems into sleep states or power on/off based on information analyzed by the operations and environment analysis module 310.

In some examples, the operations and environment analysis module 310 may use location, weather, activity levels at the flexible datacenters or the generation station, and power cost information to determine control strategies for one or more components in the arrangement of FIG. 2. For instance, the remote master control system 300 may use location information for one or more datacenters to anticipate potential weather conditions that could impact access to power. In addition, the operations and environment analysis module 310 may assist the remote master control system 300 determine whether to transfer computational operations between datacenters based on various economic and power factors.

The queue system 312 represents a queue capable of organizing computational operations to be performed by one or more datacenters. Upon receiving a request to perform a computational operation, the remote master control system 300 may assign the computational operation to the queue until one or more computing systems are available to support the computational operation. The queue system 312 may be used for organizing and transferring computational tasks in real time.

The organizational design of the queue system 312 may vary within examples. In some examples, the queue system 312 may organize indications (e.g., tags, pointers) to sets of computational operations requested by various enterprises. The queue system 312 may operate as a First-In-First-Out (FIFO) data structure. In a FIFO data structure, the first element added to the queue will be the first one to be removed. As such, the queue system 312 may include one or more queues that operate using the FIFO data structure.

In some examples, one or more queues within the queue system 312 may use other designs of queues, including rules to rank or organize queues in a particular manner that can prioritize some sets of computational operations over others. The rules may include one or more of an estimated cost and/or revenue to perform each set of computational operations, an importance assigned to each set of computational operations, and deadlines for initiating or completing each set of computational operations, among others. Examples using a queue system are further described below with respect to FIG. 9.

In some examples, the remote master control system 300 may be configured to monitor one or more auctions to obtain computational operations for datacenters to support. Particularly, the remote master control system 300 may use resource availability and power prices to develop and submit bids to an external or internal auction system for the right to support particular computational operations. As a result, the remote master control system 300 may identify computational operations that could be supported at one or more flexible datacenters 220 at low costs.

Figure 4:
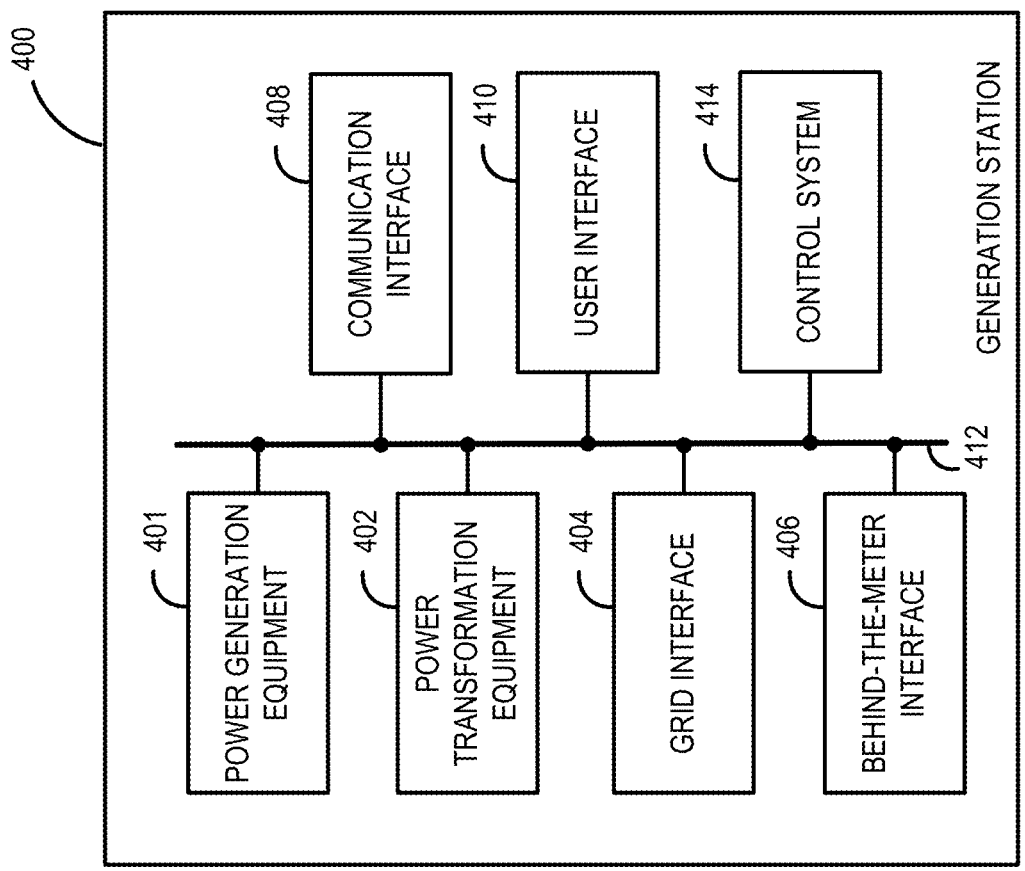
FIG. 4 a block diagram of a generation station, according to one or more example embodiments.

FIG. 4 is a block diagram of a generation station 400, according to one or more example embodiments. Generation station 202 may take the form of generation station 400, or may include less than all components in generation station 400, different components than in generation station 400, and/or more components than in generation station 400. The generation station 400 includes a power generation equipment 401, a communication interface 408, a behind-the-meter interface 406, a grid interface 404, a user interface 410, a generation station control system 414, and power transformation equipment 402. Power generation equipment 210 may take the form of power generation equipment 401, or may include less than all components in power generation equipment 401, different components than in power generation equipment 401, and/or more components than in power generation equipment 401. Generation station control system 216 may take the form of generation station control system 414, or may include less than all components in generation station control system 414, different components than in generation station control system 414, and/or more components than in generation station control system 414. Some or all of the components generation station 400 may be connected via a communication interface 516. These components are illustrated in FIG. 4 to convey an example configuration for the generation station 400 (corresponding to generation station 202 shown in FIG. 2). In other examples, the generation station 400 may include more or fewer components in other arrangements.

The generation station 400 can correspond to any type of grid-connected utility-scale power producer capable of supplying power to one or more loads. The size, amount of power generated, and other characteristics of the generation station 400 may differ within examples. For instance, the generation station 400 may be a power producer that provides power intermittently. The power generation may depend on monitored power conditions, such as weather at the location of the generation station 400 and other possible conditions. As such, the generation station 400 may be a temporary arrangement, or a permanent facility, configured to supply power. The generation station 400 may supply BTM power to one or more loads and supply metered power to the electrical grid. Particularly, the generation station 400 may supply power to the grid as shown in the arrangement of FIG. 2.

The power generation equipment 401 represents the component or components configured to generate utility-scale power. As such, the power generation equipment 401 may depend on the type of facility that the generation station 400 corresponds to. For instance, the power generation equipment 401 may correspond to electric generators that transform kinetic energy into electricity. The power generation equipment 401 may use electromagnetic induction to generate power. In other examples, the power generation equipment 401 may utilize electrochemistry to transform chemical energy into power. The power generation equipment 401 may use the photovoltaic effect to transform light into electrical energy. In some examples, the power generation equipment 401 may use turbines to generate power. The turbines may be driven by, for example, wind, water, steam or burning gas. Other examples of power production are possible.

The communication interface 408 enable the generation station 400 to communicate with other components within the arrangement of FIG. 2. As such, the communication interface 408 may operate similarly to the communication interface 306 of the remote master control system 300 and the communication interface 503 of the flexible datacenter 500.

The generation station control system 414 may be one or more computing systems configured to control various aspects of the generation station 400.

The BTM interface 406 is a module configured to enable the power generation equipment 401 to supply BTM power to one or more loads and may include multiple components. The arrangement of the BTM interface 406 may differ within examples based on various factors, such as the number of flexible datacenters 220 (or 500) coupled to the generation station 400, the proximity of the flexible datacenters 220 (or 500), and the type of generation station 400, among others. In some examples, the BTM interface 406 may be configured to enable power delivery to one or more flexible datacenters positioned near the generation station 400. Alternatively, the BTM interface 406 may also be configured to enable power delivery to one or more flexible datacenters 220 (or 500) positioned remotely from the generation station 400.

The grid interface 404 is a module configured to enable the power generation equipment 401 to supply power to the grid and may include multiple components. As such, the grid interface 404 may couple to one or more transmission lines (e.g., transmission lines 404*a* shown in FIG. 2) to enable delivery of power to the grid.

The user interface 410 represents an interface that enables administrators and/or other entities to communicate with the generation station 400. As such, the user interface 410 may have a configuration that resembles the configuration of the user interface 308 shown in FIG. 3. An operator may utilize the user interface 410 to control or monitor operations at the generation station 400.

The power transformation equipment 402 represents equipment that can be utilized to enable power delivery from the power generation equipment 401 to the loads and to transmission lines linked to the grid. Example power transformation equipment 402 includes, but is not limited to, transformers, inverters, phase converters, and power conditioners.

Figure 5:
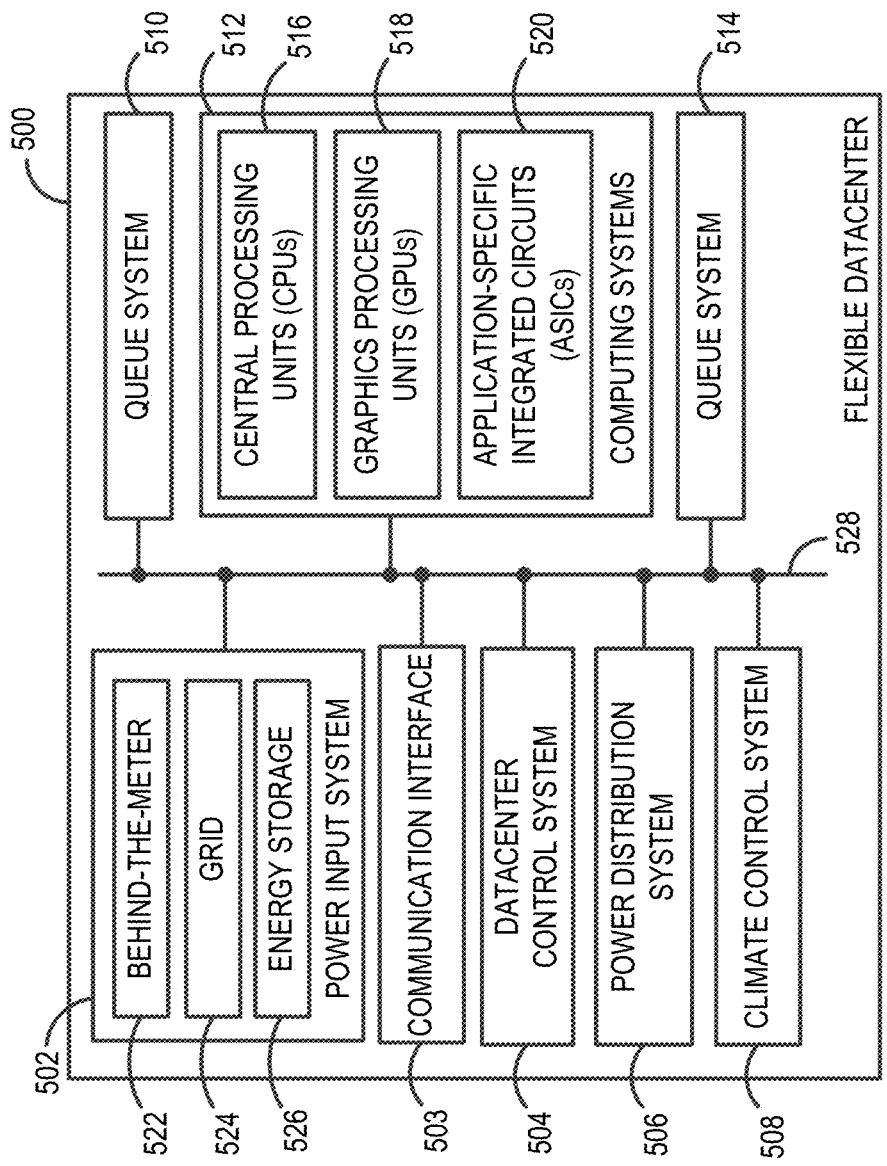
FIG. 5 shows a block diagram of a flexible datacenter, according to one or more example embodiments.

FIG. 5 shows a block diagram of a flexible datacenter 500, according to one or more example embodiments. Flexible datacenters 220 may take the form of flexible datacenter 500, or may include less than all components in flexible datacenter 500, different components than in flexible datacenter 500, and/or more components than in flexible datacenter 500. In the example embodiment shown in FIG. 5, the flexible datacenter 500 includes a power input system 502, a communication interface 503, a datacenter control system 504, a power distribution system 506, a climate control system 508, one or more sets of computing systems 512, and a queue system 514. These components are shown connected by a communication bus 528. In other embodiments, the configuration of flexible datacenter 500 can differ, including more or fewer components. In addition, the components within flexible datacenter 500 may be combined or further divided into additional components within other embodiments.

The example configuration shown in FIG. 5 represents one possible configuration for a flexible datacenter. As such, each flexible datacenter may have a different configuration when implemented based on a variety of factors that may influence its design, such as location and temperature that the location, particular uses for the flexible datacenter, source of power supplying computing systems within the flexible datacenter, design influence from an entity (or entities) that implements the flexible datacenter, and space available for the flexible datacenter. Thus, the embodiment of flexible datacenter 220 shown in FIG. 2 represents one possible configuration for a flexible datacenter out of many other possible configurations.

The flexible datacenter 500 may include a design that allows for temporary and/or rapid deployment, setup, and start time for supporting computational operations. For instance, the flexible datacenter 500 may be rapidly deployed at a location near a source of generation station power (e.g., near a wind farm or solar farm). Rapid deployment may involve positioning the flexible datacenter 500 at a target location and installing and/or configuring one or more racks of computing systems within. The racks may include wheels to enable swift movement of the computing systems. Although the flexible datacenter 500 could theoretically be placed anywhere, transmission losses may be minimized by locating it proximate to BTM power generation.

The physical construction and layout of the flexible datacenter 500 can vary. In some instances, the flexible datacenter 500 may utilize a metal container (e.g., a metal container 602 shown in FIG. 6A). In general, the flexible datacenter 500 may utilize some form of secure weatherproof housing designed to protect interior components from wind, weather, and intrusion. The physical construction and layout of example flexible datacenters are further described with respect to FIGS. 6A-6B.

Within the flexible datacenter 500, various internal components enable the flexible datacenter 500 to utilize power to perform some form of operations. The power input system 502 is a module of the flexible datacenter 500 configured to receive external power and input the power to the different components via assistance from the power distribution system 506. As discussed with respect to FIG. 2, the sources of external power feeding a flexible datacenter can vary in both quantity and type (e.g., the generation stations 202, 400, grid-power, energy storage systems). Power input system 502 includes a BTM power input sub-system 522, and may additionally include other power input sub-systems (e.g., a grid-power input sub-system 524 and/or an energy storage input sub-system 526). In some instances, the quantity of power input sub-systems may depend on the size of the flexible datacenter and the number and/or type of computing systems being powered.

In some embodiments, the power input system 502 may include some or all of flexible datacenter Power Equipment 220B. The power input system 502 may be designed to obtain power in different forms (e.g., single phase or three-phase behind-the-meter alternating current ("AC") voltage, and/or direct current ("DC") voltage). As shown, the power input system 502 includes a BTM power input sub-system 522, a grid power input sub-system 524, and an energy input sub-system 526. These sub-systems are included to illustrate example power input sub-systems that the flexible datacenter 500 may utilize, but other examples are possible. In addition, in some instances, these sub-systems may be used simultaneously to supply power to components of the flexible datacenter 500. The sub-systems may also be used based on available power sources.

In some implementations, the BTM power input sub-system 522 may include one or more AC-to-AC step-down transformers used to step down supplied medium-voltage AC to low voltage AC (e.g., 120V to 600V nominal) used to power computing systems 512 and/or other components of flexible datacenter 500. The power input system 502 may also directly receive single-phase low voltage AC from a generation station as BTM power, from grid power, or from a stored energy system such as energy storage system 218.

In some implementations, the power input system 502 may provide single-phase AC voltage to the datacenter control system 504 (and/or other components of flexible datacenter 500) independent of power supplied to computing systems 512 to enable the datacenter control system 504 to perform management operations for the flexible datacenter 500. For instance, the grid power input sub-system 524 may use grid power to supply power to the datacenter control system 504 to ensure that the datacenter control system 504 can perform control operations and communicate with the remote master control system 300 (or 262) during situations when BTM power is not available. As such, the datacenter control system 504 may utilize power received from the power input system 502 to remain powered to control the operation of flexible datacenter 500, even if the computational operations performed by the computing system 512 are powered intermittently. In some instances, the datacenter control system 504 may switch into a lower power mode to utilize less power while still maintaining the ability to perform some functions.

The power distribution system 506 may distribute incoming power to the various components of the flexible datacenter 500. For instance, the power distribution system 506 may direct power (e.g., single-phase or three-phase AC) to one or more components within flexible datacenter 500. In some embodiments, the power distribution system 506 may include some or all of flexible datacenter Power Equipment 220B.

In some examples, the power input system 502 may provide three phases of three-phase AC voltage to the power distribution system 506. The power distribution system 506 may controllably provide a single phase of AC voltage to each computing system or groups of computing systems 512 disposed within the flexible datacenter 500. The datacenter control system 504 may controllably select which phase of three-phase nominal AC voltage that power distribution system 506 provides to each computing system 512 or groups of computing systems 512. This is one example manner in which the datacenter control system 504 may modulate power delivery (and load at the flexible datacenter 500) by ramping-up flexible datacenter 500 to fully operational status, ramping-down flexible datacenter 500 to offline status (where only datacenter control system 504 remains powered), reducing load by withdrawing power delivery from, or reducing power to, one or more of the computing systems 512 or groups of the computing systems 512, or modulating power factor correction for the generation station 300 (or 202) by controllably adjusting which phases of three-phase nominal AC voltage are used by one or more of the computing systems 512 or groups of the computing systems 512. The datacenter control system 504 may direct power to certain sets of computing systems based on computational operations waiting for computational resources within the queue system 514. In some embodiments, the flexible datacenter 500 may receive BTM DC power to power the computing systems 512.

One of ordinary skill in the art will recognize that a voltage level of three-phase AC voltage may vary based on an application or design and the type or kind of local power generation. As such, a type, kind, or configuration of the operational AC-to-AC step down transformer (not shown) may vary based on the application or design. In addition, the frequency and voltage level of three-phase AC voltage, single-phase AC voltage, and DC voltage may vary based on the application or design in accordance with one or more embodiments.

As discussed above, the datacenter control system 504 may perform operations described herein, such as dynamically modulating power delivery to one or more of the computing systems 512 disposed within flexible datacenter 500. For instance, the datacenter control system 504 may modulate power delivery to one or more of the computing systems 512 based on various factors, such as BTM power availability or an operational directive from a generation station 262 or 300 control system, a remote master control system 262 or 300, or a grid operator. In some examples, the datacenter control system 504 may provide computational operations to sets of computing systems 512 and modulate power delivery based on priorities assigned to the computational operations. For instance, an important computational operation (e.g., based on a deadline for execution and/or price paid by an entity) may be assigned to a particular computing system or set of computing systems 512 that has the capacity, computational abilities to support the computational operation. In addition, the datacenter control system 504 may also prioritize power delivery to the computing system or set of computing systems 512.

In some example, the datacenter control system 504 may further provide directives to one or more computing systems to change operations in some manner. For instance, the datacenter control system 504 may cause one or more computing systems 512 to operate at a lower or higher frequency, change clock cycles, or operate in a different power consumption mode (e.g., a low power mode). These abilities may vary depending on types of computing systems 512 available at the flexible datacenter 500. As a result, the datacenter control system 504 may be configured to analyze the computing systems 512 available either on a periodic basis (e.g., during initial set up of the flexible datacenter 500) or in another manner (e.g., when a new computational operation is assigned to the flexible datacenter 500).

The datacenter control system 504 may also implement directives received from the remote master control system 262 or 300. For instance, the remote master control system 262 or 300 may direct the flexible datacenter 500 to switch into a low power mode. As a result, one or more of the computing systems 512 and other components may switch to the low power mode in response.

The datacenter control system 504 may utilize the communication interface 503 to communicate with the remote master control system 262 or 300, other datacenter control systems of other datacenters, and other entities. As such, the communication interface 503 may include components and operate similar to the communication interface 306 of the remote master control system 300 described with respect to FIG. 4.

The flexible datacenter 500 may also include a climate control system 508 to maintain computing systems 512 within a desired operational temperature range. The climate control system 508 may include various components, such as one or more air intake components, an evaporative cooling system, one or more fans, an immersive cooling system, an air conditioning or refrigerant cooling system, and one or more air outtake components. One of ordinary skill in the art will recognize that any suitable heat extraction system configured to maintain the operation of computing systems 512 within the desired operational temperature range may be used.

The flexible datacenter 500 may further include an energy storage system 510. The energy storage system 510 may store energy for subsequent use by computing systems 512 and other components of flexible datacenter 500. For instance, the energy storage system 510 may include a battery system. The battery system may be configured to convert AC voltage to DC voltage and store power in one or more storage cells. In some instances, the battery system may include a DC-to-AC inverter configured to convert DC voltage to AC voltage, and may further include an AC phase-converter, to provide AC voltage for use by flexible datacenter 500.

The energy storage system 510 may be configured to serve as a backup source of power for the flexible datacenter 500. For instance, the energy storage system 510 may receive and retain power from a BTM power source at a low cost (or no cost at all). This low-cost power can then be used by the flexible datacenter 500 at a subsequent point, such as when BTM power costs more. Similarly, the energy storage system 510 may also store energy from other sources (e.g., grid power). As such, the energy storage system 510 may be configured to use one or more of the sub-systems of the power input system 502.

In some examples, the energy storage system 510 may be external to the flexible datacenter 500. For instance, the energy storage system 510 may be an external source that multiple flexible datacenters utilize for back-up power.

The computing systems 512 represent various types of computing systems configured to perform computational operations. Performance of computational operations include a variety of tasks that one or more computing systems may perform, such as data storage, calculations, application processing, parallel processing, data manipulation, cryptocurrency mining, and maintenance of a distributed ledger, among others. As shown in FIG. 5, the computing systems 512 may include one or more CPUs 516, one or more GPUs 518, and/or one or more Application-Specific Integrated Circuits (ASIC's) 520. Each type of computing system 512 may be configured to perform particular operations or types of operations.

Due to different performance features and abilities associated with the different types of computing systems, the datacenter control system 504 may determine, maintain, and/or relay this information about the types and/or abilities of the computing systems, quantity of each type, and availability to the remote master control system 262 or 300 on a routine basis (e.g., periodically or on-demand). This way, the remote master control system 262 or 300 may have current information about the abilities of the computing systems 512 when distributing computational operations for performance at one or more flexible datacenters. Particularly, the remote master control system 262 or 300 may assign computational operations based on various factors, such as the types of computing systems available and the type of computing systems required by each computing operation, the availability of the computing systems, whether computing systems can operate in a low power mode, and/or power consumption and/or costs associated with operating the computing systems, among others.

The quantity and arrangement of these computing systems 512 may vary within examples. In some examples, the configuration and quantity of computing systems 512 may depend on various factors, such as the computational tasks that are performed by the flexible datacenter 500. In other examples, the computing systems 512 may include other types of computing systems as well, such as DSPs, SIMDs, neural processors, and/or quantum processors.

As indicated above, the computing systems 512 can perform various computational operations, including in different configurations. For instance, each computing system may perform a particular computational operation unrelated to the operations performed at other computing systems.

Groups of the computing systems 512 may also be used to work together to perform computational operations.

In some examples, multiple computing systems may perform the same computational operation in a redundant configuration. This redundant configuration creates a backup that prevents losing progress on the computational operation in situations of a computing failure or intermittent operation of one or more computing systems. In addition, the computing systems 512 may also perform computational operations using a check point system. The check point system may enable a first computing system to perform operations up to a certain point (e.g., a checkpoint) and switch to a second computing system to continue performing the operations from that certain point. The check point system may also enable the datacenter control system 504 to communicate statuses of computational operations to the remote master control system 262 or 300. This can further enable the remote master control system 262 300 to transfer computational operations between different flexible datacenters allowing computing systems at the different flexible datacenters to resume support of computational operations based on the check points.

The queue system 514 may operate similar to the queue system 312 of the remote master control system 300 shown in FIG. 3. Particularly, the queue system 514 may help store and organize computational tasks assigned for performance at the flexible datacenter 500. In some examples, the queue system 514 may be part of a distributed queue system such that each flexible datacenter in a fleet of flexible datacenter includes a queue, and each queue system 514 may be able to communicate with other queue systems. In addition, the remote master control system 262 or 300 may be configured to assign computational tasks to the queues located at each flexible datacenter (e.g., the queue system 514 of the flexible datacenter 500). As such, communication between the remote master control system 262 or 300 and the datacenter control system 504 and/or the queue system 514 may allow organization of computational operations for the flexible datacenter 500 to support.

Figure 6A:
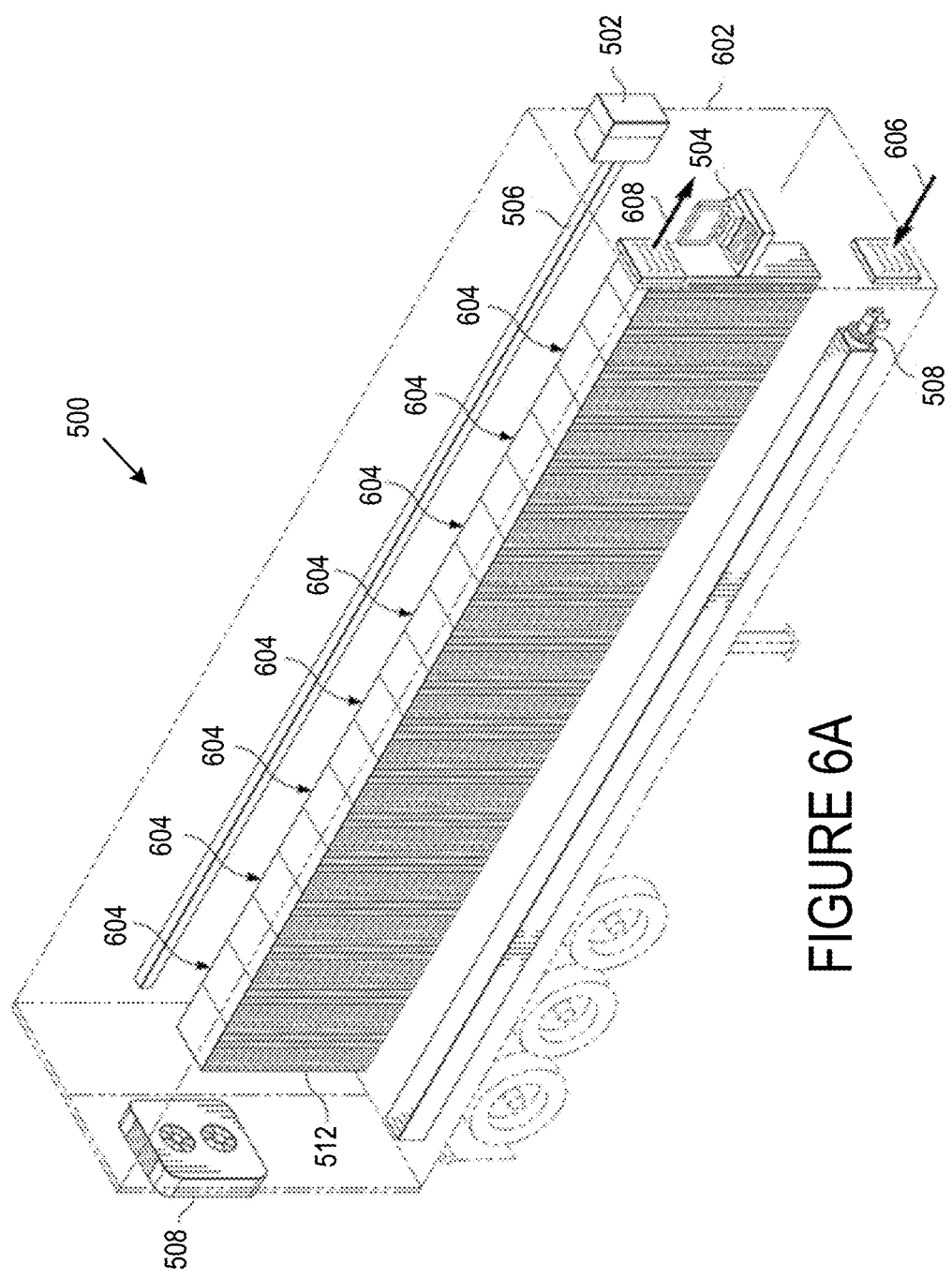
FIG. 6A shows a structural arrangement of a flexible datacenter, according to one or more example embodiments.

FIG. 6A shows another structural arrangement for a flexible datacenter, according to one or more example embodiments. The particular structural arrangement shown in FIG. 6A may be implemented at flexible datacenter 500. The illustration depicts the flexible datacenter 500 as a mobile container 702 equipped with the power input system 502, the power distribution system 506, the climate control system 508, the datacenter control system 504, and the computing systems 512 arranged on one or more racks 604. These components of flexible datacenter 500 may be arranged and organized according to an example structural region arrangement. As such, the example illustration represents one possible configuration for the flexible datacenter 500, but others are possible within examples.

As discussed above, the structural arrangement of the flexible datacenter 500 may depend on various factors, such as the ability to maintain temperature within the mobile container 602 within a desired temperature range. The desired temperature range may depend on the geographical location of the mobile container 602 and the type and quantity of the computing systems 512 operating within the flexible datacenter 500 as well as other possible factors. As such, the different design elements of the mobile container 602 including the inner contents and positioning of components may depend on factors that aim to maximize the use of space within mobile container 602, lower the amount of power required to cool the computing systems 512, and make setup of the flexible datacenter 500 efficient. For instance, a first flexible datacenter positioned in a cooler geographic region may include less cooling equipment than a second flexible datacenter positioned in a warmer geographic region.

As shown in FIG. 6A, the mobile container 602 may be a storage trailer disposed on permanent or removable wheels and configured for rapid deployment. In other embodiments, the mobile container 602 may be a storage container (not shown) configured for placement on the ground and potentially stacked in a vertical or horizontal manner (not shown). In still other embodiments, the mobile container 602 may be an inflatable container, a floating container, or any other type or kind of container suitable for housing a mobile flexible datacenter. As such, the flexible datacenter 500 may be rapidly deployed on site near a source of unutilized behind-the-meter power generation. And in still other embodiments, the flexible datacenter 500 might not include a mobile container. For example, the flexible datacenter 500 may be situated within a building or another type of stationary environment.

Figure 6B:
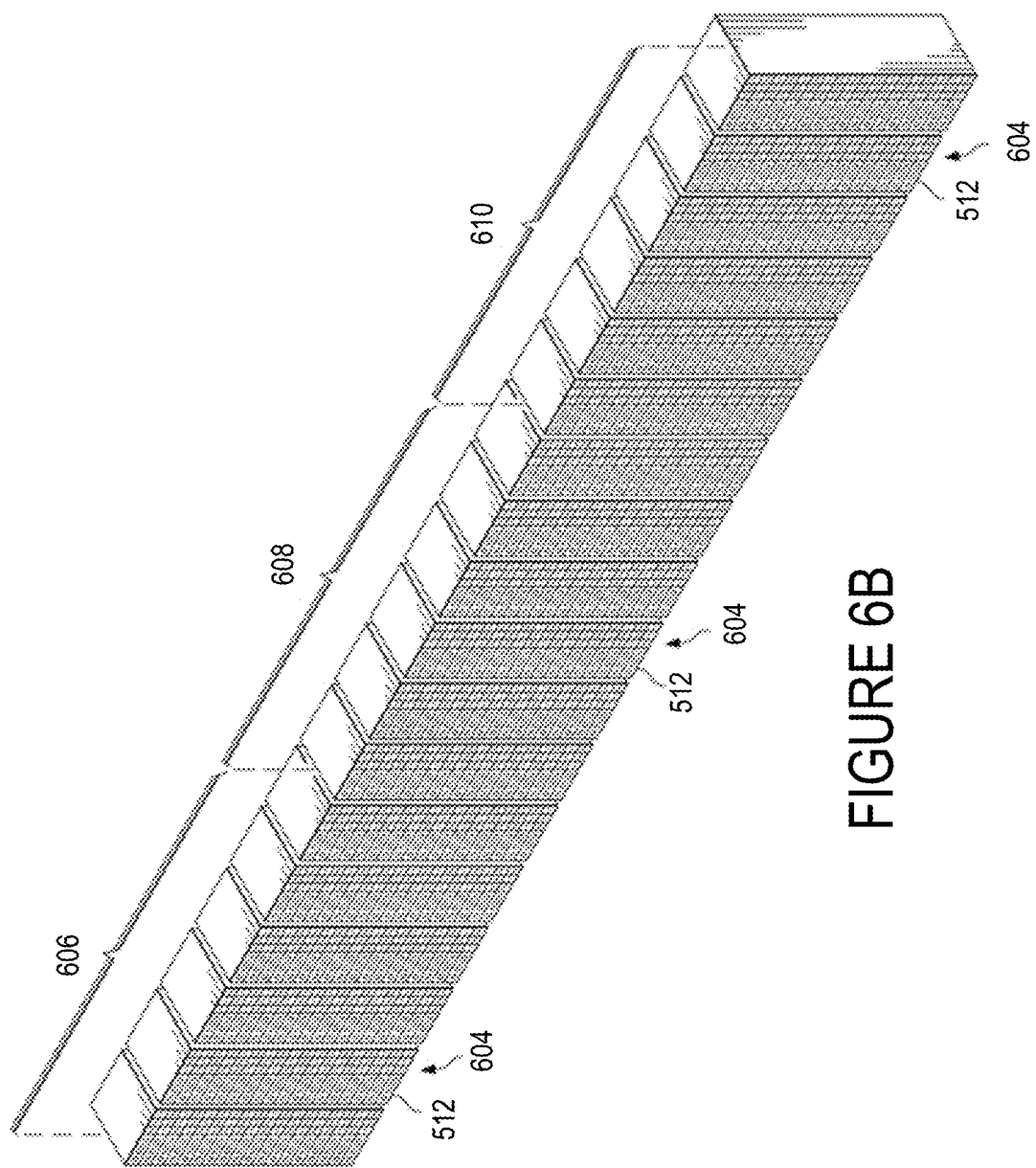
FIG. 6B shows a set of computing systems arranged in a straight configuration, according to one or more example embodiments.

FIG. 6B shows the computing systems 512 in a straight-line configuration for installation within the flexible datacenter 500, according to one or more example embodiments. As indicated above, the flexible datacenter 500 may include a plurality of racks 604, each of which may include one or more computing systems 512 disposed therein. As discussed above, the power input system 502 may provide three phases of AC voltage to the power distribution system 506. In some examples, the power distribution system 506 may controllably provide a single phase of AC voltage to each computing system 512 or group of computing systems 512 disposed within the flexible datacenter 500. As shown in FIG. 6B, for purposes of illustration only, eighteen total racks 604 are divided into a first group of six racks 606, a second group of six racks 608, and a third group of six racks 610, where each rack contains eighteen computing systems 512. The power distribution system (506 of FIG. 5) may, for example, provide a first phase of three-phase AC voltage to the first group of six racks 606, a second phase of three-phase AC voltage to the second group of six racks 608, and a third phase of three-phase AC voltage to the third group of six racks 610. In other embodiments, the quantity of racks and computing systems can vary.

Figure 7:
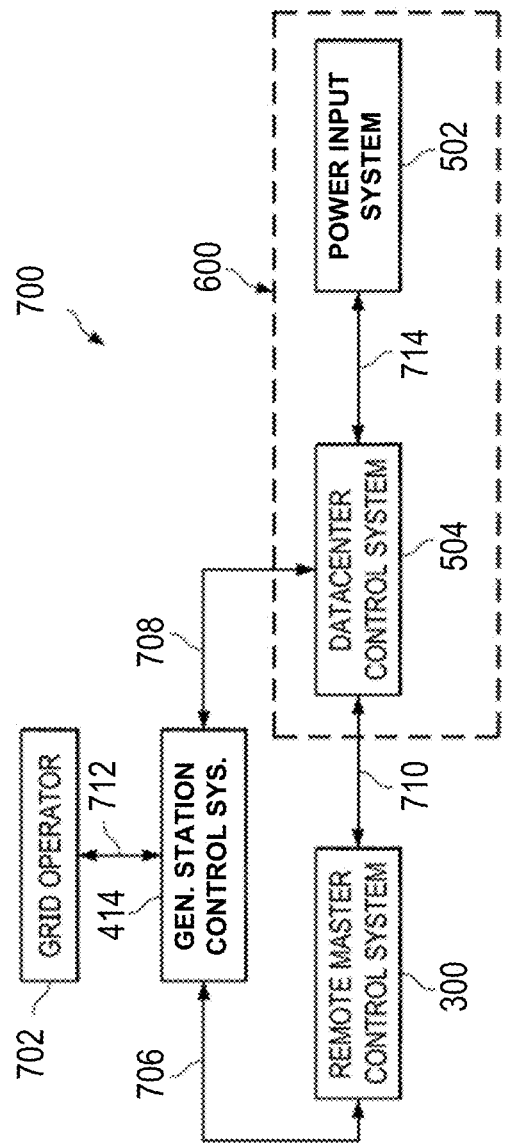
FIG. 7 shows a control distribution system for a flexible datacenter, according to one or more example embodiments.

FIG. 7 shows a control distribution system 700 of the flexible datacenter 500 according to one or more example embodiments. The system 700 includes a grid operator 702, a generation station control system 216, a remote master control system 300, and a flexible datacenter 500. As such, the system 700 represents one example configuration for controlling operations of the flexible datacenter 500, but other configurations may include more or fewer components in other arrangements.

The datacenter control system 504 may independently, or cooperatively with one or more of the generation station control system 414, the remote master control system 300, and the grid operator 702, modulate power at the flexible datacenter 500. During operations, the power delivery to the flexible datacenter 500 may be dynamically adjusted based on conditions or operational directives. The conditions may correspond to economic conditions (e.g., cost for power, aspects of computational operations to be performed), power-related conditions (e.g., availability of the power, the sources offering power), demand response, and/or weather-related conditions, among others.

The generation station control system 414 may be one or more computing systems configured to control various aspects of a generation station (not independently illustrated, e.g., 216 or 400). As such, the generation station control system 414 may communicate with the remote master control system 300 over a networked connection 706 and with the datacenter control system 704 over a networked or other data connection 708.

As discussed with respect to FIGS. 2 and 3, the remote master control system 300 can be one or more computing systems located offsite, but connected via a network connection 710 to the datacenter control system 504. The remote master control system 300 may provide supervisory controls or override control of the flexible datacenter 500 or a fleet of flexible datacenters (not shown).

The grid operator 702 may be one or more computing systems that are configured to control various aspects of the power grid (not independently illustrated) that receives power from the generation station. The grid operator 702 may communicate with the generation station control system 300 over a networked or other data connection 712.

The datacenter control system 504 may monitor BTM power conditions at the generation station and determine when a datacenter ramp-up condition is met. The BTM power availability may include one or more of excess local power generation, excess local power generation that the grid cannot accept, local power generation that is subject to economic curtailment, local power generation that is subject to reliability curtailment, local power generation that is subject to power factor correction, conditions where the cost for power is economically viable (e.g., low cost to obtain power), low priced power, situations where local power generation is prohibitively low, startup situations, transient situations, or testing situations where there is an economic advantage to using locally generated behind-the-meter power generation, specifically power available at little to no cost and with no associated transmission or distribution losses or costs. For example, a datacenter control system may analyze future workload and near term weather conditions at the flexible datacenter.

In some instances, the datacenter ramp-up condition may be met if there is sufficient behind-the-meter power availability and there is no operational directive from the generation station control system 414, the remote master control system 300, or the grid operator 702 to go offline or reduce power. As such, the datacenter control system 504 may enable 714 the power input system 502 to provide power to the power distribution system 506 to power the computing systems 512 or a subset thereof.

The datacenter control system 504 may optionally direct one or more computing systems 512 to perform predetermined computational operations (e.g., distributed computing processes). For example, if the one or more computing systems 512 are configured to perform blockchain hashing operations, the datacenter control system 504 may direct them to perform blockchain hashing operations for a specific blockchain application, such as, for example, Bitcoin, Litecoin, or Ethereum. Alternatively, one or more computing systems 512 may be configured to perform high-throughput computing operations and/or high performance computing operations.

The remote master control system 300 may specify to the datacenter control system 504 what sufficient behind-the-meter power availability constitutes, or the datacenter control system 504 may be programmed with a predetermined preference or criteria on which to make the determination independently. For example, in certain circumstances, sufficient behind-the-meter power availability may be less than that required to fully power the entire flexible datacenter 500. In such circumstances, the datacenter control system 504 may provide power to only a subset of computing systems, or operate the plurality of computing systems in a lower power mode, that is within the sufficient, but less than full, range of power that is available. In addition, the computing systems 512 may adjust operational frequency, such as performing more or less processes during a given duration.

While the flexible datacenter 500 is online and operational, a datacenter ramp-down condition may be met when there is insufficient or anticipated to be insufficient, behind-the-meter power availability or there is an operational directive from the generation station control system 414, the remote master control system 300, or the grid operator 702. The datacenter control system 504 may monitor and determine when there is insufficient, or anticipated to be insufficient, behind-the-meter power availability. As noted above, sufficiency may be specified by the remote master control system 300 or the datacenter control system 504 may be programmed with a predetermined preference or criteria on which to make the determination independently.

An operational directive may be based on current dispatchability, forward looking forecasts for when behind-the-meter power is, or is expected to be, available, economic considerations, reliability considerations, operational considerations, or the discretion of the generation station control system 414, the remote master control system 300, or the grid operator 702. For example, the generation station control system 414, the remote master control system 300, or the grid operator 702 may issue an operational directive to flexible datacenter 500 to go offline and power down. When the datacenter ramp-down condition is met, the datacenter control system 504 may disable power delivery to the plurality of computing systems (e.g., 512). The datacenter control system 504 may disable 714 the power input system 502 from providing power (e.g., three-phase nominal AC voltage) to the power distribution system 506 to power down the computing systems 512 while the datacenter control system 504 remains powered and is capable of returning service to operating mode at the flexible datacenter 500 when behind-the-meter power becomes available again.

While the flexible datacenter 500 is online and operational, changed conditions or an operational directive may cause the datacenter control system 504 to modulate power consumption by the flexible datacenter 500. The datacenter control system 504 may determine, or the generation station control system 414, the remote master control system 300, or the grid operator 702 may communicate, that a change in local conditions may result in less power generation, availability, or economic feasibility, than would be necessary to fully power the flexible datacenter 500. In such situations, the datacenter control system 504 may take steps to reduce or stop power consumption by the flexible datacenter 500 (other than that required to maintain operation of datacenter control system 504).

Alternatively, the generation station control system 414, the remote master control system 300, or the grid operator 702, may issue an operational directive to reduce power consumption for any reason, the cause of which may be unknown. In response, the datacenter control system 504 may dynamically reduce or withdraw power delivery to one or more computing systems 512 to meet the dictate. The datacenter control system 504 may controllably provide three-phase nominal AC voltage to a smaller subset of computing systems (e.g., 512) to reduce power consumption. The datacenter control system 504 may dynamically reduce the power consumption of one or more computing systems by reducing their operating frequency or forcing them into a lower power mode through a network directive.

One of ordinary skill in the art will recognize that datacenter control system 504 may be configured to have a number of different configurations, such as a number or type or kind of the computing systems 512 that may be powered, and in what operating mode, that correspond to a number of different ranges of sufficient and available behind-the-meter power. As such, the datacenter control system 504 may modulate power delivery over a variety of ranges of sufficient and available unutilized behind-the-meter power availability.

Figure 8:
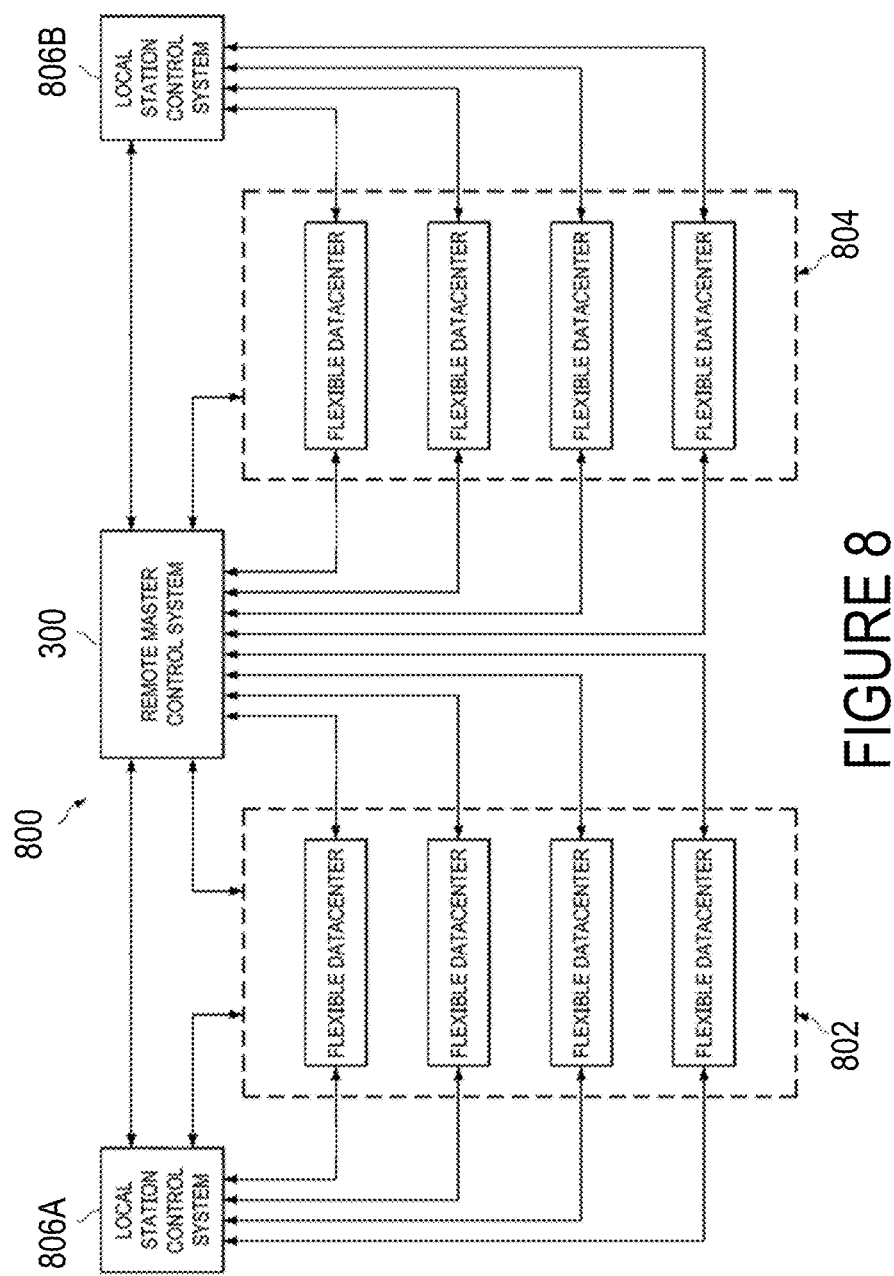
FIG. 8 shows a control distribution system for a fleet of flexible datacenters, according to one or more example embodiments.

FIG. 8 shows a control distribution system 800 of a fleet of flexible datacenters according to one or more example embodiments. The control distribution system 800 of the flexible datacenter 500 shown and described with respect to FIG. 7 may be extended to a fleet of flexible datacenters as illustrated in FIG. 8. For example, a first generation station (not independently illustrated), such as a wind farm, may include a first plurality of flexible datacenters 802, which may be collocated or distributed across the generation station. A second generation station (not independently illustrated), such as another wind farm or a solar farm, may include a second plurality of flexible datacenters 804, which may be collocated or distributed across the generation station. One of ordinary skill in the art will recognize that the number of flexible datacenters deployed at a given station and the number of stations within the fleet may vary based on an application or design in accordance with one or more example embodiments.

The remote master control system 300 may provide directive to datacenter control systems of the fleet of flexible datacenters in a similar manner to that shown and described with respect to FIG. 7, with the added flexibility to make high level decisions with respect to fleet that may be counterintuitive to a given station. The remote master control system 300 may make decisions regarding the issuance of operational directives to a given generation station based on, for example, the status of each generation station where flexible datacenters are deployed, the workload distributed across fleet, and the expected computational demand required for one or both of the expected workload and predicted power availability. In addition, the remote master control system 300 may shift workloads from the first plurality of flexible datacenters 802 to the second plurality of flexible datacenters 804 for any reason, including, for example, a loss of BTM power availability at one generation station and the availability of BTM power at another generation station. As such, the remote master control system 300 may communicate with the generation station control systems 806A, 806B to obtain information that can be used to organize and distribute computational operations to the fleets of flexible datacenters 802, 804.

Figure 9:
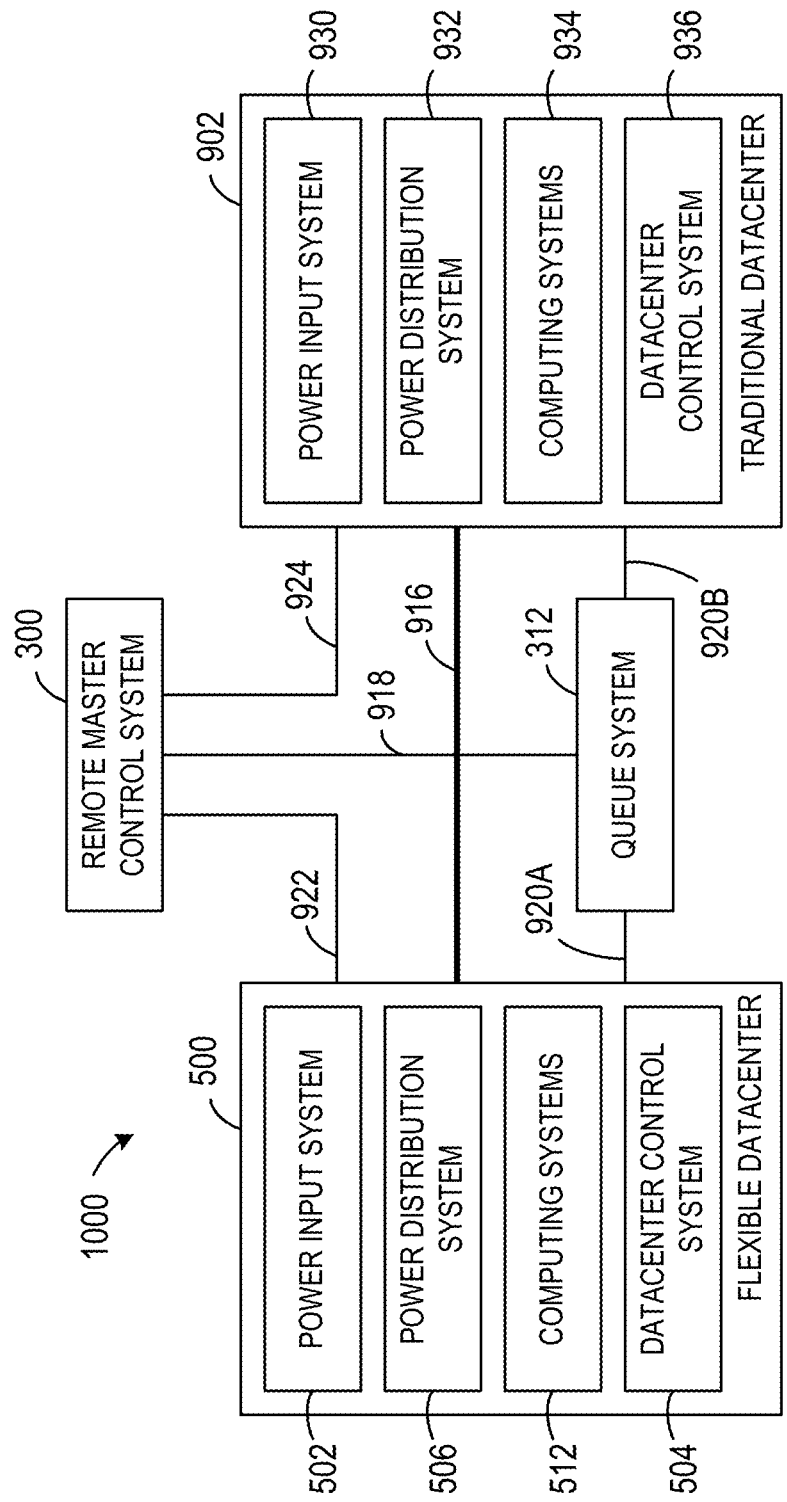
FIG. 9 shows a queue distribution system for a traditional datacenter and a flexible datacenter, according to one or more example embodiments.

FIG. 9 shows a queue distribution arrangement for a traditional datacenter 902 and a flexible datacenter 500, according to one or more example embodiments. The arrangement of FIG. 9 includes a flexible datacenter 500, a traditional datacenter 902, a queue system 312, a set of communication links 916, 918, 920A, 920B, and the remote master control system 300. The arrangement of FIG. 9 represents an example configuration scheme that can be used to distribute computing operations using a queue system 312 between the traditional datacenter 902 and one or more flexible datacenters. In other examples, the arrangement of FIG. 9 may include more or fewer components in other potential configurations. For instance, the arrangement of FIG. 9 may not include the queue system 312 or may include routes that bypass the queue system 312.

The arrangement of FIG. 9 may enable computational operations requested to be performed by entities (e.g., companies). As such, the arrangement of FIG. 9 may use the queue system 312 to organize incoming computational operations requests to enable efficient distribution to the flexible datacenter 500 and the critical traditional datacenter 902. Particularly, the arrangement of FIG. 9 may use the queue system 312 to organize sets of computational operations thereby increasing the speed of distribution and performance of the different computational operations among datacenters. As a result, the use of the queue system 312 may reduce time to complete operations and reduce costs.

In some examples, one or more components, such as the datacenter control system 504, the remote master control system 300, the queue system 312, or the control system 936, may be configured to identify situations that may arise where using the flexible datacenter 500 can reduce costs or increase productivity of the system, as compared to using the traditional datacenter 902 for computational operations. For example, a component within the arrangement of FIG. 9 may identify when using behind-the-meter power to power the computing systems 512 within the flexible datacenter 500 is at a lower cost compared to using the computing systems 934 within the traditional datacenter 902 that are powered by grid power. Additionally, a component in the arrangement of FIG. 9 may be configured to determine situations when offloading computational operations from the traditional datacenter 902 indirectly (i.e., via the queue system 312) or directly (i.e., bypassing the queue system 312) to the flexible datacenter 500 can increase the performance allotted to the computational operations requested by an entity (e.g., reduce the time required to complete time-sensitive computational operations).

In some examples, the datacenter control system 504 may monitor activity of the computing systems 512 within the flexible datacenter 500 and use the respective activity levels to determine when to obtain computational operations from the queue system 312. For instance, the datacenter control system 504 may analyze various factors prior to requesting or accessing a set of computational operations or an indication of the computational operations for the computing systems 512 to perform. The various factors may include power availability at the flexible datacenter 500 (e.g., either stored or from a BTM source), availability of the computing systems 512 (e.g., percentage of computing systems available), type of computational operations available, estimated cost to perform the computational operations at the flexible datacenter 500, cost for power, cost for power relative to cost for grid power, and instructions from other components within the system, among others. The datacenter control system 504 may analyze one or more of the factors when determining whether to obtain a new set of computational operations for the computing systems 512 to perform. In such a configuration, the datacenter control system 504 manages the activity of the flexible datacenter 500, including determining when to acquire new sets of computational operations when capacity among the computing systems 512 permit.

In other examples, a component (e.g., the remote master control system 300) within the system may assign or distribute one or more sets of computational operations organized by the queue system 312 to the flexible datacenter 500. For example, the remote master control system 300 may manage the queue system 312, including the distribution of computational operations organized by the queue system 312 to the flexible datacenter 500 and the traditional datacenter 902. The remote master control system 300 may utilize to information described with respect to the Figures above to determine when to assign computational operations to the flexible datacenter 500.

The traditional datacenter 902 may include a power input system 930, a power distribution system 932, a datacenter control system 936, and a set of computing systems 934. The power input system 930 may be configured to receive power from a power grid and distribute the power to the computing systems 934 via the power distribution system 932. The datacenter control system 936 may monitor activity of the computing systems 934 and obtain computational operations to perform from the queue system 312. The datacenter control system 936 may analyze various factors prior to requesting or accessing a set of computational operations or an indication of the computational operations for the computing systems 934 to perform. A component (e.g., the remote master control system 300) within the arrangement of FIG. 9 may assign or distribute one or more sets of computational operations organized by the queue system 312 to the traditional datacenter 902.

The communication link 916 represents one or more links that may serve to connect the flexible datacenter 500, the traditional datacenter 902, and other components within the system (e.g., the remote master control system 300, the queue system 312—connections not shown). In particular, the communication link 916 may enable direct or indirect communication between the flexible datacenter 500 and the traditional datacenter 902. The type of communication link 916 may depend on the locations of the flexible datacenter 500 and the traditional datacenter 902. Within embodiments, different types of communication links can be used, including but not limited to WAN connectivity, cloud-based connectivity, and wired and wireless communication links.

The queue system 312 represents an abstract data type capable of organizing computational operation requests received from entities. As each request for computational operations are received, the queue system 312 may organize the request in some manner for subsequent distribution to a datacenter. Different types of queues can make up the queue system 312 within embodiments. The queue system 312 may be a centralized queue that organizes all requests for computational operations. As a centralized queue, all incoming requests for computational operations may be organized by the centralized queue.

In other examples, the queue system 312 may be distributed consisting of multiple queue sub-systems. In the distributed configuration, the queue system 312 may use multiple queue sub-systems to organize different sets of computational operations. Each queue sub-system may be used to organize computational operations based on various factors, such as according to deadlines for completing each set of computational operations, locations of enterprises submitting the computational operations, economic value associated with the completion of computational operations, and quantity of computing resources required for performing each set of computational operations. For instance, a first queue sub-system may organize sets of non-intensive computational operations and a second queue sub-system may organize sets of intensive computational operations. In some examples, the queue system 312 may include queue sub-systems located at each datacenter. This way, each datacenter (e.g., via a datacenter control system) may organize computational operations obtained at the datacenter until computing systems are able to start executing the computational operations. In some examples, the queue system 312 may move computational operations between different computing systems or different datacenters in real-time.

Within the arrangement of FIG. 9, the queue system 312 is shown connected to the remote master control system 300 via the communication link 918. In addition, the queue system 312 is also shown connected to the flexible datacenter via the communication 920A and to the traditional datacenter 902 via the communication link 920B. The communication links 918, 920A, 920B may be similar to the communication link 916 and can be various types of communication links within examples.

The queue system 312 may include a computing system configured to organize and maintain queues within the queue system 312. In another example, one or more other components of the system may maintain and support queues within the queue system 312. For instance, the remote master control system 300 may maintain and support the queue system 312. In other examples, multiple components may maintain and support the queue system 312 in a distributed manner, such as a blockchain configuration.

In some embodiments, the remote master control system 300 may serve as an intermediary that facilitates all communication between flexible datacenter 500 and the traditional datacenter 902. Particularly, the traditional datacenter 902 or the flexible datacenter 500 might need to transmit communications to the remote master control system 300 in order to communicate with the other datacenter. As also shown, the remote master control system 300 may connect to the queue system 312 via the communication link 918. Computational operations may be distributed between the queue system 312 and the remote master control system 300 via the communication link 918. The computational operations may be transferred in real-time and mid-performance from one datacenter to another (e.g., from the traditional datacenter 902 to the flexible datacenter 500). In addition, the remote master control system 300 may manage the queue system 312, including providing resources to support queues within the queue system 312.

As a result, the remote master control system 300 may offload some or all of the computational operations assigned to the traditional datacenter 902 to the flexible datacenter 500. This way, the flexible datacenter 500 can reduce overall computational costs by using the behind-the-meter power to provide computational resources to assist traditional datacenter 902. The remote master control system 300 may use the queue system 312 to temporarily store and organize the offloaded computational operations until a flexible datacenter (e.g., the flexible datacenter 500) is available to perform them. The flexible datacenter 500 consumes behind-the-meter power without transmission or distribution costs, which lowers the costs associated with performing computational operations originally assigned to the traditional datacenter 902. The remote master control system 300 may further communicate with the flexible datacenter 500 via communication link 922 and the traditional datacenter 902 via the communication link 924.

Figure 10A:
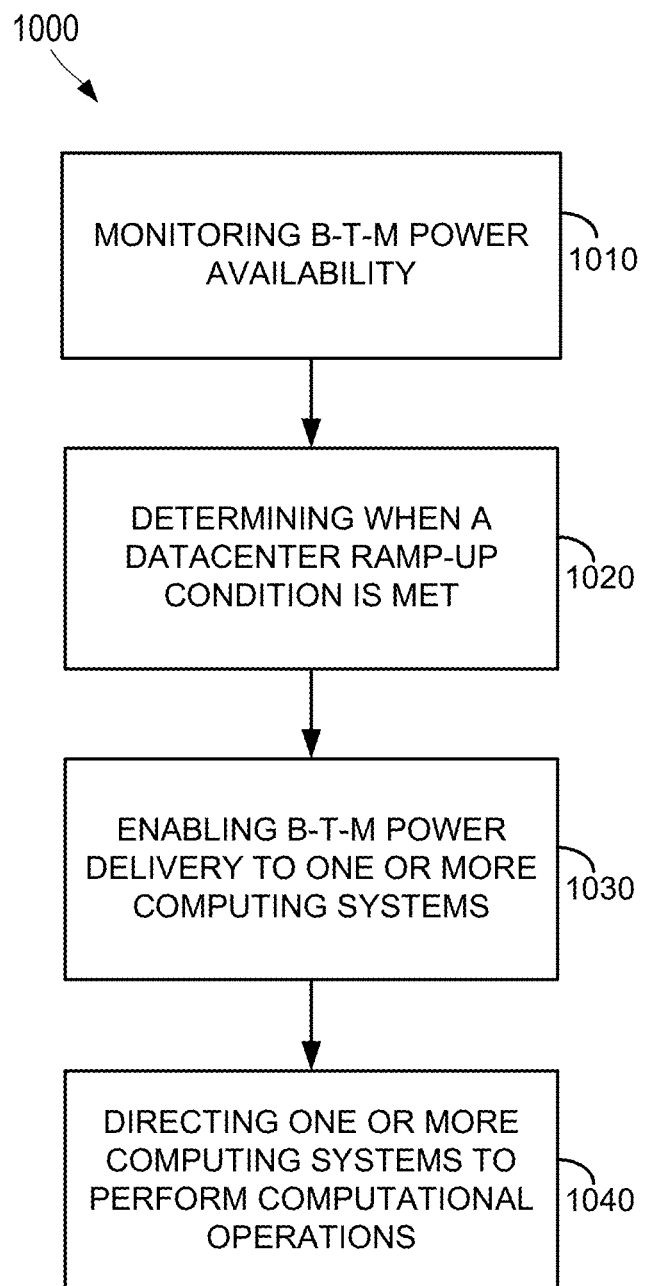
FIG. 10A shows a method of dynamic power consumption at a flexible datacenter using behind-the-meter power, according to one or more example embodiments.

FIG. 10A shows method 1000 of dynamic power consumption at a flexible datacenter using behind-the-meter power according to one or more example embodiments. Other example methods may be used to manipulate the power delivery to one or more flexible datacenters.

In step 1010, the datacenter control system, the remote master control system, or another computing system may monitor behind-the-meter power availability. In some embodiments, monitoring may include receiving information or an operational directive from the generation station control system or the grid operator corresponding to behind-the-meter power availability.

In step 1020, the datacenter control system or the remote master control system 300 may determine when a datacenter ramp-up condition is met. In some embodiments, the datacenter ramp-up condition may be met when there is sufficient behind-the-meter power availability and there is no operational directive from the generation station to go offline or reduce power.

In step 1030, the datacenter control system may enable behind-the-meter power delivery to one or more computing systems. In some instances, the remote mater control system may directly enable BTM power delivery to computing systems within the flexible system without instructing the datacenter control system.

In step 1040, once ramped-up, the datacenter control system or the remote master control system may direct one or more computing systems to perform predetermined computational operations. In some embodiments, the predetermined computational operations may include the execution of one or more distributed computing processes, parallel processes, and/or hashing functions, among other types of processes.

While operational, the datacenter control system, the remote master control system, or another computing system may receive an operational directive to modulate power consumption. In some embodiments, the operational directive may be a directive to reduce power consumption. In such embodiments, the datacenter control system or the remote master control system may dynamically reduce power delivery to one or more computing systems or dynamically reduce power consumption of one or more computing systems. In other embodiments, the operational directive may be a directive to provide a power factor correction factor. In such embodiments, the datacenter control system or the remote master control system may dynamically adjust power delivery to one or more computing systems to achieve a desired power factor correction factor. In still other embodiments, the operational directive may be a directive to go offline or power down. In such embodiments, the datacenter control system may disable power delivery to one or more computing systems.

Figure 10B:
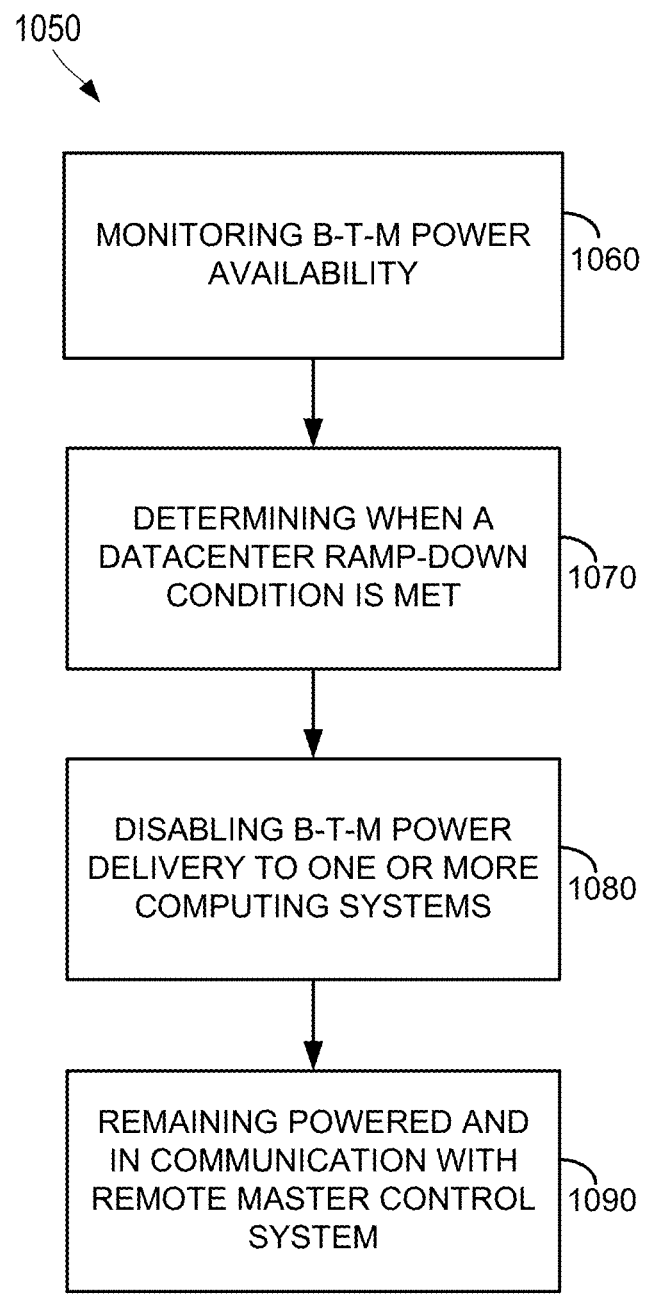
FIG. 10B shows a method of dynamic power delivery at a flexible datacenter using behind-the-meter power, according to one or more example embodiments.

FIG. 10B shows method 1050 of dynamic power delivery to a flexible datacenter using behind-the-meter power according to one or more embodiments. In step 1060, the datacenter control system or the remote master control system may monitor behind-the-meter power availability. In certain embodiments, monitoring may include receiving information or an operational directive from the generation station control system or the grid operator corresponding to behind-the-meter power availability.

In step 1070, the datacenter control system or the remote master control system may determine when a datacenter ramp-down condition is met. In certain embodiments, the datacenter ramp-down condition may be met when there is insufficient behind-the-meter power availability or anticipated to be insufficient behind-the-meter power availability or there is an operational directive from the generation station to go offline or reduce power.

In step 1080, the datacenter control system may disable behind-the-meter power delivery to one or more computing systems. In step 1090, once ramped-down, the datacenter control system remains powered and in communication with the remote master control system so that it may dynamically power the flexible datacenter when conditions change.

One of ordinary skill in the art will recognize that a datacenter control system may dynamically modulate power delivery to one or more computing systems of a flexible datacenter based on behind-the-meter power availability or an operational directive. The flexible datacenter may transition between a fully powered down state (while the datacenter control system remains powered), a fully powered up state, and various intermediate states in between. In addition, flexible datacenter may have a blackout state, where all power consumption, including that of the datacenter control system is halted. However, once the flexible datacenter enters the blackout state, it will have to be manually rebooted to restore power to datacenter control system. Generation station conditions or operational directives may cause flexible datacenter to ramp-up, reduce power consumption, change power factor, or ramp-down.

Figure 11:
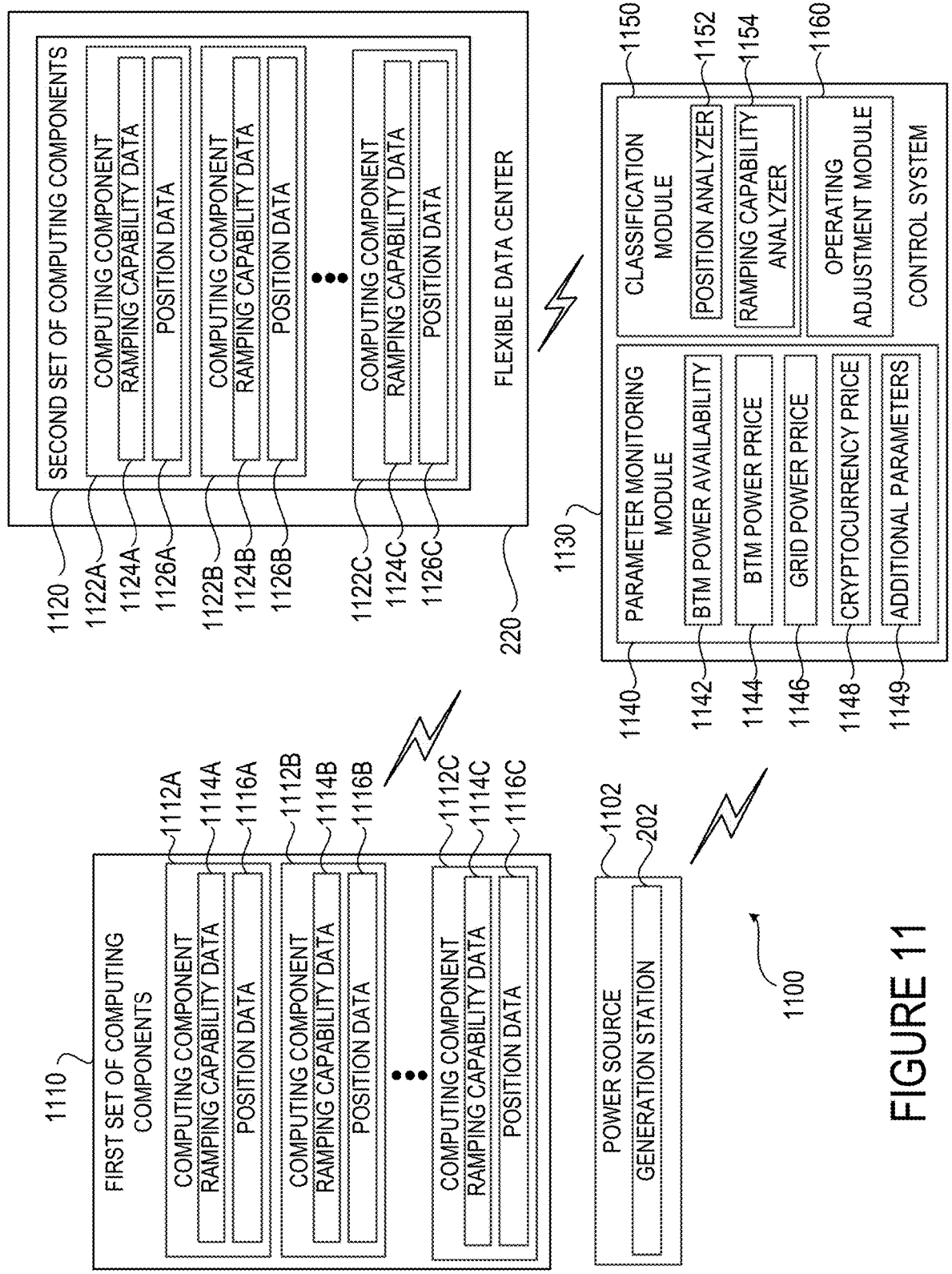
FIG. 11 shows a block diagram of a system for adjusting component operating conditions according to one or more embodiments.

FIG. 11 illustrates a system 1100 for adjusting resource operating conditions according to one or more embodiments. The system 1100 includes a power source 1102, a first set of computing components 1110, a second set of computing components 1120, and a control system 1130. According to the illustrated embodiment of FIG. 11, the second set of computing components 1120 is included at the flexible data center 220. In other embodiments, the second set of computing components 1120 can be independent of the flexible data center 220. For example, one or more of the computing components in the second set of computing components 1120 can be integrated into another device or load. According to one implementation, the second set of computing components 1120 can correspond to the computing systems 512 of FIG. 5.

A computing component may represent a computing system or a component of a computing system. For example, a computing component may correspond to an input unit, an output unit, a storage unit, a central processing unit (CPU), a graphical processing unit (GPU), arithmetic and logic unit (ALU), or a control unit. The term computing component is not meant to be limiting and can vary within embodiments. In some embodiments, the computing components may correspond to various types of hardware components within examples, such as processors, main memory, secondary memory, input devices, and output devices.

The control system 1130 is communicatively coupled to the power source 1102, the first set of computing components 1110, and the second set of computing components 1120. For example, the control system 1130 can communicate, wirelessly or via a wired connection, with the power source 1102, the first set of computing components 1110, and the second set of computing components 1120. According to some implementations, the control system 1130 can correspond to the generation station control system 216 of FIG. 2, the remote master control system 300 of FIG. 3, the generation control system 414 of FIG. 4, the data center control system 504 of FIG. 5, the local station control systems 806A, 806B of FIG. 8, or a combination thereof.

According to other implementations, the control system 1130 can be a standalone control system that is configured to help manage operations at the flexible data center 220. According to yet another implementation, the control system 1130 can be included in the first set of computing components 1110. For example, as described below, similar to the first set of computing components 1110 depicted in FIG. 11, the control system 1130 can operate in a constant power mode, receive utility-scale electrical power associated with an electrical grid, and be located proximate to the power source 1102.

In the illustrated example of FIG. 11, the power source 1102 includes the generation station 202 of FIG. 2. The type of power source 1002 can vary within examples embodiments. For instance, the generation station 202 may be configured to generate utility-scale electrical power (typically >50 MW) for supply to an electrical grid. As non-limiting examples, the generation station 202 can include a nuclear plant, a coal plant, a wind power station, a photovoltaic power station, or a combination thereof.

According to one embodiment, the first set of computing components 1110 and/or the second set of computing components 1120 are connected to the generation station 202 at a location behind a point of interconnection, such as the POI 103, between the generation station 202 and the electrical grid. In addition, one or both of the first set of computing components 1110 and the second set of computing components 1120 may be coupled to receive grid power from the power grid in some example arrangements. As a non-limiting example, the first set of computing components 1110 can be configured to receive utility-scale electrical power associated with an electrical grid.

The generation station 202, and thus the power source 1102, may provide power to the first set of computing components 1110 and to the second set of computing components 1120. For example, the power may correspond to electrical power that is produced by the generation station 202 and transmitted to the first set of computing components 1110 and the second set of computing components 1120 behind the POI 103. According to one implementation, the generation station 202 may be subject to metering by one or more utility-scale generation-side meters, such as the utility-scale generation-side meter 253 of FIG. 2. In such a configuration, BTM power transmitted to the sets of computing components 1110, 1120 may be power that does not pass through the one or more utility-scale generation-side meters. Additionally, the utility-scale electrical power supplied to the electrical grid can be subject to transmission charges, distribution charges, or both. Conversely, the BTM power supplied to the sets of computing components 1110, 1120 might not be subject to transmission charges or distribution charges. As described below, the control system 1130 is configured to monitor different parameters associated with an availability of BTM power at the power source 1102 and to adjust operating conditions of computing systems and power distribution of the BTM power based on changes in the parameters.

The first set of computing components 1110 can be located in a first region positioned proximate a generation station control system associated with the generation station 202. In particular, the first set of computing components 1110 may have a position within a climate controlled environment of the generation station 202 or a nearby building. This way, these components can have protection from temperature changes and weather in an external environment. As such, the first set of computing components 1110 may include computing components that operate optimally in climate controlled spaces. In some embodiments, these components may include high cost components or complex components that would be difficult to replace.

In some embodiments, the first set of computing components 1110 may include a control system, memory, or other components that operate better in climate-controlled settings. For instance, the components may be selected based on optimum temperatures because the first region may include air conditioning and other protection from temperature and weather elements. In further embodiments, the first set of computing components 1110 may also include components that administrators might desire easy access to and placement of these components at the first region may make them more accessible overall.

In the illustrated embodiment of FIG. 11, the first set of computing components 1110 includes a computing component 1112A, a computing component 1112B, and a computing component 1112C. Although three computing components 1112 are illustrated in the first set of computing components 1110 depicted in FIG. 11, in other implementations, the first set of computing components 1110 can include additional computing systems or fewer computing systems. For example, in one implementation, the first set of computing components 1110 can include fifteen computing systems. According to another implementation, the first set of computing components 1110 can include a single computing component.

According to one embodiment, the computing components 1112A-C in the first set of computing components 1110 may be high priority components. For example, the computing components 1112A-C may support vital operations that require a consistent power supply for power consumption above a threshold power consumption threshold (e.g., 95 percent availability).

The computing components 1112A-C may include one or more control systems, specialized computing components, memory, and/or other types computing resources. These computing components may be configured to perform high priority computational operations and/or may require a climate-controlled environment. Thus, the computing components 1112A-C in the first set of computing components 1110 can be configured to operate in a constant power mode or a steady-state power mode. For example, each computing component 1112A-C of the first set of computing components 1110 can be configured to maintain constant power consumption during operation. To illustrate, the first set of computing components 1110 can receive utility-scale electrical power associated with the electrical grid to ensure that the computing components 1112A-C receive constant power to operate in the constant power mode. According to some implementations, the first set of computing components 1110 can be associated with a grid connected center with "baseload" power. Although described as receiving "constant power," in some implementations, the first set of computing components 1110 can ramp down when grid power is too expensive or for purposes of ancillary revenue. Thus, in some implementations, the first set of computing components 1110 can operate in a constant power mode for approximately ninety-five percent (95%) of the time (e.g., the first set of computing components 1110 can have 95% availability).

Additionally, because of the high priority associated with the first set of computing components 1110, the first set of computing components 1110 can be positioned proximate to, or onsite of, the power source 1102 to receive power from the power source 1102. For example, in scenarios where the utility-scale electrical power is unavailable, the first set of computing components 1110 can receive BTM power from the power source 1102 so that continuous power is supplied to the first set of computing components 1110. Thus, in some examples, the computing components 1112A-C may be configured to receive BTM power from the power source 1102 in addition to (or in replacement of) power from the power grid. In turn, the computing components 1112A-C may operate using BTM power in situations where grid power is limited or unavailable at the computing components 1112A-C. In addition, one or more computing components 1112A-C may have access to a power storage system (e.g., a battery).

The computing component 1112A includes ramping capability data 1114A and position data 1116A. The ramping capability data 1114A can indicate whether the computing component 1112A is capable of transitioning between different operating conditions. For example, the ramping capability data 1114A indicates whether the computing component 1112A is configured to operate in a constant power mode or whether the computing component 1112A is configured to change operating conditions (e.g., a power mode, an operating frequency, a processing speed, etc.) based on power availability. The position data 1116A indicates a position of the computing component 1112A. The computing component 1112B includes ramping capability data 1114B and position data 1116B. The ramping capability data 1114B indicates whether the computing component 1112B is capable of transitioning between different operating conditions. For example, the ramping capability data 1114B indicates whether the computing component 1112B is configured to operate in a constant power mode or whether the computing component 1112B is configured to change operating conditions based on power availability. The position data 1116B indicates a position of the computing component 1112B. The computing component 1112C includes ramping capability data 1114C and position data 1116C. The ramping capability data 1114C indicates whether the computing component 1112C is capable of transitioning between different operating conditions. For example, the ramping capability data 1114C indicates whether the computing component 1112C is configured to operate in a constant power mode or whether the computing component 1112C is configured to change operating conditions based on power availability. The position data 1116C indicates a position of the computing component 1112C.

According to one implementation, the position data 1116A-C can indicate a relative position of the corresponding computing components 1112A-C with respect to the power source 1102. To illustrate, the computing component 1112A can communicate with the BTM power source 1110 via wired or wireless communication. The power source 1102 can send global positioning system (GPS) coordinates, indicative of a position of the power source 1102, to the computing component 1112A. Additionally, the computing component 1112A can include GPS capabilities (i.e., can include a GPS detection system (not shown)) to determine GPS coordinates of the computing component 1112A. Based on the GPS coordinates of the power source 1102 and the GPS coordinates of the computing component 1112A, the computing component 1112A can perform computational operations to determine the relative position of the computing component 1112A with respect to the power source 1102. Additionally, or in the alternative, the computing component 1112A can perform computational operations using the GPS coordinates to determine a distance between the computing component 1112A and the power source 1102. Although the above example is described with respect to the use of GPS, the position data 1116A can also be obtained using other positioning techniques. In some examples, the control system 1130 may receive position information for the computing component 1112A during the initial set up of the computing component 1112A. The position data 1116B and the position data 1116C can be determined in a similar manner as the position data 1116A.

The computing components 1112A-C are configured to share the respective ramping capability data 1114A-C and respective the position data 1116A-C with the control system 1130. As described below, the control system 1130 can use the ramping capability data 1114A-C and the position data 1116A-C to determine whether to adjust the operating conditions of the computing components 1112A-C based on power availability.

The second set of computing components 1120 can be located in a second region that is positioned remotely from the generation station control system associated with the generation station 202. The second region may differ from the first region in various ways within embodiments. In some examples, the second region may be farther from the generation station 202. In addition, the second region may have a different environment for housing the second set of computing components 1120. For example, the second region may lack a climate controlled environment. Similarly, the resources (e.g., power connections) may vary at the second region relative to the first region. In some embodiments, the second set of computing components 1120 may be exposed to ambient air, temperature fluctuations, and/or various weather conditions.

In the illustrated embodiment of FIG. 11, the second set of computing components 1120 includes a computing component 1122A, a computing component 1122B, and a computing component 1122C. Although three computing components 1122 are illustrated in the second set of computing components 1120 depicted in FIG. 11, in other implementations, the second set of computing components 1120 can include additional computing systems or fewer computing systems. For example, in one implementation, the second set of computing components 1120 can include twenty computing systems. According to another implementation, the second set of computing components 1120 can include a single computing system.

According to one embodiment, the computing components 1122A-C in the second set of computing components 1120 may be low priority computing systems. For example, the computing components 1122A-C can support non-vital operations, such as mining operations, that can function using an intermittent power supply. According to one implementation, the computing components 1122A-C in the second set of computing components 1120 can be located at a flexible datacenter, ramp up and down power consumption, and perform operations with an availability that is lower than the first set of computing components (e.g., approximately eighty percent (80%) of the time).

Each computing component 1122A-C of the second set of computing components 1120 may be configured to adjust power consumption during operation and can operate at various consumption levels. In particular, the computing components 1122A-C may be configured to ramp up and ramp down power consumption when performing operations based on BTM availability. In one aspect, a non-vital operation may correspond to a computational operation with an assigned low priority. For example, a client submitting the computational operation and/or an administrator may assign low priority to a computational operation. In another aspect, the control system 1130 or another computing system may determine which computational operations are non-vital based on one or more factors, such as a deadline associated with completion of the computational operation, a contract associated with the computational operation, and/or aspects of the computational operations (e.g., related to control scheme of the datacenter), among other aspects. As such, because of the low priority associated with the second set of computing components 1120, the second set of computing components 1120 can be positioned at a remote location from the power source 1102 to receive intermittent BTM power from the power source 1102. In one embodiment, at least one computing component 1122A-C in the second set of computing components 1120 can be configured to perform one or more computational operations, such as mining for cryptocurrencies, supporting blockchain ledgers, or performing blockchain operations.

According to one implementation, a particular datacenter housing the second set of computing systems 1120 can manage power consumption using a "Smart Response" technology. For example, if the particular datacenter is co-located at BTM power source, the Smart Response technology can produce target power shapes over different time frames if a satisfactory amount of BTM power is generated. Additionally, the Smart Response technology enables the particular datacenter to participate in ancillary service markets and demand response programs. For example, the Smart Response technology can identify special rates or programs that make it finically beneficial to ramp down (or ramp up) power consumption. According to one implementation, the particular datacenter can use the Smart Response technology to ramp down (or ramp up) power consumption at granular levels (e.g., at intervals of less than one kilowatt).

The computing component 1122A includes ramping capability data 1124A and position data 1126A. The ramping capability data 1124A indicates whether the computing component 1122A is capable of transitioning between different operating conditions. For example, the ramping capability data 1124A indicates whether the computing component 1122A is configured to operate in a constant power mode or whether the computing component 1122A is configured to change operating conditions based on power availability. The position data 1126A indicates a position of the computing component 1122A. The computing component 1122B includes ramping capability data 1124B and position data 1126B. The ramping capability data 1124B indicates whether the computing component 1122B is capable of transitioning between different operating conditions. For example, the ramping capability data 1124B indicates whether the computing component 1122B is configured to operate in a constant power mode or whether the computing component 1122B is configured to change operating conditions based on power availability. The position data 1126B indicates a position of the computing component 1122B. The computing component 1122C includes ramping capability data 1124C and position data 1126C. The ramping capability data 1124C indicates whether the computing component 1122C is capable of transitioning between different operating conditions. For example, the ramping capability data 1124C indicates whether the computing component 1122C is configured to operate in a constant power mode or whether the computing component 1122C is configured to change operating conditions based on power availability. The position data 1126C indicates a position of the computing component 1122C. The position data 126A-C can be determined in a similar manner as the position data 1116A.

The computing components 1122A-C are configured to send the respective ramping capability data 1124A-C and respective the position data 1126A-C to the control system 1130. As described below, the control system 1130 can use the ramping capability data 1124A-C and the position data 1126A-C to determine whether to adjust the operating conditions of the computing components 1122A-C based on power availability. For example, the control system 1130 may provide instructions to ramp up or ramp down power consumption at one or more of the computing components 1122A-C based on power availability and/or other parameters as described below.

The control system 1130 includes a parameter monitoring module 1140, a classification module 1150, and an operating adjustment module 1160. The parameter monitoring module 1140 is configured to monitor a set of parameters associated with an availability of BTM power from the BTM source 1102. As illustrated in FIG. 11, the parameter monitoring module 1140 can monitor one or more of BTM power availability 1142, a BTM power price 1144, a grid power price 1146, a cryptocurrency price 1148, or additional parameters 1149.

To directly monitor the BTM power availability 1142, such as the BTM power availability at the second set of computing components 1120, the parameter monitoring module 1140 can communicate (i.e., wirelessly or via a wired connection) with the generation station control system 216 to receive data indicating an amount of power the generation station 202 is generating at a particular point in time. This may include projections of future power production at the generation station 202. The parameter monitoring module 1140 can also determine how much power is being provided to the electrical grid by receiving data from a utility-scale generation meter, such as the utility-scale generation-side meter 253 of FIG. 2. Based on the data received from the generation station control system 216 and the utility-scale generation-side meter 253, the parameter monitoring module 1140 can perform computational operations to determine (i.e., monitor) the BTM power availability 1142. As a non-limiting example, power generated by the BTM source 1102 that is not provided to the electrical grid is indicative of the BTM power availability 1142.

The BTM power price 144 is indicative of a variable market price for BTM power. According to one embodiment, the BTM power price 1144 is indicative of a price that operators of BTM loads, such as the flexible data center 220, are willing to pay to receive BTM power from the power source 1102. The BTM power price 1144 can be determined via a power purchase agreement (PPA) between an operator of the generation station 202 and an operator of a BTM load. Availability of BTM power may increase as the BTM power price 1144 increases. For example, if the BTM power price 1144 is substantially more profitable to the operator of the generation station 202 than the grid power price 1146, as described below, the parameter monitoring module 1140 can indicate that a substantial amount of BTM power is available for purely economic reasons.

The grid power price 1146 is indicative of a variable market price for the amount of power the power source 1102 provides to the grid. The grid power price 1146 can be determined via a PPA between an operator of the generation station 202 and a grid operator. Availability of BTM power may increase as the grid power price 1146 decreases. For example, if the grid power price 1146 is substantially less profitable to the operator of the generation station 202 than the BTM power price 1144, the parameter monitoring module 1140 can indicate that a substantial amount of BTM power is available for purely economic reasons.

The additional parameters 1149 monitored by the parameter monitoring module 1140 can include weather conditions proximate to the power source 1102. For example, if the generation station 202 is a wind farm, wind conditions can impact an amount of BTM power that is available. To illustrate, if the weather condition indicates that there is a relatively large amount of wind proximate to the power source 1102, the parameter monitoring module 1140 can indicate that a substantial amount of BTM power is available. For example, the amount of power generated by the wind farm (i.e., the generation station 202) may greatly exceed the amount of power negotiated to be provided to the electrical grid. As a result, the excess power generated by the windy conditions can be used as BTM power.

In some examples, weather conditions may cause BTM power from the generation station 202 to be limited or not available at all. Thus, the parameter monitoring module 1140 may weigh weather conditions proximate to computing systems and/or the generation station 202 to assist the control system 1130 make operation decisions.

In some embodiments, the additional parameters 1149 may relate to information that can help the control system 1130 generate ancillary revenue. For example, the information may indicate a frequency status of the power grid that enables the control system 1130 to adjust power consumption via one or more computing components to help balance the grid. For instance, the control system 1130 can ramp down power consumption at the first set and second set of computing components to enable the grid to allocate that power to other loads on the grid. Similarly, the control system 1130 may also ramp up power consumption at the first set and second set of computing components to consume more power from the grid to help balance the overall power consumption by loads coupled to the grid.

Similarly, the additional parameters 1149 may include demand and supply information for power from one or more power sources (e.g., BTM power and grid power) across one or more time periods (e.g., next 24 hours). As such, the control system 1130 may adjust power consumption based on the demand and supply information. For instance, the control system 1130 may ramp down power consumption (or ramp up) to accommodate and help stabilize anticipated fluctuations in power demand by loads coupled to the power grid. It should be appreciated that other parameters, such as the parameters and factors described with respect to FIGS. 1-10B, can be included in the additional parameters 1149 monitored by the parameter monitoring module 1140.

The classification module 1150 includes a position analyzer 1152 and a ramping capability analyzer 1154. The position analyzer 1152 may be configured to determine a position of each computing component 1112A-C, 1122A-C with respect to the power source 1102. For example, the position analyzer 1152 can receive the position data 1116A-C, 1126A-C from each set of computing components 1110, 1120, respectively. As described above, in one embodiment, the position data 1116A-C, 1126A-C can indicate the position of the corresponding computing component 1112A-C, 1122A-C with respect to the power source 1102. In embodiments whereby the position data 1116A-C, 1126A-C does not indicate the position of the corresponding computing component 1112A-C, 1122A-C with respect to the power source 1102, the position analyzer 1152 can use the GPS coordinates (or other positional information) of the power source 1102 to determine the position of each computing component 1112A-C, 1122A-C with respect to the power source 1102.

In the embodiment illustrated in FIG. 11, the classification module 1150 can determine, based on the position data 1116, 1126, that the first set of computing components 1110 (i.e., the high priority computing systems) is positioned within a first region that is proximate to the power source 1102 and the second set of computing 1120 (i.e., the low priority computing systems) is positioned within a second region that is remote from the power source 1102. According to one implementation, the first region can correspond to a climate-controlled environment near the generation station 202 that stores temperature-sensitive processing resources. For example, the first set of computing components 1110 can include a plurality of temperature-sensitive computing resources positioned within a climate-controlled environment at the first region. According to one implementation, the control system 130 can generate a command to position temperature-sensitive processing resources, such as a random access memory device, within the first region. According to one implementation, the second region can be exposed to ambient air that stores other processing resources (i.e., non-temperature-sensitive processing resources). For example, the second set of computing components 1120 can be positioned within the flexible datacenter 2220 such that each computing component 1122A-C of the second set of computing components 1120 is exposed to ambient air and a threshold range of temperatures (e.g., cold to hot temperatures depending on the location). According to one implementation, the control system 130 can generate a command to position other processing resources, such as a central processing unit, within the second region.

According to one implementation, the first region is positioned within a threshold distance from the generation station control system associated with the generation station 202. The second region can be positioned beyond the threshold distance from the generation station control system. However, in some implementations, the second region is positioned proximate the first region.

The ramping capability analyzer 1154 is configured to determine ramping capabilities of each computing component 1112A-C, 1122A-C and classify each computing component 1112A-C, 1122A-C as a constant power mode resource or a ramping-enabled resource (e.g., a resource that is configured to transition between operating conditions). For example, in the embodiment of FIG. 11, the classification module 1150 can also determine, based on the ramping capability data 1114 that each computing component 1112A-1112C of the first set of computing components 1110 operates in a constant power mode. The classification module 1150 can also determine, based on the ramping capability data 1124, that each computing component 1122A-1122C of the second set of computing components 1120 is configured to transition between operating conditions (i.e., is a ramping-enabled resource).

As described above, the constant power mode computing systems (i.e., the first set of computing components 1110) can be higher priority resources than the ramping-enabled resources (i.e., the second set of computing components 1120). For example, the first set of computing components 1110 can be coupled to a line of power to continuously receive grid power (or BTM power) to perform high priority operations. According to one implementation, the first set of computing components 1110 can be coupled to continuously receive power to communicate with the control system 1130. The second set of computing components 1120 can perform lower priority operations, such as mining operations, that can be paused or performed at a lower rate.

Due to the higher priority, the control system 1130 is configured to provide power consumption instructions to the first set of computing components 1110 such that each computing component 1112A-C of the first set of computing components 1110 maintains constant power consumption during operation using the BTM power from the BTM power generation station or the utility-scale electrical power from the electrical grid. For example, while monitoring the set of parameters 1142-1149, the control system 1130 is configured to provide the power consumption instructions to the first set of computing components 1110. According to one implementation, if the control system 1130 determines that the BTM power availability 1142 at the first set of computing components 1110 is below a threshold level, the control system 1130 can send power consumption instructions to the first set of computing components 1110 that indicate the first set of computing components 1110 needs to switch to receiving utility-scale electrical power from the electrical grid.

According to one implementation, the control system 1130 is configured to perform a comparison between a price 1144 for the BTM power and a price 1146 for the utility-scale electrical power. Based on the comparison, the control system 1130 can determine the power consumption instructions. According to one implementation, the control system 1130 is configured to determine the BTM power availability at the first set of computing components 1110 for an upcoming duration prior to performing the comparison between the price 1144 for the BTM power and the price 1146 for the utility-scale electrical power.

Due to the lower priority, the second set of computing components 1120 can ramp up and down power consumption based on the availability of power (i.e., BTM power or grid power). For example, the control system 1130 is configured to adjust power consumption at one or more computing components 1122A-C of the second set of computing components 1120 based on a monitored set of parameters (e.g., BTM power availability 1142). To illustrate, the operating adjustment module 1160 is configured to adjust an operating condition of at least one computing system in the second set of computing components 1120 based on the availability of BTM power from the BTM source 1102. The operating adjustment module 1160 can adjust an operating condition of at least one computing component 1122A-C of the second set of computing components 1120 based on the set of parameters monitored by the parameter monitoring module 1140. As a result, in scenarios where a limited supply of BTM power is available, the high-priority computing systems (i.e., the first set of computing components 1110) receive the BTM power, and operating conditions of low-priority resources are adjusted based on a lack of provided BTM power. Thus, the operating adjustment module 1160 of the control system 1130 is configured to bypass adjustment of operating conditions of the first set of computing components 1110 based on the parameters monitored by the parameter monitoring module 1140.

According to one implementation, while monitoring the set of parameters 1142-1149, the control system 1130 is configured to determine a decrease in a cost associated with using BTM power (e.g., a decrease in the BTM power price 1144) at the second set of computing components 1120. Responsive to determining the decrease in cost, the control system 1130 is configured to cause one or more computing components 1122A-C of the second set of computing components 1120 to increase frequency during operation.

According to one implementation, while monitoring the set of parameters 1142-1149, the control system 1130 is configured to determine a decrease in a cost associated with using BTM power (e.g., a decrease in the BTM power price 1144) at the second set of computing components 1120. Responsive to determining the decrease in cost, the control system 1130 is configured to cause one or more computing components 1122A-C of the second set of computing components 1120 to ramp up power consumption.

According to one implementation, while monitoring the set of parameters 1142-1149, the control system 1130 is configured to determine an increase in a cost associated with using BTM power (e.g., an increase in the BTM power price 1144) at the second set of computing components 1120. Responsive to determining the increase in cost, the control system 1130 is configured to cause one or more computing components 1122A-C of the second set of computing components 1120 to switch to a low power mode.

According to one implementation, while monitoring the set of parameters 1142-1149, the control system 1130 is configured to determine an increase in a cost associated with using BTM power (e.g., an increase in the BTM power price 1144) at the second set of computing components 1120. Responsive to determining the increase in cost, the control system 1130 is configured to cause one or more computing components 1122A-C of the second set of computing components 1120 to power off.

Based on the positioning of each set of computing components 1110, 1120 and the ramping capabilities of the computing systems, in the illustrated embodiment of FIG. 11, the computing systems that operate in a constant power mode (i.e., the first set of computing components 1110) are positioned in a region that is proximate to the power source 1102 and the computing systems that are configured to transition between operating conditions (i.e., the second set of computing components 1120) are positioned in a region that is remote from the power source 1102. If the parameters monitored by the parameter monitoring module 1140 indicate a potential shortage of BTM power, the operating adjusting module 1160 may adjust the operating conditions of the computing components 1120 positioned remotely from the power source 1102. For instance, the control system 1130 may provide instructions to a control system at each set of computing systems and/or instructions to specific computing systems within each set.

To illustrate, the operating adjustment module 1160 can adjust the operating condition of at least one computing system, such as the computing component 1122A, of the second set of computing components 1120 by adjusting an amount of BTM power that is provided to the computing component 1122A. For example, if the monitored parameters indicate there is a shortage of BTM power, the operating adjustment module 1160 can deactivate a switch coupled to the computing component 1122A, shunt a power supply path between the power source 1102 and the computing component 1122A, etc. If the monitored parameters indicate that the shortage of BTM power has expired, the operating adjustment module 1160 can activate the switch coupled to the computing component 1122A to enable the computing system to receive BTM power.

The operating adjustment module 1160 can also adjust the operating condition of the computing component 1122A by causing the computing component 1122A to transition into one of a low power mode or high power mode. For example, if the monitored parameters indicate there is a shortage of BTM power, the operating adjustment module 1160 can send a signal to the computing component 1122A to initiate a transition of the computing component 1122A into a low power mode (e.g., ramp down power consumption). If the monitored parameters indicate that the shortage of BTM power has expired, the operating adjustment module 1160 can send another signal to the computing component 1122 to initiate a transition the computing component 1122A into a high power mode (e.g., ramp up power consumption).

The operating adjustment module 1160 can also adjust the operating condition of the computing component 1122A by causing the computing system to power on or power off. For example, if the monitored parameters indicate there is a shortage of BTM power, the operating adjustment module 1160 can send a signal to the computing component 1122A to initiate a powering off of the computing component 1122A. If the monitored parameters indicate that the shortage of BTM power has expired, the operating adjustment module 1160 can send another signal to the computing component 1122 to initiate a powering on of the computing component 1122A.

The operating adjustment module 1160 can also adjust the operating condition of the computing component 1122A by adjusting an operating frequency or processing speed of the computing component 1122A. For example, if the monitored parameters indicate there is a shortage of BTM power, the operating adjustment module 1160 can send a signal to the computing component 1122A to reduce the operating frequency of the computing component 1122A, the processing speed of the computing component 1122A, or both. If the monitored parameters indicate that the shortage of BTM power has expired, the operating adjustment module 1160 can send another signal to the computing component 1122 to increase the operating frequency of the computing component 1122A, the processing speed of the computing component 1122A, or both.

Although the above examples of adjusting the operating condition are directed to a single computing system (i.e., the computing component 1122A), it should be appreciated that the techniques described with respect to adjusting the operating condition of a single computing system can also be used to concurrently adjust the operating condition of multiple computing systems (i.e., multiple computing systems in the second set of computing components 1120). Additionally, the operating conditions of the computing components 1122A-C can be sequentially adjusted based on an amount of available BTM power. For example, if there is still shortage of available BTM power after adjusting the operating condition of the computing component 1122A to consume less power, the operating adjustment module 1160 can adjust the operating condition of the computing component 1122B to consume less power.

The techniques described with respect to FIG. 11 can enable high priority computing systems that are nearby the power source 1102 (i.e., "on-site" computing systems) to remain operational when there is a limited amount of power available. As a result, higher priority operations can be continuously performed while performance of lower priority operations can be selectively adjusted based on the availability of BTM power.

Figure 12:
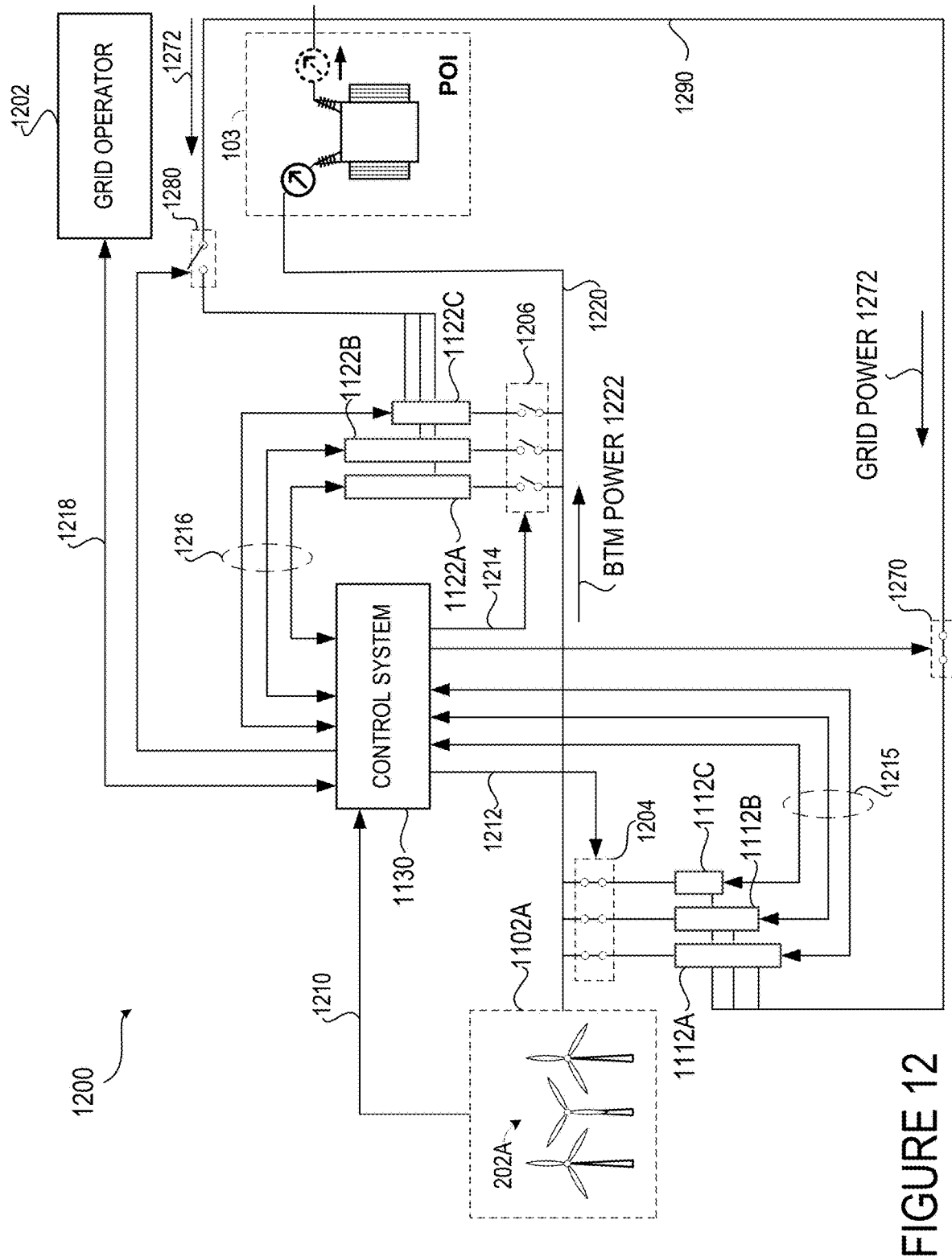
FIG. 12 shows another diagram of a system for adjusting component conditions according to one or more example embodiments.

FIG. 12 illustrates another system 1200 for adjusting resource operating conditions according to one or more embodiments. The system 1200 includes a BTM power source 1102A, the control system 1130, the POI 103, and a grid operator 1202. The BTM power source 1102A can correspond to an embodiment of the BTM power source 1102 illustrated in FIG. 11. As illustrated in FIG. 12, the BTM power source 1102 includes a generation station 202A that is configured to generate BTM power 1222 that is transmitted along a power transmission line 1220. In FIG. 12, the generation station 202A is depicted as a wind power station. However, it should be appreciated that the generation station 202A can include other types of stations that are operable to generate BTM power, such as a nuclear plant, a coal plant, a photovoltaic power station, or a combination thereof. The generation station 202A can include additional components that are not illustrated in FIG. 12. For example, the generation station 202A can include one or more components of the generation station 202 depicted in FIG. 2.

In FIG. 12, the control system 1130 is coupled to the BTM power source 1102 via a communications bus 1210. Via the communications bus 1210, the control system 1130 can receive information indicating an amount of BTM power 1222 that is generated at the BTM power source 1102 or projected to be generated at the BTM power source 1102 in the near term (e.g., the next 1-5 hours of projected production). For example, the control system 1130 can receive an indication of the BTM power availability 1142 via the communications bus 1210. The control system 1130 can also receive additional parameters 1149, such as an indication of weather conditions proximate to the BTM power source 1102A, via the communications bus 1210.

The control system 1130 is also coupled to receive information from the grid operator 1202 via a communications bus 1218. As non-limiting examples, the control system 1130 can receive information indicative of the grid power price 1146, information indicative of an amount of power negotiated to be supplied to an electrical grid, etc. Based on the received information, the control system 1130 can monitor different parameters associated with BTM power availability, as described with respect to FIG. 11, to determine whether to adjust the operating conditions of computing components 1122A-C positioned remotely from the BTM power source 1102A.

The first set of computing components 1110 (i.e., the computing component 1112A, the computing component 1112B, and the computing component 1112C) are coupled to the power transmission line 1220 via a plurality of switches 1204. Thus, when each switch of the plurality of switches 1204 is activated, the generation station 202A provides BTM power 1222 to the computing components 1112A-C via the power transmission line 1220. The control system 1130 can send one or more signals to the plurality of switches 1204 via a communication bus 1212. For example, via the communication bus 1212, the control system 1130 can send a signal to activate a switch that couples the computing component 1112A to the transmission line 1220. The computing component 1112A can receive the BTM power 1222 from the generation station 202A via the power transmission line 1220 in response to the control signal 1130 activating the switch. In a similar manner, the control signal 1130 can signals to activate switches that couple the computing components 1112B, 1112C to the transmission line 1220 to receive the BTM power 1222 from the generation station 202A. As a result, the computing components 1112A-C can receive continuous power (e.g., the BTM power 1222) to enable operation in a constant power mode.

The first set of computing components 1110 (i.e., the computing component 1112A, the computing component 1112B, and the computing component 1112C) are also coupled to a power transmission line 1290 via a switch 1270. Thus, when the switch 1270 is activated, grid power 1272 (e.g., utility-scale electrical power) is provided to the computing components 1112A-C. For example, the control system 1130 can send a signal to activate the switch 1270 that couples the computing components 1112A-C to the transmission line 1290. As a result, the computing components 1112A-C can receive continuous power (e.g., the grid power 1272) to enable operation in a constant power mode.

The control system 1130 ensures that continuous power (e.g., the BTM power 1222, the grid power 1272, or both) is provided to the computing components 1112A-C in response to determining that the computing components 1112A-C are to operate in the constant power mode. For example, the computing components 1112A-C are configured to communicate with the control system 1130 via communication busses 1215. The computing components 1112A-C can send the ramping capability data 1114A-C and the position data 1116A-C to the control system 1130 via the communication busses 1215. In scenarios where the ramping capability data 1114A-C indicates that the computing components 1112A-C are to operate in the constant power mode and the position data 1116A-C indicates that the computing components 1112A-C are proximate to the BTM power source 1102A, the control system 1130 can activate the switches 1204, 1270 to ensure that continuous power is supplied to the computing components 1112A-C.

The second set of computing components 1120 (i.e., the computing component 1122A, the computing component 1122B, and the computing component 1122C) are coupled to the power transmission line 1220 via a plurality of switches 1206. Thus, when each switch of the plurality of switches 1206 is activated, the generation station 202A provides BTM power 1222 to the computing components 1122A-C via the power transmission line 1220. The control system 1130 can send one or more signals to the plurality of switches 1206 via a communication bus 1214. For example, via the communication bus 1214, the control system 1130 can send a signal to activate a switch that couples the computing component 1122A to the transmission line 1220. The computing component 1122A can receive the BTM power 1222 from the generation station 202A via the power transmission line 1220 in response to the control signal 1130 activating the switch. In a similar manner, the control signal 1130 can signals to activate switches that couple the computing components 1122B, 1122C to the transmission line 1220 to receive the BTM power 1222 from the generation station 202A.

The second set of computing components 1120 (i.e., the computing component 1122A, the computing component 1122B, and the computing component 1122C) are also coupled to the power transmission line 1290 via a switch 1280. Thus, when the switch 1280 is activated, the grid power 1272 (e.g., utility-scale electrical power) is provided to the computing components 1122A-C. For example, the control system 1130 can send a signal to activate the switch 1280 that couples the computing components 1122A-C to the transmission line 1290.

The computing components 1122A-C are configured to communicate with the control system 1130 via communication busses 1216. For example, the computing components 1122A-C can send the ramping capability data 1124A-C and the position data 1126A-C to the control system 1130 via the communication busses 1216. Additionally, the control system 1130 can send one or more commands to the computing components 1122A-C via the communication busses 1216. For example, in response to determining that the computing components 1122A-C can transition between operating conditions, the control system 1130 can send commands to power off the computing components 1122A-C, power on the computing components 1122A-C, transition the computing components 1122A-C into a low power mode, transition the computing components 1122A-C into a high power mode, increase or decrease a processing speed of the computing components 1122A-C, increase or decrease an operating frequency of the computing components 1122A-C, etc. As explained with respect to FIG. 11, the control system 1130 sends the commands to the computing components 1122A-C based on monitored parameters associated with the availability of the BTM power 1222.

Because the computing components 1112A-C positioned proximate to the BTM power source 1102A have a higher priority than the computing components 1122A-C positioned remotely from the BTM power source 1102A and because the computing components 1122A-C have ramping capabilities, in scenarios where availability of the BTM power 1222 is limited, the control system 1130 can adjust the operating conditions of the computing components 1122A-C to receive less of the BTM power 1222. Thus, in the illustrative example of FIG. 12, each switch of the plurality of switches 1204 is activated (i.e., in a conducting or "closed" state) to enable the respective computing components 1112A-C to receive BTM power 1222, and each switch of the plurality of switches 1206 is deactivated (i.e., in an insulating or "open" state) to substantially prevent the respective computing components 1122A-C from receiving BTM power 1222.

The techniques described with respect to FIG. 12 enable computing components 1112A-C that are nearby the BTM power source 1102A (i.e., "on-site" computing systems) to remain operational when there is a limited amount of power. As a result, higher priority operations can be continuously performed while performance of lower priority operations can be selectively adjusted based on the availability of BTM power.

Figure 13:
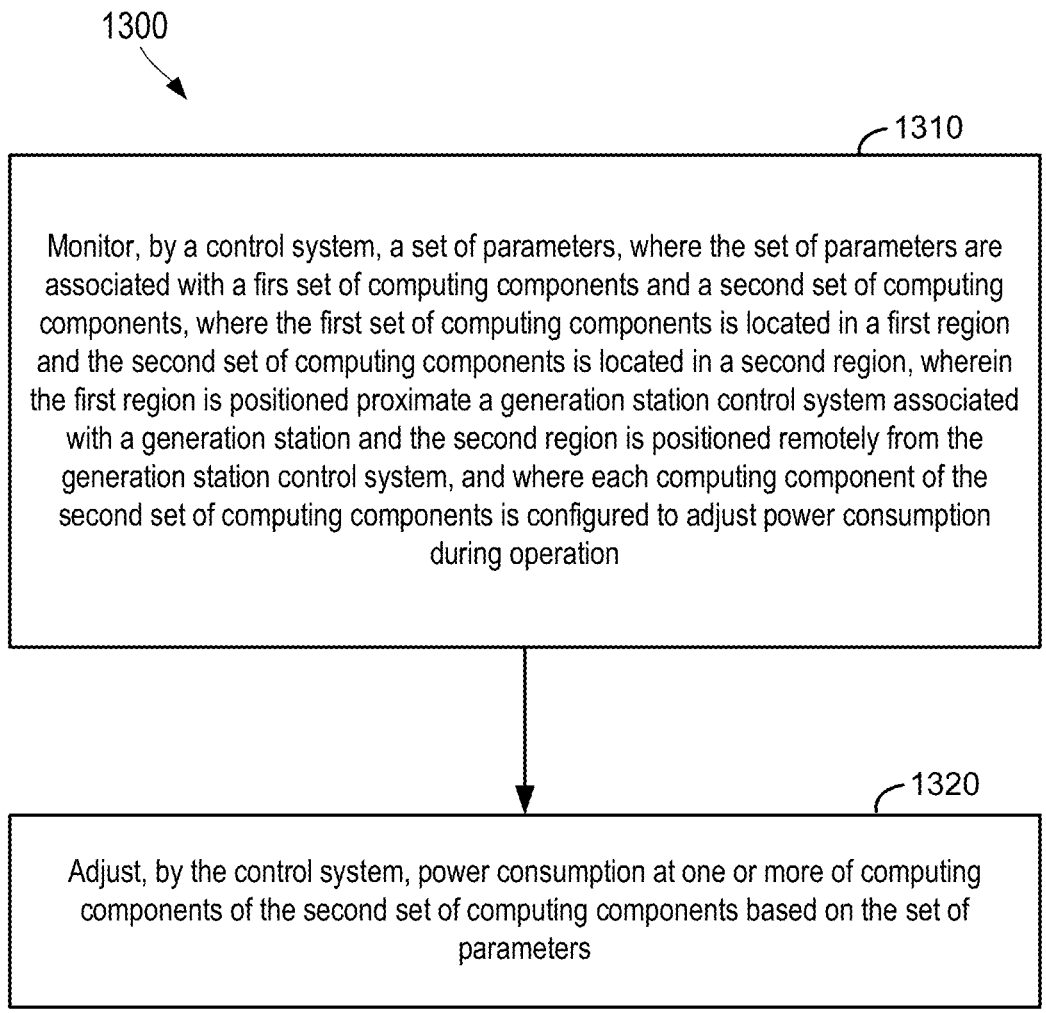
FIG. 13 illustrates a method for adjusting component conditions according to one or more embodiments.

FIG. 13 illustrates a method 1300 for adjusting resource operating conditions. The method 1300 serves as an example and may include other steps within other embodiments. The method 1300 can be performed using the control system 1130 of FIG. 11, the generation station control system 216 of FIG. 2, the remote master control system 300 of FIG. 3, the generation control system 414 of FIG. 4, the data center control system 504 of FIG. 5, the local station control systems 806A, 806B of FIG. 8, or a combination thereof.

The method 1300 includes monitoring, by a control system, a set of parameters, at 1310. For example, the control system 1130 of FIG. 11 can monitor BTM power availability 1142 of the computing components 1110, 1120, the BTM power price 1144 for the computing components 1110, 1120, the grid power price 1146 for the computing components 1110, 1120, the cryptocurrency price 1148 for the computing components 1110, 1120, and the additional parameters 1149.

According to the method 1300, the set of parameters are associated with a first set of computing components 1110 and a second set of computing components 1120. The first set of computing components 1110 is located in a first region and the second set of computing components 1120 is located in a second region. The first region is positioned proximate a generation station control system associated with a generation station 202 and the second region is positioned remotely from the generation station control system. Each computing component 1112A-C of the first set of computing components 1110 can be configured to maintain constant power consumption during operation. In some instances, each computing component 1112A-C of the first set of computing components 1110 may operate above threshold availability (e.g., 90 percent availability). Each computing component 1122A-C of the second set of computing components 1120 is configured to adjust power consumption during operation.

The method 1300 also includes adjusting, by the control system, power consumption at one or more of the second set of computing components based on the set of parameters, at 1320. For example, the control system 1130 adjusts power consumption at computing components 1122A-C of the second set of computing components 1120 based on the set of parameters.

According to one embodiment of the method 1300, the second set of computing components 1120 is configured to receive BTM power. Monitoring the set of parameters can include monitoring BTM power availability 1142 at the second set of computing components 1120.

According to one embodiment of the method 1300, the generation station 202 is a BTM power station and the second set of computing components 1120 is positioned within a flexible datacenter 220 located proximate the BTM power generation station and a threshold distance from the generation station control system. The first set of computing components 1110 is configured to receive (i) BTM power from the BTM power generation station and (ii) utility-scale electrical power from an electrical grid. Monitoring the set of parameters can include determining BTM power availability 1142 at the first set of computing components 1110. Responsive to determining that the BTM power is available at the first set of computing components 1110, the method 1300 can include performing a comparison between a price 1144 for the BTM power and a price 1146 for the utility-scale electrical power.

According to one embodiment, the method 1300 includes determining that the price 1144 for the BTM power exceeds the price 1146 for the utility-scale electrical power based on the comparison. Responsive to determining that the price 1144 for the BTM power exceeds the price 1146 for the utility-scale electrical power, the method 1300 includes causing the first set of computing components 1110 to maintain constant power consumption during operation using the utility-scale electrical power from the electrical grid.

According to one embodiment, the method 1300 includes determining that the price 1144 for the BTM power is below the price 1146 for the utility-scale electrical power based on the comparison. Responsive to determining that the price 1144 for the BTM power is below the price 1146 for the utility-scale electrical power, the method 1300 includes causing the first set of computing components 1110 to maintain constant power consumption during operation using the BTM power from the BTM power generation station 202.

According to one embodiment of the method 1300, monitoring the set of parameters includes determining BTM power is available at the second set of computing components 1120 and determining that a price 1144 of the BTM power is below a threshold price responsive to determining that the BTM power is available at the second set of computing components 1120. Adjusting power consumption of one or more computing components 1122A-C of the second set of computing components 1120 can include causing the one or more computing components 1122A-C to ramp up power consumption responsive to determining that the price 1144 of the BTM power is below the threshold price.

According to one embodiment of the method 1300, causing the one or more computing components 1122A-C to ramp up power consumption includes causing the one or more computing components 1122A-C to operate in a high power mode. The high power mode can involve operating at an increased processing speed.

According to one embodiment of the method 1300, monitoring the set of parameters includes determining BTM power is available at the second set of computing components 1120 and determining that a price 1144 of the BTM power is above a threshold price responsive to determining that the BTM power is available at the second set of computing components 1120. Adjusting power consumption of one or more computing components 1122A-C of the second set of computing components 1120 can include causing the one or more computing components 1122A-C to ramp down power consumption responsive to determining that the price 1144 of the BTM power is above the threshold price.

According to one embodiment of the method 1300, causing the one or more computing components 1122A-C to ramp down power consumption includes causing the one or more computing components 1122A-C to switch to operate in a low power mode. The low power mode can involve operating at a decreased processing speed.

According to one embodiment of the method 1300, monitoring the set of parameters includes monitoring a current price 1148 for a cryptocurrency, a price 1144 for BTM power, and a price 1146 for utility-scale electrical power. Adjusting power consumption of the one or more computing components 1122A-C of the second set of computing components 1120 can include adjusting the power consumption of the one or more computing components 1122A-C such that the one or more computing components 1122A-C generate the cryptocurrency when a revenue associated with generating the cryptocurrency exceeds a cost associated with generating the cryptocurrency.

In some embodiments, computing components positioned at the first region may operate at an overall availability that exceeds first threshold availability (e.g., 95 percent availability). For instance, a control system may turn down these component systems in situations where the price of grid power is expensive or to generate ancillary revenue via balancing the grid or helping satisfy power supply and demand constraints. Conversely, computing components at the second region may operate at lower threshold availability (e.g., 80 percent availability) due to ramping based on BTM power availability and other parameters. In some embodiments, the set of parameters may also include using a technology that identifies special rates associated with power consumption. Adjusting the power consumption may be based on the special rates identified by the technology.

Advantages of one or more embodiments of the present invention may include one or more of the following:

One or more embodiments of the present invention provides a green solution to two prominent problems: the exponential increase in power required for growing blockchain operations and the unutilized and typically wasted energy generated from renewable energy sources.

One or more embodiments of the present invention allows for the rapid deployment of mobile datacenters to local stations. The mobile datacenters may be deployed on site, near the source of power generation, and receive low cost or unutilized power behind-the-meter when it is available.

One or more embodiments of the present invention provide the use of a queue system to organize computational operations and enable efficient distribution of the computational operations across multiple datacenters.

One or more embodiments of the present invention enable datacenters to access and obtain computational operations organized by a queue system.

One or more embodiments of the present invention allows for the power delivery to the datacenter to be modulated based on conditions or an operational directive received from the local station or the grid operator.

One or more embodiments of the present invention may dynamically adjust power consumption by ramping-up, ramping-down, or adjusting the power consumption of one or more computing systems within the flexible datacenter.

One or more embodiments of the present invention may be powered by behind-the-meter power that is free from transmission and distribution costs. As such, the flexible datacenter may perform computational operations, such as distributed computing processes, with little to no energy cost.

One or more embodiments of the present invention provide a number of benefits to the hosting local station. The local station may use the flexible datacenter to adjust a load, provide a power factor correction, to offload power, or operate in a manner that invokes a production tax credit and/or generates incremental revenue.

One or more embodiments of the present invention allows for continued shunting of behind-the-meter power into a storage solution when a flexible datacenter cannot fully utilize excess generated behind-the-meter power.

One or more embodiments of the present invention allows for continued use of stored behind-the-meter power when a flexible datacenter can be operational but there is not an excess of generated behind-the-meter power.

One or more embodiments of the present invention allows for management and distribution of computational operations at computing components across a fleet of datacenters such that the performance of the computational operations take advantages of increased efficiency and decreased costs.

It will also be recognized by the skilled worker that, in addition to improved efficiencies in controlling power delivery from intermittent generation sources, such as wind farms and solar panel arrays, to regulated power grids, the invention provides more economically efficient control and stability of such power grids in the implementation of the technical features as set forth herein.

While the present invention has been described with respect to the above-noted embodiments, those skilled in the art, having the benefit of this disclosure, will recognize that other embodiments may be devised that are within the scope of the invention as disclosed herein. Accordingly, the scope of the invention should be limited only by the appended claims.

What is claimed is:

1. A system comprising:
    a first set of computing components located in a first region, wherein the first region is positioned proximate a generation station control system associated with a generation station;
    a second set of computing components located in a second region, wherein the second region is positioned remotely from the generation station control system, wherein the second set of computing components is configured to receive behind-the-meter (BTM) power from the generation station, and wherein each computing component of the second set of computing components is configured to adjust power consumption during operation; and
    a control system configured to:
        monitor a set of parameters, wherein the set of parameters include BTM power availability at the second set of computing components; and
        adjust power consumption at one or more computing components of the second set of computing components based on the set of parameters.

2. The system of claim 1, wherein the generation station is a BTM power generation station, and wherein the first set of computing components is configured to receive BTM power from the BTM power generation station.

3. The system of claim 2, wherein the first set of computing components is further configured to receive utility-scale electrical power from an electrical grid.

4. The system of claim 3, wherein the control system is further configured to:
    while monitoring the set of parameters, provide power consumption instructions to the first set of computing components such that each computing component of the first set of computing components maintains constant power consumption above a threshold power consumption using the BTM power from the BTM power generation station or the utility-scale electrical power from the electrical grid.

5. The system of claim 4, wherein the control system is further configured to:
    perform a comparison between a price for the BTM power and a price for the utility-scale electrical power; and
    based on the comparison, determine the power consumption instructions for the first set of computing components.

6. The system of claim 5, wherein the control system is further configured to:
    determine BTM power availability at the first set of computing components for an upcoming duration prior to performing the comparison between the price for the BTM power and the price for the utility-scale electrical power.

7. The system of claim 1, wherein the generation station is a BTM power generation station configured to generate utility-scale electrical power for supply to an electrical grid, and wherein the second set of computing components is configured to receive the BTM power from the BTM power generation station.

8. The system of claim 7, wherein the second set of computing components is connected to the BTM power generation station at a location behind a point of interconnection between the generation station and the electrical grid.

9. The system of claim 1, wherein the BTM power received by the second set of computing components is electrical power produced by the generation station and transmitted to the second set of computing components behind a Point of Interconnection between the generation station and an electrical grid.

10. The system of claim 1, wherein the second set of computing components is electrically connected to the generation station that is subject to metering by one or more utility-scale generation-side meters, wherein the BTM power received by the second set of computing components has not passed through the one or more utility-scale generation-side meters.

11. The system of claim 1, wherein the control system is configured to:
    while monitoring the set of parameters, determine a decrease in a cost associated with using BTM power at the second set of computing components; and
    responsive to determining the decrease in cost, cause one or more computing component of the second set of computing components to increase frequency during operation.

12. The system of claim 1, wherein the control system is configured to:
    while monitoring the set of parameters, determine a decrease in a cost associated with using BTM power at the second set of computing components; and
    responsive to determining the decrease in cost, cause one or more computing components of the second set of computing components to ramp up power consumption.

13. The system of claim 1, wherein the control system is configured to:
  while monitoring the set of parameters, determine an increase in a cost associated with using BTM power at the second set of computing systems; and
  responsive to determining the increase in cost, cause one or more computing components of the second set of computing components to switch to a low power mode.

14. The system of claim 1, wherein the control system is configured to:
  while monitoring the set of parameters, determine an increase in a cost associated with using BTM power at the second set of computing components; and
  responsive to determining the increase in cost, cause one or more computing components of the second set of computing components to power off.

15. The system of claim 1, wherein the first set of computing components is positioned within a climate-controlled environment at the first region such that the first set of computing components operate within a threshold range of temperatures.

16. The system of claim 15, wherein the wherein climate-controlled environment is at the generation station control system, and wherein the second set of computing components is positioned within a flexible datacenter such that each computing component of the second set of computing components is exposed to ambient air.

17. The system of claim 1, wherein the first region is positioned within a threshold distance from the generation station control system, and wherein the second region is positioned beyond the threshold distance from the generation station control system.

18. The system of claim 17, wherein the second region is positioned proximate the first region.

19. A method comprising:
  monitoring, by a control system, a set of parameters,
    wherein the set of parameters are associated with a first set of computing components and a second set of computing components,
    wherein the first set of computing components is located in a first region and the second set of computing components is located in a second region,
    wherein the first region is positioned proximate a generation station control system associated with a generation station and the second region is positioned remotely from the generation station control system,
    wherein the second set of computing components is configured to receive behind-the-meter (BTM) power from the generation station,
    wherein each computing component of the second set of computing components is configured to adjust power consumption during operation; and
  adjusting, by the control system, power consumption at one or more computing components of the second set of computing components based on the set of parameters.

20. The method of claim 19, wherein the second set of computing systems is configured to receive behind-the-meter (BTM) power, and wherein monitoring the set of parameters comprises monitoring BTM power availability at the second set of computing components.

21. The method of claim 20, wherein the generation station is a BTM power generation station, and wherein the second set of computing components is positioned within a flexible datacenter located proximate the BTM power generation station and a threshold distance from the generation station control system.

22. The method of claim 21, wherein the first set of computing components is configured to receive: (i) BTM power from the BTM power generation station and (ii) utility-scale electrical power from an electrical grid; and
  wherein monitoring the set of parameters comprises:
    determining BTM power availability at the first set of computing components; and
    responsive to determining that the BTM power is available at the first set of computing components, performing a comparison between a price for the BTM power and a price for the utility-scale electrical power.

23. The method of claim 22, further comprising:
  based on the comparison, determining that the price for the BTM power exceeds the price for the utility-scale electrical power; and
  responsive to determining that the price for the BTM power exceeds the price for the utility-scale electrical power, causing the first set of computing components to maintain constant power consumption during operation using the utility-scale electrical power from the electrical grid.

24. The method of claim 22, further comprising:
  based on the comparison, determining that the price for the BTM power is below the price for the utility-scale electrical power; and
  responsive to determining that the price for the BTM power is below the price for the utility-scale electrical power, causing the first set of computing components to maintain constant power consumption during operation using the BTM power from the BTM power generation station.

25. The method of claim 19, wherein monitoring the set of parameters comprises:
  determining BTM power is available at the second set of computing components; and
  responsive to determining that the BTM power is available at the second set of computing components, determining that a price of the BTM power is below a threshold price; and
  wherein adjusting power consumption of one or more computing components of the second set of computing components comprises:
    causing the one or more computing components to ramp up power consumption responsive to determining that the price of the BTM power is below the threshold price.

26. The method of claim 25, wherein causing the one or more computing components to ramp up power consumption comprises:
  causing the one or more computing components to operate in a high power mode, wherein the high power mode involves operating at an increased processing speed.

27. The method of claim 19, wherein monitoring the set of parameters comprises:
  determining BTM power is available at the second set of computing components; and
  responsive to determining that the BTM power is available at the second set of computing components, determining that a price of the BTM power is above a threshold price; and wherein adjusting power consumption of one or more computing systems of the second set of computing components comprises:
causing the one or more computing components to ramp down power consumption responsive to determining that the price of the BTM power is above the threshold price.

28. The method of claim 19, wherein monitoring the set of parameters comprises:
monitoring an indication of frequency status of an electrical grid; and
wherein adjusting power consumption at one or more computing components of the second set of computing components based on the set of parameters comprises:
based on frequency status, adjusting power consumption at a first plurality of computing components from the first set of computing components and a second plurality of computing components from the second set of computing components.

29. The method of claim 19, wherein monitoring the set of parameters comprises:
monitoring a current price for a cryptocurrency, a price for BTM power, and a price for utility-scale electrical power; and
wherein adjusting power consumption of one or more computing components of the second set of computing components comprises:
adjusting the power consumption of the one or more computing components such that the one or more computing components generate the cryptocurrency when a revenue associated with generating the cryptocurrency exceeds a cost associated with generating the cryptocurrency.

30. A non-transitory computer-readable medium configured to store instructions that, when executed by a computing system, cause the computing system to perform operations comprising:
monitoring a set of parameters, wherein the set of parameters are associated with a first set of computing components and a second set of computing components,
wherein the first set of computing components is located in a first region and the second set of computing components is located in a second region,
wherein the first region is positioned proximate a generation station control system associated with a generation station and the second region is positioned remotely from the generation station control system,
wherein the second set of computing components is configured to receive behind-the-meter (BTM) power from the generation station,
wherein each computing component of the second set of computing components is configured to adjust constant power consumption during operation, and
adjusting power consumption at one or more computing components of the second set of computing components based on the set of parameters.

* * * * *

UNITED STATES PATENT AND TRADEMARK OFFICE
CERTIFICATE OF CORRECTION

| | | |
|---|---|---|
| PATENT NO. | : 11,042,948 B1 | Page 1 of 1 |
| APPLICATION NO. | : 16/803109 | |
| DATED | : June 22, 2021 | |
| INVENTOR(S) | : McNamara et al. | |

It is certified that error appears in the above-identified patent and that said Letters Patent is hereby corrected as shown below:

In the Claims

In Column 61, Claim 20, Line 61 should read as follows:
--computing components is configured to receive behind-the- --

In Column 63, Claim 27, Line 2 should read as follows:
--computing components of the second set of computing--

Signed and Sealed this
Nineteenth Day of December, 2023

Katherine Kelly Vidal
*Director of the United States Patent and Trademark Office*